United States Patent [19]
Kahan et al.

[11] 3,991,592
[45] Nov. 16, 1976

[54] AUTOMATED HOME KNITTING MACHINE

[75] Inventors: William Kahan, New York, N.Y.; Fredrick Alexander Rupinski, Lyndhurst; Barney Dean Hunts, Mountain Lakes; Howard David Rogers, Fanwood, all of N.J.; John Francis Wagner, Garden City, N.Y.; John Vernon Landau, Jr., Mt. Lakes, N.J.

[73] Assignee: The Singer Company, New York, N.Y.

[22] Filed: Oct. 30, 1975

[21] Appl. No.: 627,446

[52] U.S. Cl. .............................................. 66/75 A
[51] Int. Cl.² .......................................... D04B 7/00
[58] Field of Search ............... 66/154 A, 60, 64 H, 66/64, 75 A

[56] References Cited
UNITED STATES PATENTS

| | | | |
|---|---|---|---|
| 3,035,426 | 5/1962 | MacQueen | 66/75 A |
| 3,783,642 | 1/1974 | Hadam | 66/75 A |
| 3,786,655 | 1/1974 | Krause | 66/154 A |
| 3,805,558 | 4/1974 | Protti | 66/154 A |
| 3,885,405 | 5/1975 | Bartels | 66/154 A |
| 3,896,297 | 7/1975 | Ploppa | 66/154 A |
| 3,896,638 | 7/1975 | Morat et al. | 66/50 R |
| 3,913,353 | 10/1975 | Spencer | 66/75 A |
| 3,913,354 | 10/1975 | Kohler et al. | 66/75 A |
| 3,924,244 | 12/1975 | Morat | 66/154 A |

*Primary Examiner*—Ronald Feldbaum
*Attorney, Agent, or Firm*—Edward L. Bell; Robert E. Smith; William V. Ebs

[57] ABSTRACT

A home knitting machine is provided with electronic control means which function pursuant to patterning instructions on a program card and in response to the operation of control devices by an operator causing needle actuators on the carriage of the machine to be selectively operated and fabric knitted in a prescribed manner on the machine.

18 Claims, 56 Drawing Figures

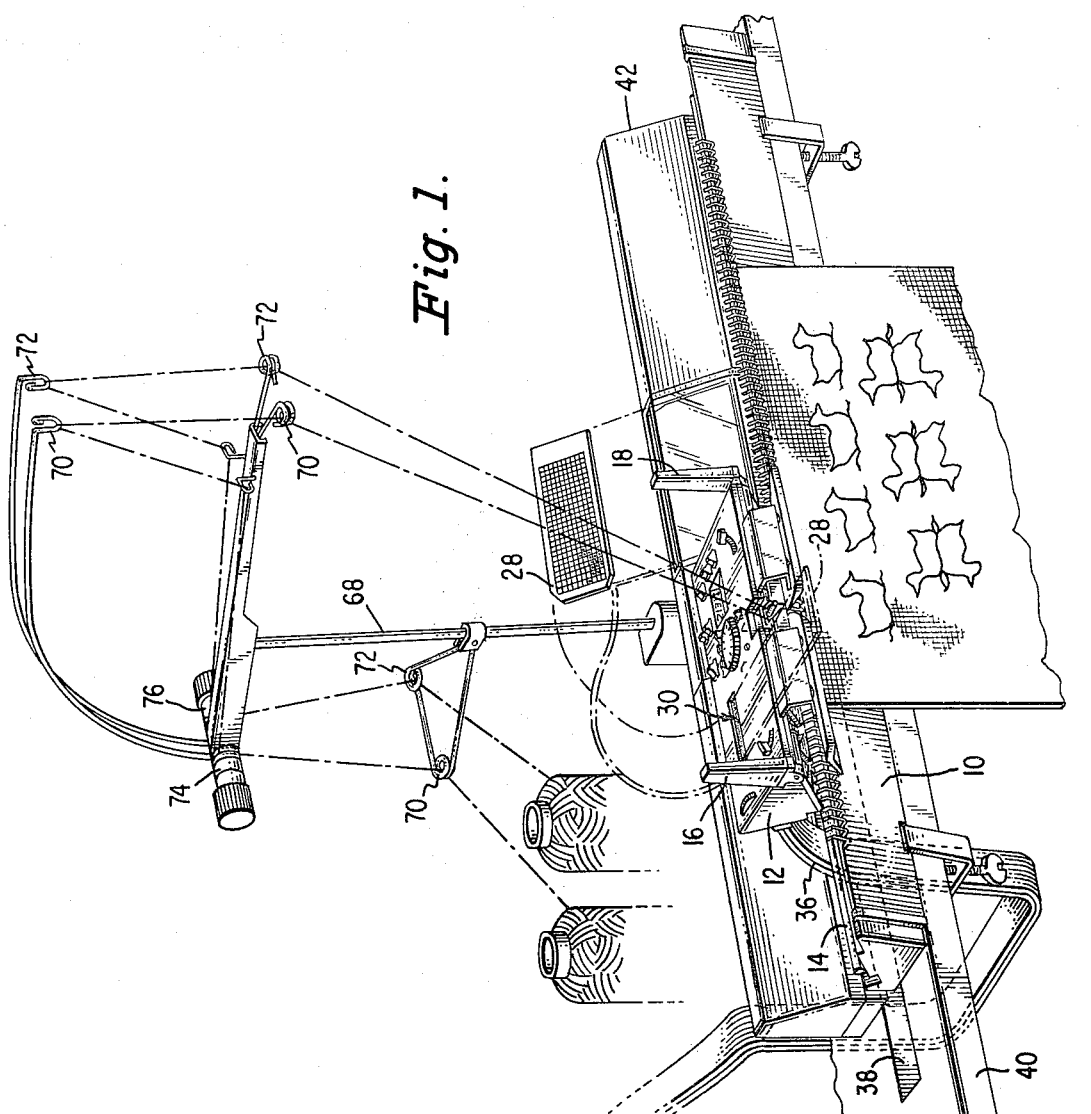
Fig. 1.
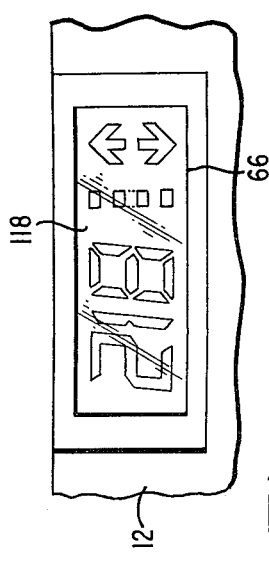
Fig. 4.
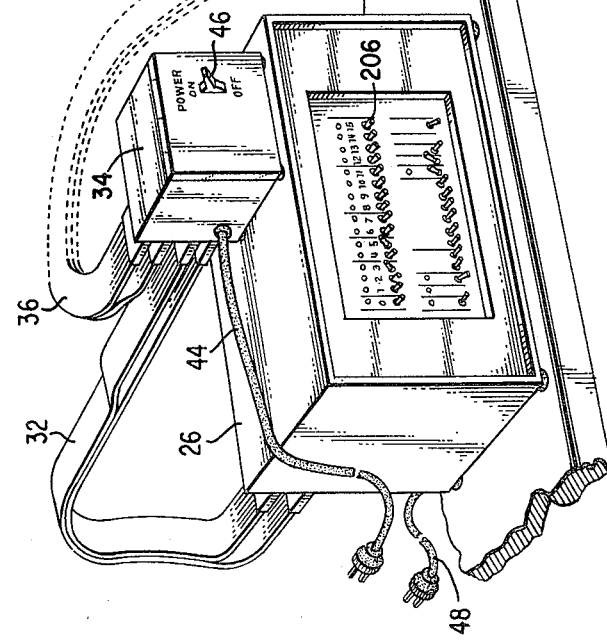

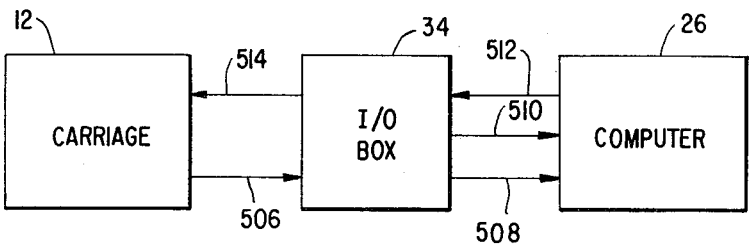
*Fig. 11.*
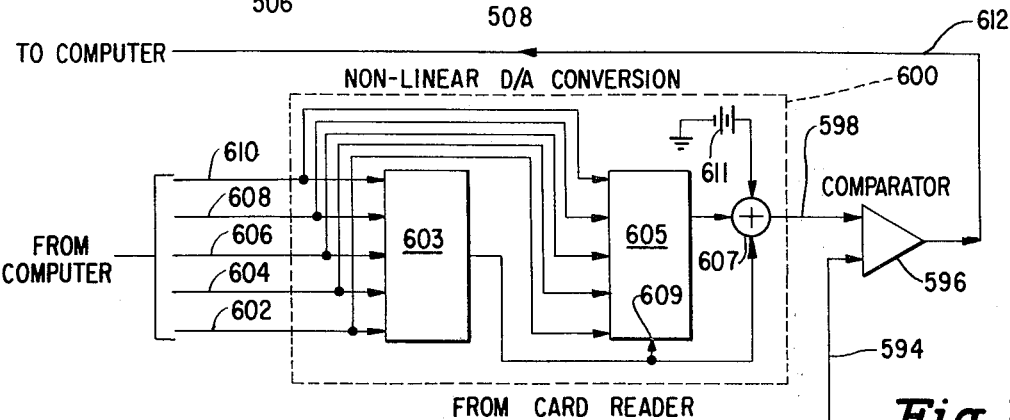
*Fig. 13.*
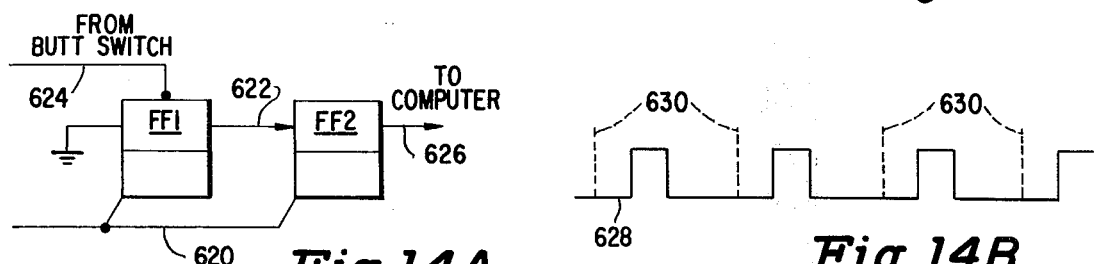
*Fig. 14A.*  *Fig. 14B.*
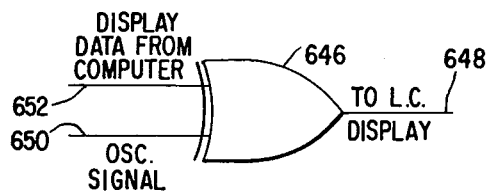
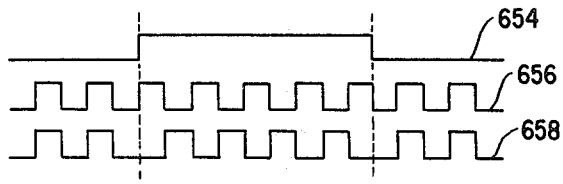
*Fig. 15A.*  *Fig. 15C.*
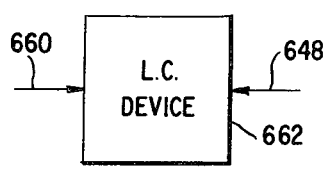
*Fig. 15B.*
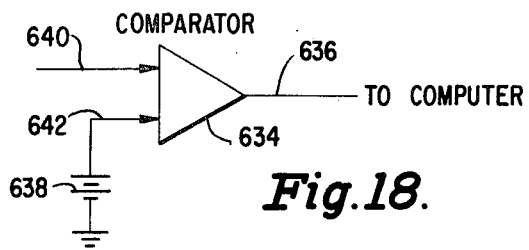
*Fig. 18.*

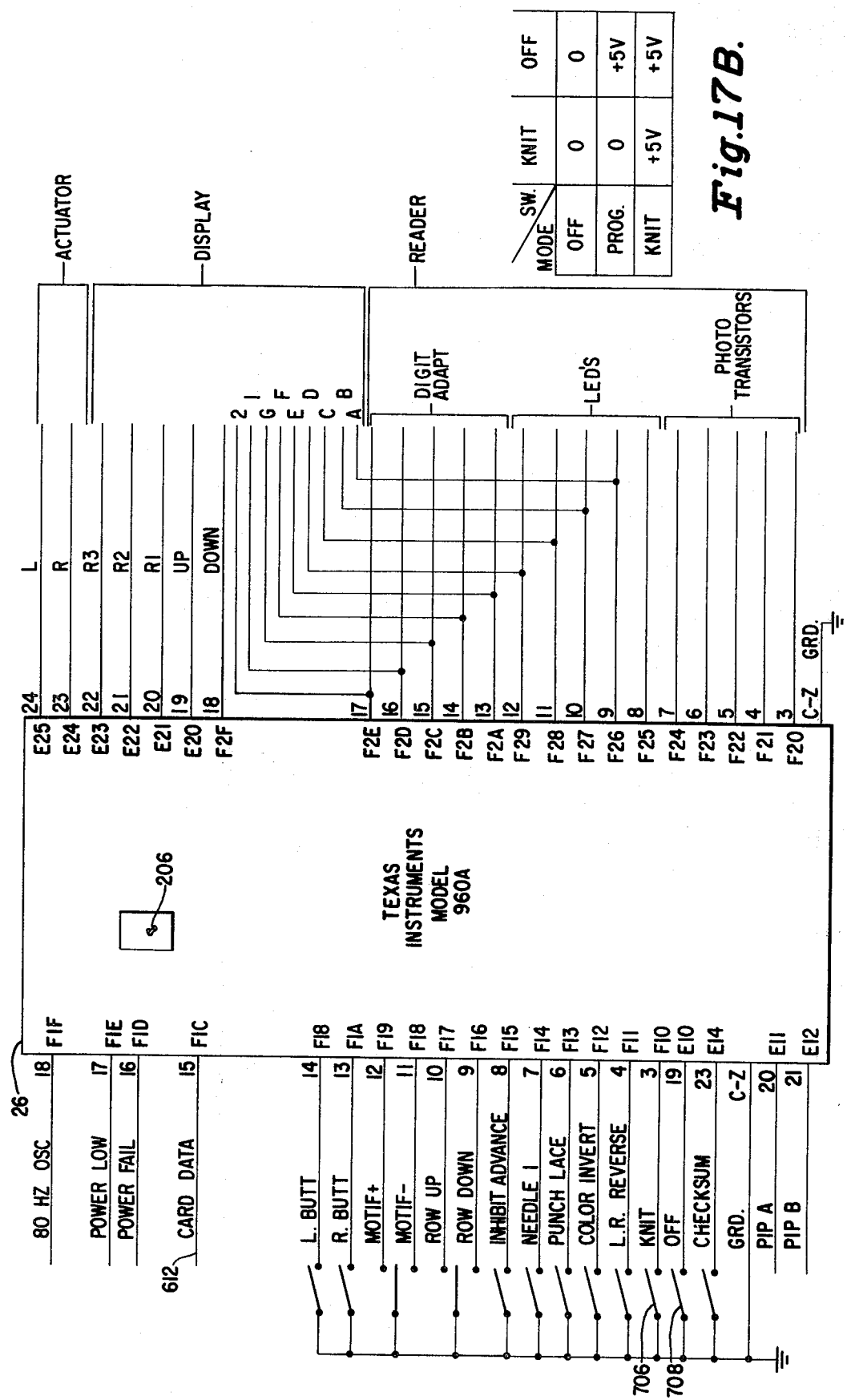

FLOWCHARTING ORGANIZATION

| TYPE | NAME | REF | FIG. NO'S. |
|---|---|---|---|
| SUBPROGRAM | INITIALIZATION | I | 20 |
| SUBPROGRAM | PROGRAM MODE | P | 20-25 |
| SUBPROGRAM | KNIT MODE | K | 26-31 |
| SUBROUTINE | PROGRAM PIP CHECK (PPIPCK) | PP | 32-37 |
| SUBROUTINE | KNIT PIP CHECK (KPIPCK) | KP | 38-40 |
| SUBROUTINE | ROW ADVANCE FORWARD (RADVF) | RF | 41 |
| SUBROUTINE | ROW ADVANCE REVERSE (RADVR) | RR | 42 |
| SUBROUTINE | READ | RE | 43 |
| SUBROUTINE | COLINC/COLDEC | CC | 44-45 |
| SUBROUTINE | ADAPT | AD | 46-47 |
| TABLE | MNEMONICS DEFINITIONS | MD | 48-49 |
| ⬡ | SUBROUTINE CALL | | |
| ⋈ | SUBROUTINE ENTRY | | |

*Fig. 19.*

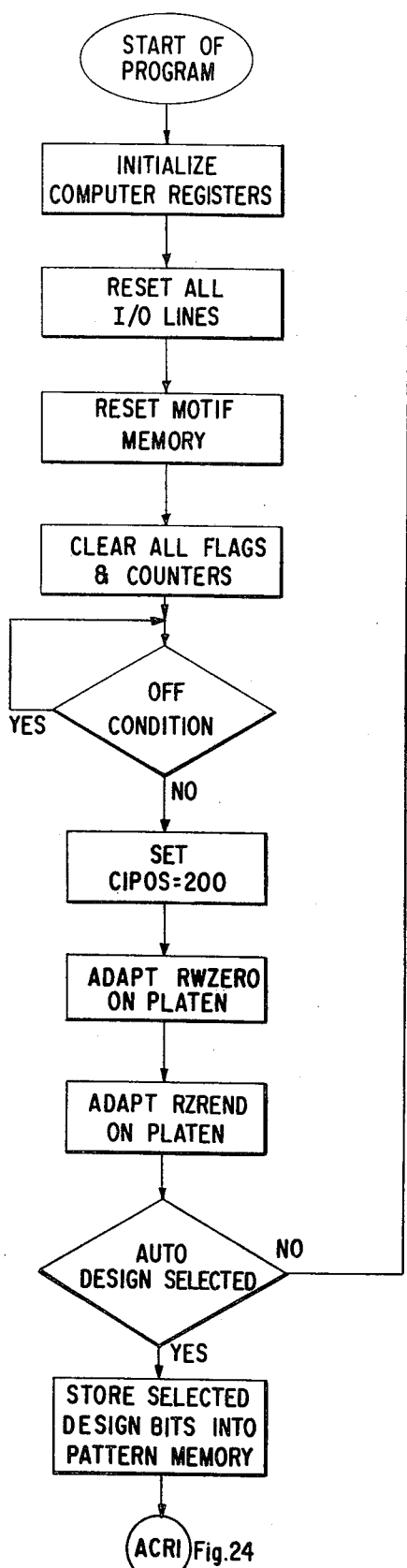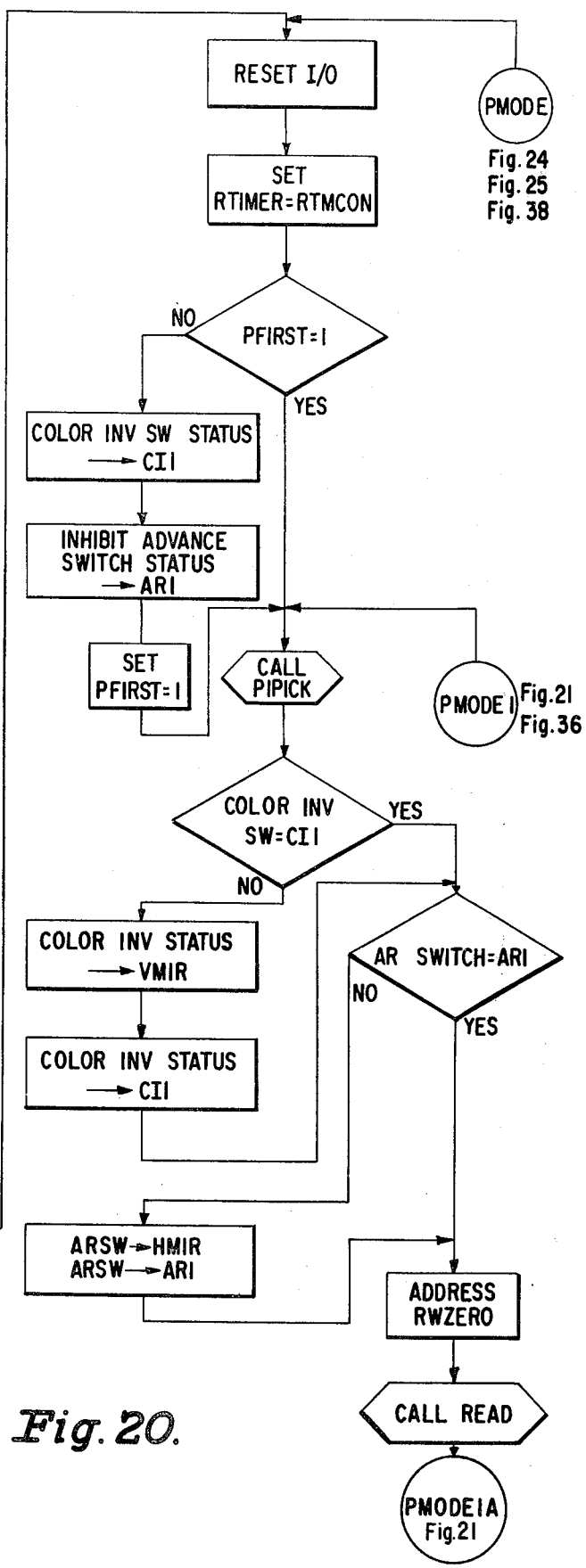
Fig. 20.

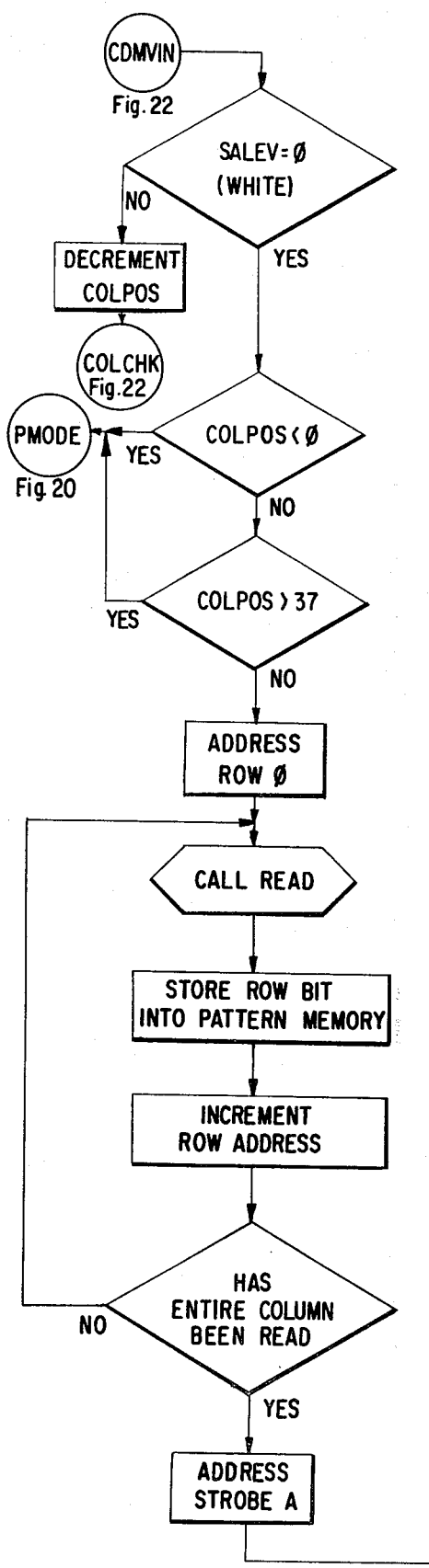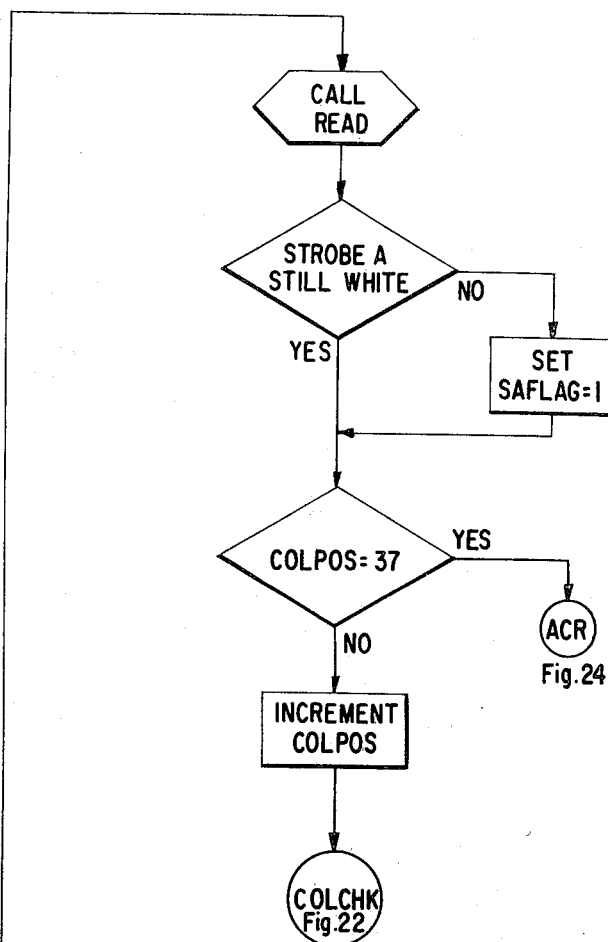
Fig. 23.

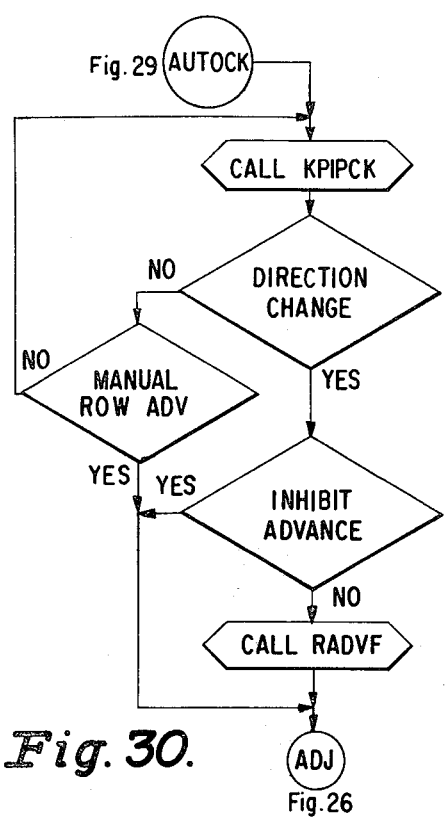
Fig. 30.
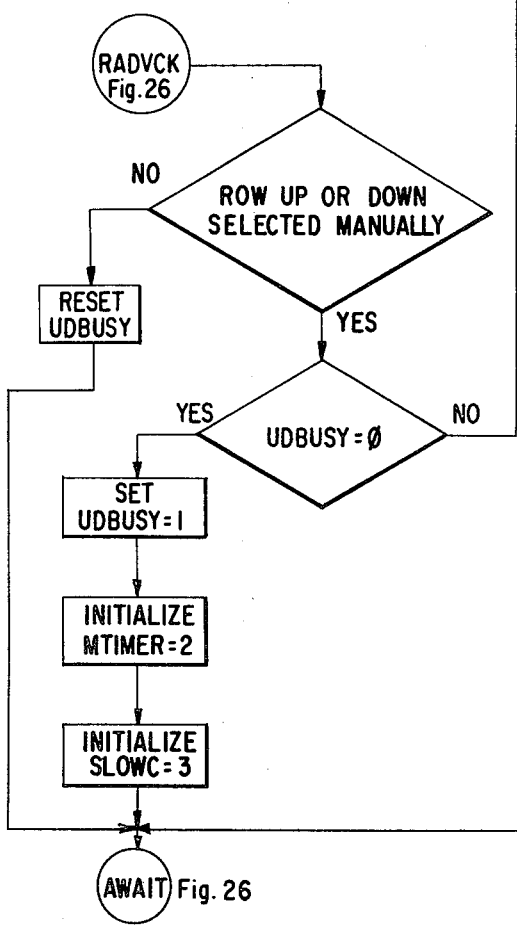
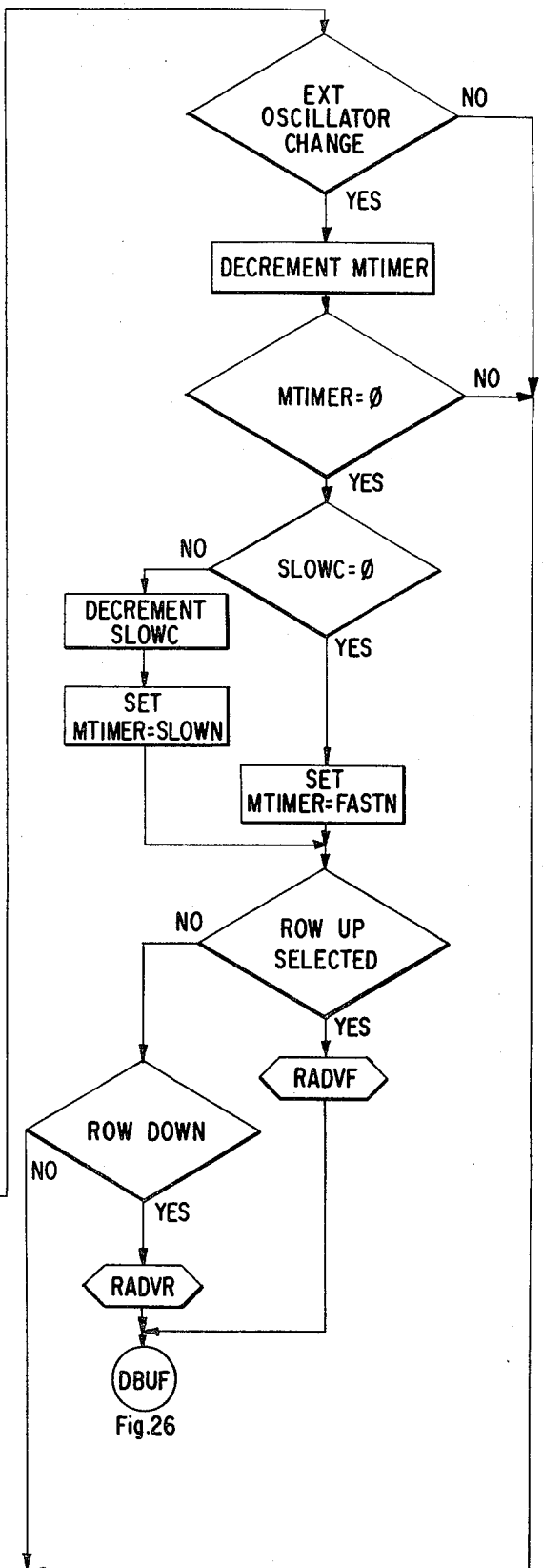
Fig. 31.

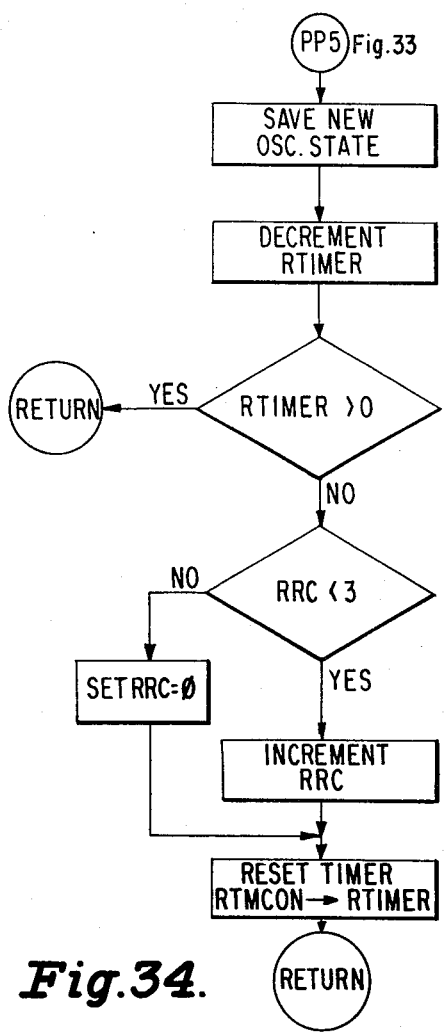
*Fig. 34.*
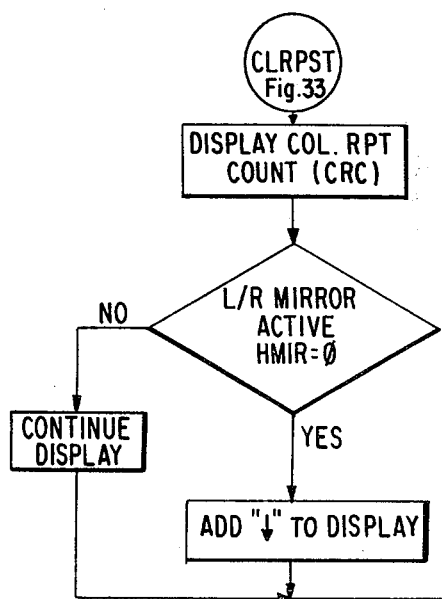
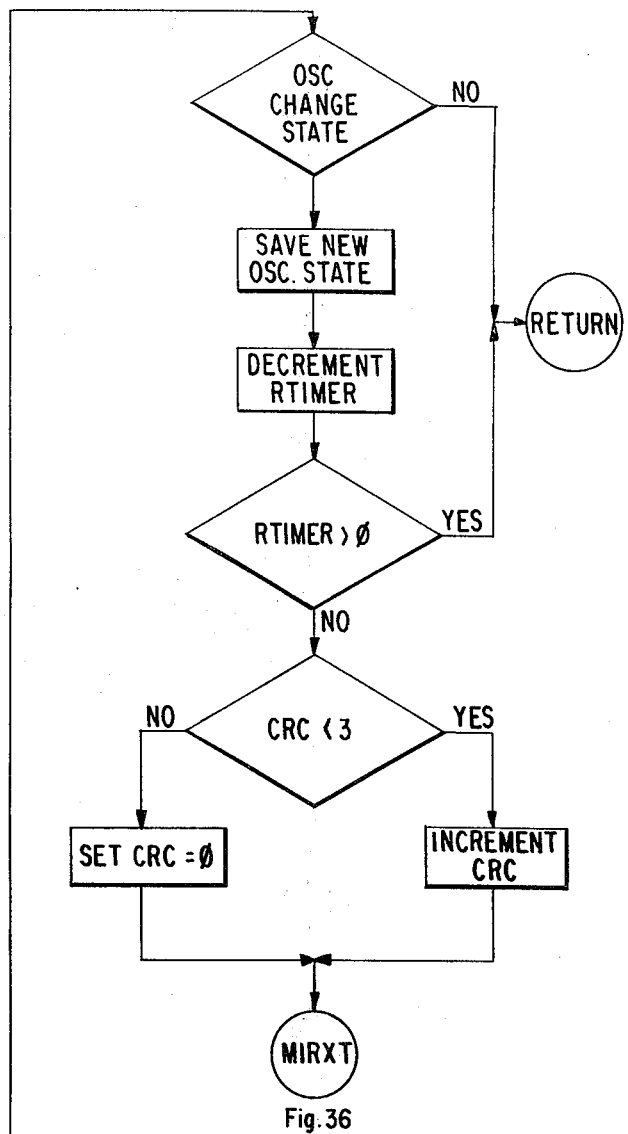
*Fig. 35.*

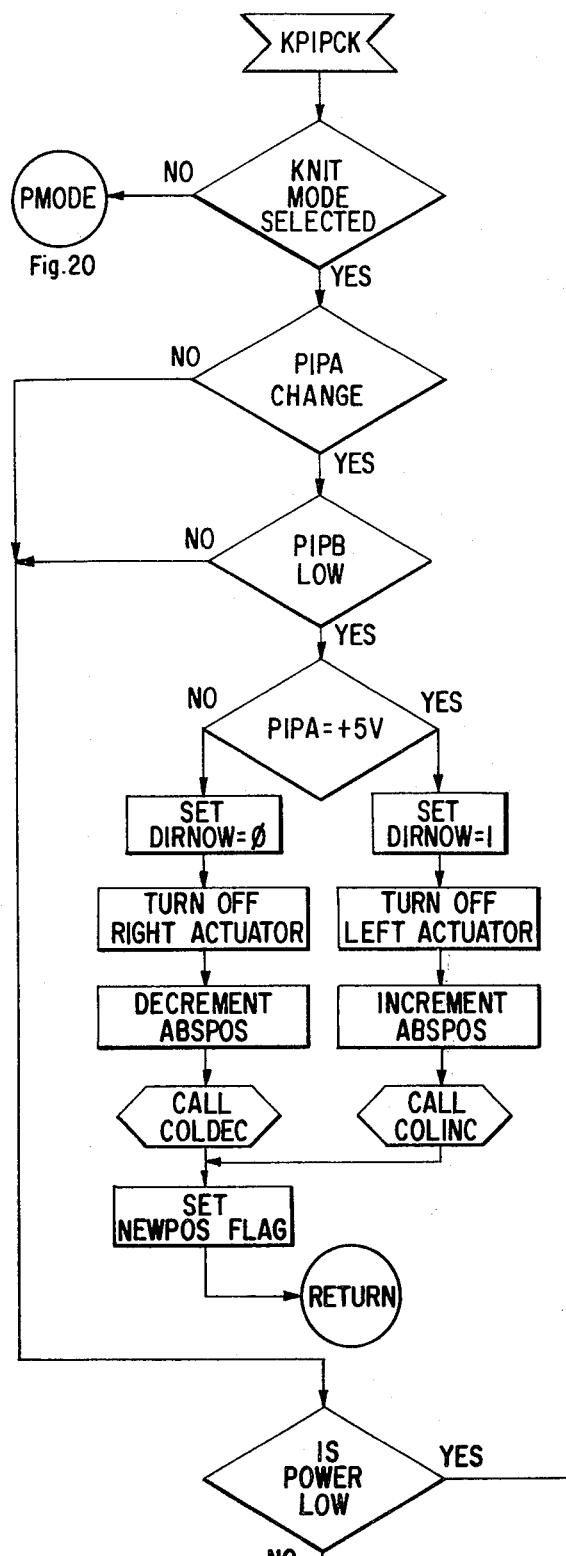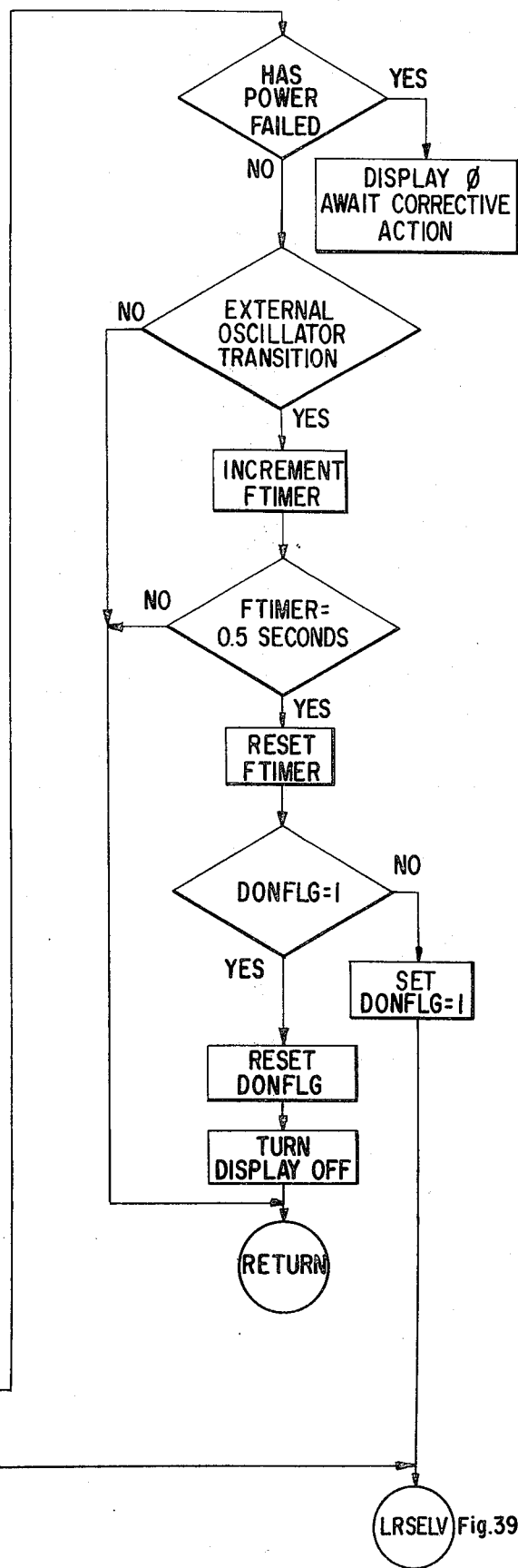
Fig. 38.

BRIEF DESCRIPTION OF
FLAGS, COUNTERS, AND BUFFERS (ALL INITIALIZED TO ZERO)

| | |
|---|---|
| VMIR | VERTICAL MIRROR FLAG |
| HMIR | HORIZONTAL MIRROR FLAG |
| COLEND | COLUMN END (0-35) |
| CRC | COLUMN REPEAT COUNT (0-3) |
| TROWC | TOP ROW COUNT (0-19) |
| RRC | ROW REPEAT COUNT (0-3) |
| SELVC | SELVAGE COUNT (0-5) |
| DIRNOW | CURRENT DIRECTION LEFT=0 |
| DIRFIX | ACTUATING DIRECTION |
| DONFLG | DISPLAY ON FLAG |
| LAST80 | OSC LEVEL (FLASH) |
| CARDOK | VALID CARD READ FLAG |
| NIFLAG | NEEDLE 1 ENTERED FLAG |
| COLPOS | CARD COLUMN (0-37) |
| SALEV | STROBE "A" LEVEL |
| CRCNOW | CURRENT CRC (0-3) |
| COLUMN | KNIT COLUMN (0-35) |
| ALEVEL | PIPA LEVEL (DARK=FFFF) |
| ARROW | UP=1, DOWN=0 |
| RRCNOW | CURRENT RCC (0-3) |
| CROWN | CURRENT ROW NUMBER (0-19) |
| FTIMER | FLASH TIMER |
| RTIMER | TIME BUFFER |
| DBUF1 | 000000D2IGFEDCBA (ACTIVE DISPLAY SEGMENT) |
| DBUF2 | 000000000000R1R2R3UP (ACTIVE DISPLAY SEG.) |
| CADJR | COLUMN ADJUST RIGHT |
| CADJL | COLUMN ADJUST LEFT |
| MTIMER | MAN ROW ADV TIMER |
| LAST81 | OSC LEVEL (MAN ADV) |
| LRREV | LRREV FLAG |
| OFF3C | OFF 3 COUNT (-3 TO +82) |
| JAMCHK | JAMCHK FLAG |
| ENBACT | ENABLE ACTUATOR FLAG |
| OFF3F | OFF 3 TIMES FLAG |
| NEWPOS | NEW CAR POSITION FLAG |
| SELVZ | SELVEDGE ZONE (SHIFT ZONE) |
| KBIT | KNIT BIT (ACTUATE=1) |
| MIRNOW | MIRRORING NOW FLAG |
| ATABLE | ADAPT # TABLE |
| DOPTN | FLAG FOR AMBIGUOUS CARD OPTIONS |
| SAFLAG | FLAG FOR FAST CARD READ |
| CHKSUM | DESIGN CHECK SUM |
| REMNUM | DESIGN NO. MOD10 |
| PFIRST | PREVIOUS PROG MODE ENTRY |
| CII | INITIAL CI SW |
| ARI | INITIAL AR SW |
| AROO | ORIGINAL LR MIRROR |
| CRCOO | ORIGINAL CRC |
| STIMER | SELVEDGE UPDATE TIMER |
| LAST82 | SELVEDGE UPDATE OSC LEVEL |
| CIPOS | MOTIF COUNTER AT NI POS |
| SLOWC | NUMBER OF SLOW COUNTS |
| UDBUSY | UP/DOWN IN PROGRESS |
| CSFLAG | CHECKSUM PREVIOUSLY TESTED FLAG |
| ATLAST | LAST ADDRESS IN VARIABLE REGION |

*Fig. 48.*

BRIEF DESCRIPTION OF DATA CONSTANTS

| | | |
|---|---|---|
| ROFFST | DATA −27 | RIGHT OFFSET |
| LOFFST | DATA −27 | LEFT OFFSET |
| RMFST | DATA +27 | RIGHT MOTIF OFFSET |
| LMFST | DATA −27 | LEFT MOTIF OFFSET |
| CARSIZ | DATA 66 | CARRIAGE SIZE |
| SLOWN | DATA X'00C0' | SLOW UPDATE COUNT |
| FASTN | DATA X'0050' | FAST UPDATE COUNT |

*Fig. 49.*

AUTOMATED HOME KNITTING MACHINE

BACKGROUND OF THE INVENTION

1. Field of the Invention

The invention relates to automatic knitting machinery and has particular application to home knitting machines which can be programmed to produce prescribed patterns on a fabric.

2. Description of the Prior Art

Automated home knitting machines are now well known and are exemplified by the machines of the following Patents and applications:

U.S. Pat. No. 3,885,405 — issued May 27, 1975
French Pat. No. 2,212,830 — Reg. July 23, 1972
Japanese Application 85853, laid open Nov. 13, 1973

Although such machines can be programmed to produce various patterns in knitted fabric, there are a variety of desirable control functions pertaining to the formation of patterned fabric which the existing machines can not be programmed to perform automatically. Furthermore, existing machines do not permit the operator to exercise a large measure of control over the knitting of the fabric after the initial programming.

SUMMARY OF THE INVENTION

In order to remedy the deficiencies of the prior art machines, electronic control means are provided in a home knitting machine enabling the machine to perform automatically in a variety of control functions which an operator may prescribe by suitably marking a program card to be read by the machine and/or by operating various control instrumentalities, preferably located on the carriage of the machine, and enabling the operator after the machine has been programmed to exercise easily close control over the knitting of fabric on the machine.

More particularly, the machine of the invention is rendered capable of reading and executing instructions which an operator may prescribe by marking the card, including instructions defining a design configuration for fabric to be knitted on the machine, instructions delineating a unit design area for formation repetitively in the fabric, instructions specifying that each unit design area be expanded an integral number of times, either horizontally or vertically or in both directions in the fabric, instructions directing that in conjunction with the unit design areas, mirror images thereof also be formed in courses or wales or in both courses and wales of the fabric, and an instruction directing a particular number of wales to be knitted as selvedge without the design configuration at opposite side edges of the fabric. The machine is also provided with switches which offer an operator an alternative to the use of certain instructions on the program card. With such switches he can cause the machine to expand the unit design areas, produce mirror images, knit a selected number of wales of selvedge, invert the design configuration and background specified on the card, reverse the left-right orientation of a design configuration as prescribed on the program card and repeat a design now in fabric being knitted.

In addition, the machine is adapted to execute supplementary and/or modifying instructions in response to the actuation of switch means by an operator including instructions specifying the placement of a pattern between the side edges of a fabric to be knitted on the machine, instructions directing the elimination and formation of the design configuration prescribed on the program card in selected regions of a fabric, instructions designating particular design rows to be knitted out of the sequence prescribed by the program card, an instruction directing the formation of selvedge in punch lace fabric with both the yarn and thread used in knitting the punch lace construction, an instruction directing that the colors specified in the program card for a design configuration and its background be reversed, an instruction directing a reversal in the left-right orientation of a design configuration as prescribed on the program card, and an instruction directing that a design row be repeated in a fabric being knitted.

The machine includes a liquid crystal display which provides an operator with meaningful information enabling him to better control the knitting of designs and to prevent defects due to operating error. The display informs an operator of the row of the program card being knit, of the number of times a given row has been selected for vertical multiplication, of the fact that the machine has been readied for automatic knitting before a card has been read properly where such is the case, of a failure by the operator to select a particular needle for a wale corresponding to an end column of a designated unit design area on the program card, and of the condition of the power supply.

DESCRIPTION OF THE DRAWINGS

FIG. 1 is a perspective view of the machine of the invention;

FIG. 4 is a face view of a display provided on the carriage of the machine;

FIG. 11 is a block diagram showing the principal components of the machine and indicating their interrelationship;

FIG. 13 is a circuit diagram showing a digital adapter and thresholding circuit components associated with the reader;

FIG. 14A is a circuit diagram showing the electronic components of needle butt circuitry;

FIG. 14B is a wave shape diagram illustrating the operation of the circuitry of FIG. 14A;

FIGS. 15A and 15B are diagrams showing electronic drive components for the liquid crystal display on the machine;

FIG. 15C is a wave shape diagram illustrating the operation of the circuitry of FIG. 15A;

FIG. 17A is a circuit diagram showing the interface between the computer and input/output circuitry;

FIG. 17B is a truth table for the OFF-Program-Knit switch of the machine;

FIG. 18 is a circuit diagram showing a voltage level comparator;

FIG. 19 is a listing of computer subprograms and subroutines;

FIGS. 20 through 47 are flow diagrams; and

FIGS. 48 and 49 is a glossary of terms used in the flow charts of FIGS. 20 through 47.

DESCRIPTION OF THE PREFERRED EMBODIMENT

Figure 2:
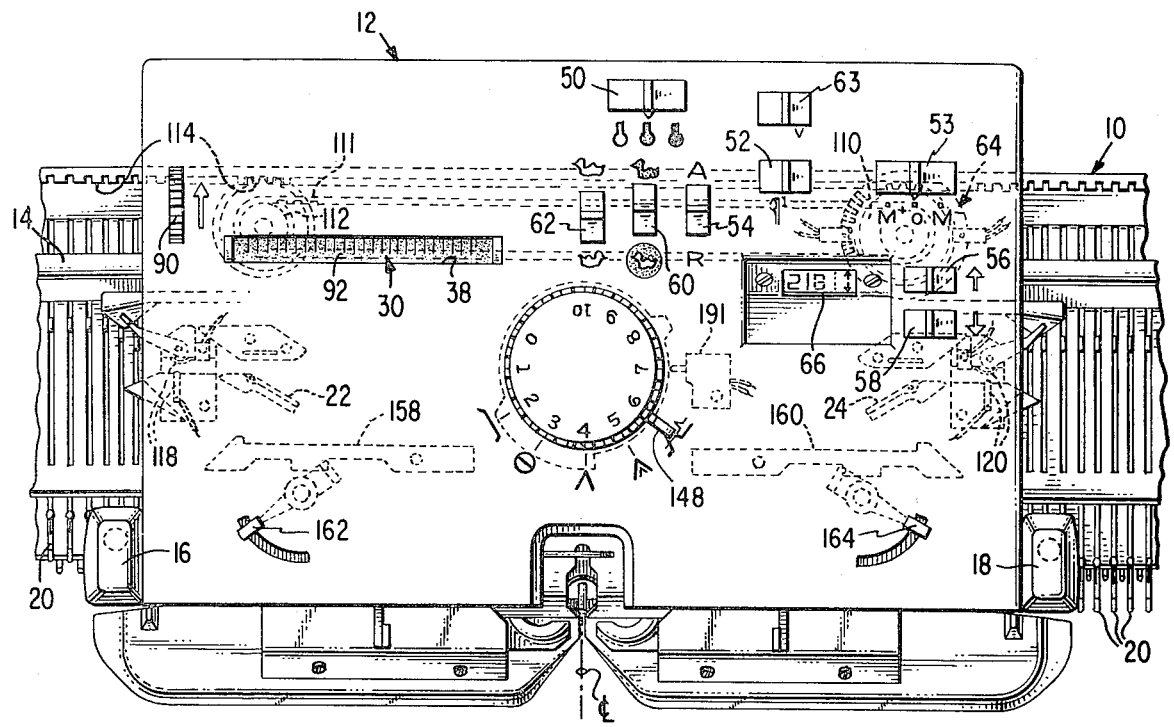
FIG. 2 is a top plan view of the carriage of the machine.

Referring to FIGS. 1 and 2 of the drawings, reference characters 10 and 12 designate the bed and carriage respectively of the home knitting machine of the invention. The carriage is slidably mounted on a guide rail 14 affixed to the bed, and includes handles 16 and 18 which an operator may grasp and utilize to move the carriage back and forth on the bed. Knitting needles 20 are slidably supported on side by side relation in the bed 10 as shown. The carriage includes needle actuating camming hereinafter described and includes left and right electromagnetic actuators 22 and 24 respectively by means of which the needles may be caused to enter one or another of alternate cam paths and knit a single yarn, two different yarns, or a yarn and thread into fabric in a prescribed manner.

A general purpose minicomputer 26, of Texas Instrument Co. P/N Model 960A, programmed as hereinafter indicated, is provided for controlling the needle actuators 22 and 24 pursuant to instructions on a program card 28 as detected by a reader 30 located on the carriage and/or the condition of various electrical switches also located on the carriage. As shown, the computer 26 connects by a multi-wired cable 32 with an input-output box 34 and the input-output box connects by another such cable 36 with the carriage 12. Cable 36 extends through a slot 38 in a table 40 which supports the bed 10 on one eide of the slot 38 and a compartmentalized housing 42 for accessories on the outer side. The cable 36 is of such length as to permit it to move freely with the carriage 12 as the carriage is moved along the bed. The input-out box includes an input power line 44 and a switch 46 by means of which power supplied over line 44 may be connected to or disconnected from the carriage. Power is supplied to the computer 26 over line 48.

Electrical switches located on the carriage and operatively connected to the computer 26 via input output box 34 include an O.P.K. switch 50, needle one switch 52, motifing switch 53, automatic and row repeat switch 54, row advance 56, row descent switch 58, design inversion switch 60, left-right reverse switch 62 and check-digit switch 63. A pulse generator 64 mounted on the carriage for rotation in timed relation to movement of the carriage and a liquid crystal display 66 on the carriage also operatively connect with the computer 26 via the input-output box 34.

The O.P.K. switch 50 is a three position switch which an operator of the machine may move into one position (O) to turn the machine off, another position (P) to put the machine in a PROGRAM MODE, and still another position (K) to place the machine in a KNIT MODE. The switch remains in whatever position it is placed until moved again. Motifing switch 53 is a three position switch similar to switch 50 and has an off position (O) as well as two motifing positions (M+) and (M−). The automatic and row repeat switch 54 is movable into either of two positions (A or R). Design inversion switch 60 and left-right reverse switch 62 are also two position switches. Each of the switches 54, 60 and 62 remains in whatever position it is placed until moved again. The other switches, that is, needle one switch 52, row advance switch 56, row descent switch 58 and check digit switch 63 are on-off switches which remain on only so long as they are depressed. The motifing switch 53, automatic and row repeat switch 54, design inversion switch 60, row advance switch 56, row descent switch 58 and left-right reverse switch 62 are dual function switches in that each serves one purpose when the machine is in the KNIT MODE and another purpose when the machine is in the PROGRAM MODE.

A stand 68, centrally located with respect to ends of the needle bed 10 is provided with yard guides 70 and 72, and with tension devices 74 and 76 enabling one yarn, two yarns or a yarn and thread to be fed in a controlled fashion to the needles of the machine and to be knit into fabric.

Figure 3:
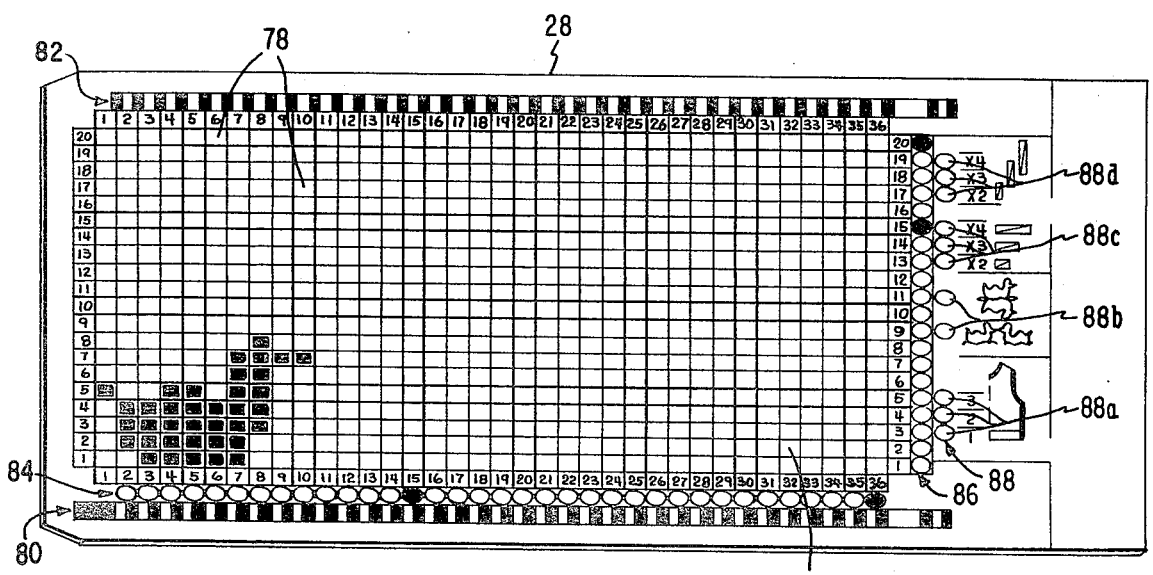
FIG. 3 is a face view of a program card for the machine.

Program card 28 which may be best seen in FIG. 3, is used to instruct the computer concerning the manner in which fabric is to be knit on the machine. As shown, the card includes mutually perpendicular lines which define a design area of rectangles 78 that extend in numbered columns (1 through 36) and numbered rows (1 through 20). The rectangles 78 correspond to stitches and the numbered columns and numbered rows to wales and courses respectively which may be knit in a fabric pursuant to instructions on the card. Preferably the width and height of each rectangle 78 are such as to substantially correspond to the width and height of a typical stitch. The card includes two rows of strobe markings 80 (strobe A) and 82 (strobe B), a row of size delineating ellipses 84 aligned with the numbered columns 2 through 36, and a column of size delineating ellipses 86 aligned with the numbered rows all as shown in the drawing. In addition the card includes a column of ellipses 88 in association with symbolically expressed textless instructions, that is, the ellipses 88a, 88b, 88c and 88d having to do with selvedge, mirror imaging, horizontal multiplication and vertical multiplication, respectively.

The reader 30 includes a thumb wheel 90 by means of which the program card may be easily moved through the device after having been inserted in the entrance slot 92 on the carriage. As will be explained hereinafter in more detail, the reader is adapted to detect, as the card moves through it, the strobe marks on the card and any marks made on it by an operator in particular rectangles in the design area or in particular ellipses outside the design area.

As previously noted, the pulse generator rotates in timed relation to movement of the carriage 12. The device (FIG. 9) includes photo-interrupter modules 94 and 96 in association with a toothed disc 98 affixed on one end of a shaft 100. Each module includes a light emitting diode (LED) on one side of the disc 98 and a phototransistor on the other side as shown for the module 94 at 102 and 104 respectively and for module 96 at 106 and 108 respectively. A toothed pulley 110 is affixed to the shaft 100 and a timing belt 111 connects the toothed pulley with a pinion 112 which is rotatable in the carriage and meshes with a rack 114 on the bed 10 of the machine (FIG. 2). As the carriage 12 is moved on the bed, pinion 112 is rotated by reason of its engagement with the rack 114 and the timing belt 111 is caused to drive pulley 110 and shaft 100. Disc 98 is rotated by shaft 100 in synchronism with the carriage and equally spaced teeth 116 on the wheel intermittently interrupt light between the LED and phototransistor in each of the photointerrupter modules causing the modules to provide output pulses. Modules 94 and 96 are so located and the number of teeth 116 on disc 98 is such as to cause module 94 to produce a pulse (FIG. 10A) each time the carriage passes from one needle area of the bed to the next, and module 96 to produce pulses (FIG. 10B) which lead the pulses from module 94 by 90° when the carriage is moved in one direction (to the right) and which lag the pulses from module 94 by 90° when the carriage is moved in the other direction (to the left).

The liquid crystal display 66 (FIG. 4) is comprised of a background plane 118 and fourteen segments which may be turned on selectively to provide meaningful indications to an operator of the knitting machine. One such segment in the shape of the numeral two is located at the left end of the display, and another of the segments, formed as the unit integer is located next to it. Two segments, one in the shape of an arrow pointing upward and the other also in the shape of an arrow but pointing downward, are located at the right end of the display. Four vertically aligned rectangularly shaped elements which define three of the segments (the two centrally located elements being electrically connected to constitute one segment) are located next to the arrows, and seven segments, selected combinations of which can represent any number from zero to nine, are disposed between the three segments formed by the four vertically aligned rectangular elements and the single segment formed as the unit integer.

Figure 5:
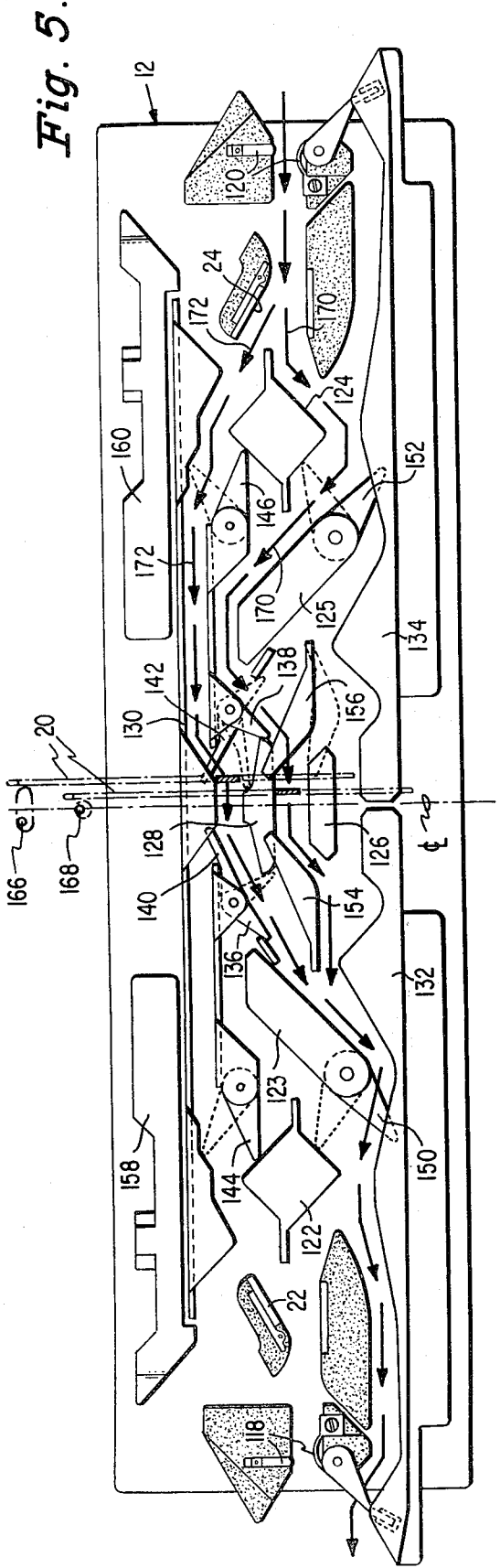
FIG. 5 is a somewhat diagrammatic bottom plan view of the carriage showing needle actuating cams arranged for fair-isle knitting.
Figure 6:
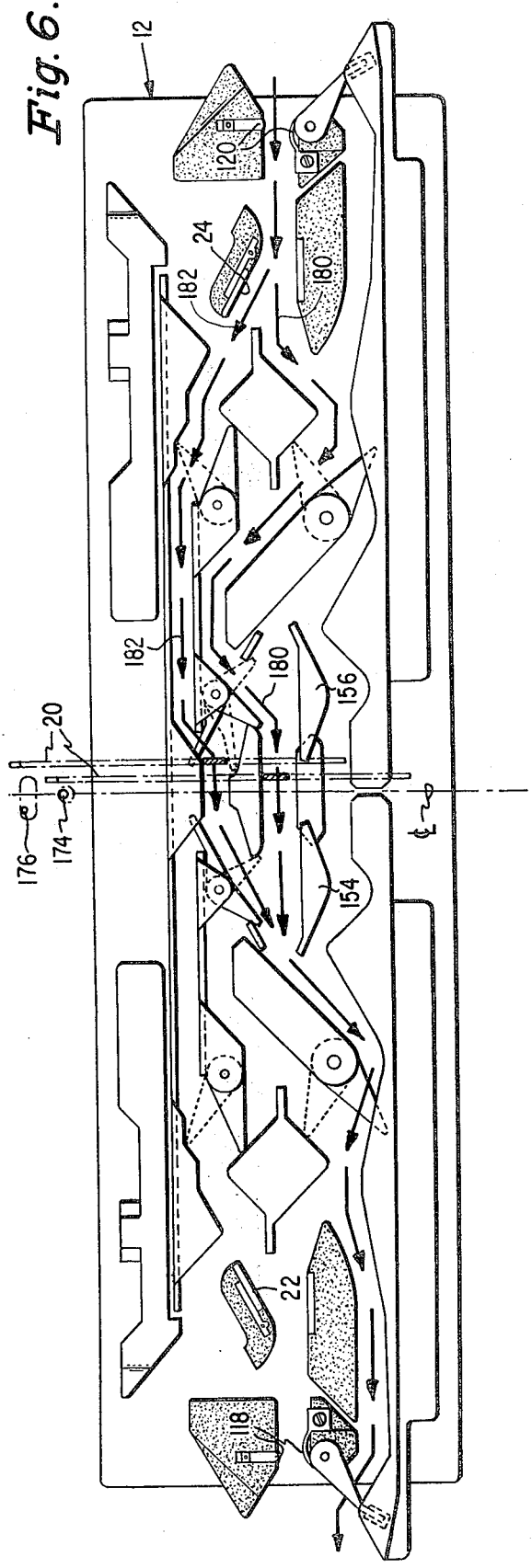
FIG. 6 is a view similar to FIG. 5 showing the camming arranged for punch-lace knitting.

Needle actuating camming is provided in conjunction with the left and right needle actuators 22 and 24, and left and right butt detectors 118 and 120 on the underside of the carriage 12 (FIGS. 5, 6 and 2). Such camming which is symmetrical about the transverse center line of the carriage includes fixed left and right separator cams 122 and 124, knit cams 123 and 125, fixed center cams 126 and 128, fixed upper elongated guide cam 130, fixed left and right elongated lower guide cams 132 and 134, free floating left and right check cams 136 and 138, spring biased left and right gate cams 140 and 142, left and right fair-isle gate cams 144 and 146 adjustable by cam lever 148, left and right knit-tuck gate cams 150 and 152 adjustable by the cam lever 148, left and right knit-in cams 154 and 156 also adjustable by cam lever 148, and russel cams 158 and 160 adjustable by cam levers 162 and 164 all as embodied in Model 321 of a home knitting machine sold by The Singer Co. under its registered trademark "Memo-Matic."

The camming is shown in FIG. 5 with the adjustable cams in positions enabling the camming in conjunction with suitably controlled actuators 22 and 24 to cause the needles 20 as the carriage traverses the bed of the machine to move in a well known manner suited for Fair-Isle knitting wherein two yarns 166 and 168 of different colors are knitted into a pattern. Alternate paths as selectively determined for the needles by the actuators pursuant to instructions specified by an operator of the machine prescribe the particular form of the pattern. The alternate paths for movement of the carriage 12 in the direction indicated as determinable by the one actuator 24 appear at 170 and one half.

In FIG. 6 the camming is shown with the adjustable cams disposed to enable the camming in conjunction with suitably controlled actuators 22 and 24 to cause the needles, as the carriage is moved back and forth on the bed, to knit Punch Lace, in a well known manner, into a pattern prescribed by the operator of the machine with a wool or synthetic yarn 174 and nylon thread 176. Alternate paths for needles through the camming in FIG. 6 as selectively determinable by actuator 24 during movement in one direction is shown at 180 and 182.

With the adjustable cams disposed for either Fair-Isle Knitting or Punch Lace knitting and with the actuators 22 and 24 out of action (i.e., in the absence of control signals to these devices) all needles are caused to follow one path through the camming as the carriage 12 is moved in one direction or another along the bed 10 (in FIG. 5, path 170 for the direction indicated; and in FIG. 6, path 180 which is the same as path 170). The needles in both instances are caused to move in the bed in the same way and Stockinet knitting is performed in a manner well known.

Figure 7:
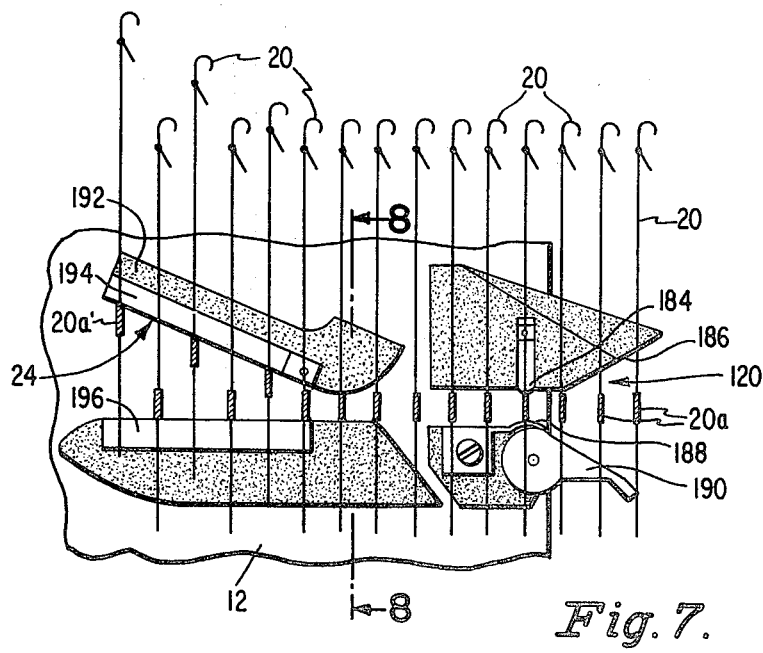
FIG. 7 is an enlarged somewhat schematic fragmentary bottom plan view of the carriage showing an electromagnetic needle actuator and associated needle-butt detector.

Butt detector 120 as may be best seen in FIG. 7 includes a contact element 184 mounted in a fixed cam 186 and another contact element 188 in the form of a spring which in addition to serving as a contact, functions as a biasing means for a side cam 190. The butts 20a of needles 20 passing between cams 186 and 190 successively bridge the gap between contact elements 184 and 188 thereby closing an open circuit between them and causing a signal to be transmitted to the computer 26. Butt detector 118 is similar to and functions in the same manner as butt detector 120.

The width of a fabric to be knitted is defined prior to knitting by an operator positioning those needles which are to be on the fabric in one or more positions on the bed as required for the knitting of the particular cloth such that they can be influenced by the camming in the carriage as it is moved back and forth across the bed, and positioning those needles at opposite end portions of the bed which are to be off the fabric in positions such that can not be acted upon by the camming in the carriage. For automatic pattern knitting the way in which the needles to be on the fabric are preliminarily disposed is always such that as the carriage is moved on the bed no more than two such needles in succession can pass by the leading butt detector before a needle butt enters the device and is detected. Therefore, regardless of the type of pattern knitting no more than three needle spaces can be traversed by the carriage without a signal from a butt detector before it is certain that the butt detector has reached the end of the fabric. The computer 26 takes note of the absence of three butt detector signals during automatic pattern knitting and causes the actuator to operate so as to cause needles, beginning with the first of a number of needles to enter the actuator 24 in advance of the first of the three needles missing the butt detector, to knit a plurality of like stitches as selvedge. Cam lever 148 (FIG. 2) which is used in adjusting the carriage camming for Punch Lace knitting closes a switch 191 when moved into its Punch lace position and causes a signal to be transmitted to the computer 26 effective to provide for the formation of selvedge with both the wool or synthetic yarn and thread (174 and 176 respectively in FIG. 6) used in this type of knitting rather than with the thread alone. One, two or three selvedge stitches as prescribed by the operator may be knit at each edge of the fabric with the machine as shown and described herein.

Figure 8:
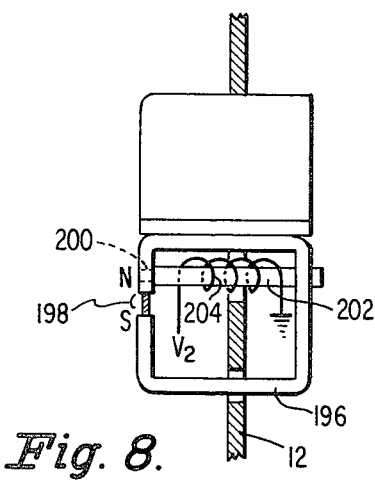
FIG. 8 is a view taken on the plane of the line 8—8 of FIG. 7.

Needle selector 24 (FIGS. 7 and 8) includes a permanent magnet 192 fastened against the upper limb 194 of a C-shaped channel of magnetic material having a lower limb 196. The upper and lower limbs 194 and 196 of the channel define a gap 198 which diverges toward the left as viewed in FIG. 7 and presents north and south magnetic poles as indicated. A hole 200 formed in the upper limb 194 adjacent the narrowest portion of the gap 198 reduces the strength of the upper or north pole of the opposed magnetic poles as developed by the permanent magnet 192. A magnetizable core 202 is attached to limb 194 and a coil 204 is provided about the core.

Needle butts 20a moving through the selector 24 are attracted in the narrowest part of gap 198 to the north pole on the upper limb 194 or the south pole on lower limb 196 depending upon whether or not coil 204 is energized. A deenergized coil causes a needle butt to be drawn to the lower or south pole against limb 196 and to thereafter continue along the limb because of the divergence of the poles. However an energized coil produces a strong electromagnetic pole on the core 202 at the upper limb 194 of the same polarity as that produced by the permanent magnet on such limb and causes a needle butt in the gap 198 to be drawn to the north pole against limb 194. The needle butt thereafter travels along limb 194 because of the divergence of the poles. Needle selector 22 is constructed and functions in the same manner as needle selector 24.

The knitting machine of the invention is programmed for pattern knitting with the OPK switch 50 in the P position. The card 28 may be used to instruct the machine concerning the pattern to be knit or instructions may be obtained from a pattern preprogrammed into computer 26 by the operator flipping a switch 206 on the computer. The computer may, if desired, be preprogrammed to include a plurality of different patterns each of which may be specified for reproduction upon the operation of an appropriate switch.

Marks in the design area of the card and in ellipses outside the design area define a pattern to be knitted. A preprinted card defining the pattern could be used to instruct the machine but if the operator wishes to prescribe a pattern not preprinted on a card or not stored in the computer he must mark the card 30 with a pencil or other marker (perferably one leaving an erasable mark) as required for the pattern desired.

An operator marks out a design configuration of his own for reproduction in a fabric, as for example the duck on the card in FIG. 3, by selectively darkening rectangles in the design area as shown. Boundaries for a unit design area to be repetitively reproduced each with the design configuration is specified by the operator darkening one of the size delineating ellipses 84 adjacent a selected numbered column and another one of the size delineating ellipses 86 adjacent a selected numbered row as in FIG. 3. If he inadvertently darkens more than one column aligned ellipse or more than one row aligned ellipse, only the one aligned with the lowest numbered column or row is given effect by the control electronics when the card is read. If no size delineating ellipse is darkened the ellipses adjacent column 36 and row 20 which are preprinted black serve to prescribe the boundaries of the unit design.

In addition to specifying a design configuration on the card and selecting size delineators, an operator may prescribe one, two or three wales to be knit as selvedge with like stitches by darkening one of the ellipses 88a, call for mirror imaging of the unit design horizontally or vertically or both by darkening one or both of the ellipses 88b, specify a two, three or four fold increase in the unit design horizontally by darkening one of the ellipses 88c, specify a two, three of four fold increase in the unit design vertically by darkening one of the ellipses 88d. The machine is capable of executing any combination of the instructions pertaining to mirror imaging, multiplication, or selvedge which are not inconsistent due to more than one of the ellipses 88a, 88c or 88d having been darkened.

Instructions on the card are imparted to the machine by feeding the card through the reader 30 with thumb wheel 90. The reader includes various light emitting diodes and phototransistors which are multiplexed into paired relationship as the card passes through the reader, and they serve to detect the presence of marks within the design area defining the design configuration and marks outside the design area whether imprinted on the card as in the case of strobe marks and the delineator marks adjacent row 21 and column 36, or marks added for the purpose of selecting one of the design options (selvedge, mirror imaging, multiplications).

Signals representing the instructions on the card pertaining to the pattern to be knitted as denoted by the marks in the rectangles and ellipses and detected by the reader in conjunction with associated circuitry are transmitted to the computer and retained in memory until recalled to control operation of the actuators 22 and 24 during the knitting of fabric. The manner in which the reader functions to detect markings reliably on the card and the manner in which the computer functions concerning such instructions and others is discussed in detail hereinafter. It is here merely noted that the reader is adapted to recognize reverse movements of the card and control the recording of signals in the computer accordingly so that it is not essential for an operator to painstakingly avoid all reverse movements while feeding a card through the reader, that the reader is further adapted to detect when a skewed card is fed into the reader, that the reader and computer are adapted to determine when a card is fed too fast through the reader for the accurate reading of instructions on the card, that the strobe markings on the card are arranged to maximize the permissable speed of the card, and that the reader and computer are adapted to determine the total number of dark marks on the card.

After the card has been read and while the machine is in the PROGRAM MODE an operator can:

1. Designate a particular needle (needle one) to form column 1 of the unit design on the program card;
2. Specify a motifing sequence;
3. Call for a reversal in the fabric of the left—right orientation of the unit design on the program card. Such instructions can be prescribed singly or in combination in varying order. Also, the operations specified in 2 and 3 above can, if desired, be performed prior to the reading of a card.

The overall position of the pattern in fabric to be knit on the machine is determined by the needle one selection. The designation is made by the operator moving the carriage 12 to a position wherein its transverse center line is in alignment with a needle to be selected and then momentarily depressing the needle one switch 52. A motifing sequencing is prescribed by the operator moving the carriage across portions of the needle bed with motifing switch 53 in its M- position, the effect of which is to schedule those needles traversed while the switch is so positioned to knit background only and nothing of the design configuration on the program card. By traversing needles with switch 53 in the M+ position, the operator may at any time void any of the selections made with the switch in the M- position. A reversal in the fabric of the left—right orientation of the unit design as it appears on the card is prescribed by the operator setting the left—right reversing switch in its reversing position.

While the machine is in the PROGRAM MODE, the operator can utilize switches on the carriage to prescribe mirror imaging and/or multiplication not called for on the program card, or to override and change such option or options specified on the card. Switch 54 may be so used for horizontal mirror imaging, switch 60 for vertical mirror imaging, switch 58 for horizontal multiplication and switch 56 for vertical multiplication. Switches 54 and 60 which may have been left in the option selecting position prior to the time the O.P.K. switch was moved to the P position must be moved out of that position and returned to it to effect a selection.

A momentary depression of switch 58 causes the display 66 to show, with an appropriate number of its rectangular elements, the horizontal multiplication factor in the computer at that time and continued depression of the switch causes the display to cycle through the multiplication factors. When the switch is released, the multiplication factor in view at the time is retained on the display and that factor is programmed into the computer. A momentary depression of switch 56 causes the display to show an up arrow, and with its rectangular elements the vertical multiplication factor then in effect. Continued depression of the switch causes cycling on the display of the vertical multiplication factors any one of which may be selected for the computer and retained on the display by the operator releasing the switch when the factor appears.

After the machine has been programmed the operator must before proceeding the knit fabric move the O.P.K. switch 50 into the K position to place the machine in the KNIT MODE. Assuming the machine was properly programmed the display 66 will be caused to show at least a 1 standing for row 1 on the design card and either the up or the down arrow when the switch is moved to the K position. If the machine was programmed for vertical mirror imaging the down arrow will show, otherwise the up arrow will be displayed. If the machine was programmed for vertical multiplication a single rectangle will also come into view, otherwise none appear.

Fabric is knit with the machine in the KNIT MODE by the operator moving the carriage back and forth across the bed to actuate the needles. The first course of fabric is knit pursuant to the instructions read from row 1 of the program card, and while the row is being knit the display shows the numeral 1 brought into view when the O.P.K. switch was moved into the K position. Thereafter, higher numbered rows on the card are knit sequentially without repetition up through the highest numbered row of the unit design as delineated on the card (row 15 in FIG. 3), provided the automatic and row repeat switch 54 is in its A position (normal position) and vertical multiplication was not prescribed. After the highest numbered row of the unit design has been knit the rows of the unit design are knit again beginning with row 1 unless vertical mirror imaging was programmed into the computer in which case the rows are knit downward from the highest numbered row of the unit design. After each new row is completed and the carriage has been reversed, as determined by the computer 26 in response to signals from the butt detectors 118 and 120, the display is updated to show the row being knit. The display shows a 1 C during movement of the carriage across the needle bed each time the transverse center line of carriage passes over the needle one position.

The operator can knit a design row out of sequence if he first selects the particular row he wishes to knit with the row advance switch 56 or row descent switch 58. These switches are so operable anytime the carriage is in the KNIT MODE provided the carriage is not in the midst of knitting a course of fabric. With the row advance switch depressed the display steps upwardly from the row showing, slowly at first and then more rapidly, and cycles through the unit design rows on the card. With the row descent switch depressed the display steps downwardly, initially at a slow pace, and then rapidly from the row showing, and cycles through the unit design rows. The operator selects the row he wishes to knit by releasing the row advance or row descent switch when the number of the row he wishes to knit appears. He can then knit the selected row by moving the carriage across the bed of the machine after which the unit design rows will again be knit sequentially as the operator continues to move the carriage on the machine reversing its direction at each end of the fabric, and the display will be updated accordingly to show the row being knit. A momentary depression of switch 56 or 58 causes the display to immediately step up or down one design course row.

The operator can cause a particular row to be knit repeatedly any number of times and the number of the row to be displayed during this process. This is accomplished by the operator moving the automatic and row repeat switch 54 into its R position and leaving it there until he has knit that row the desired number of times.

If vertical multiplication was perscribed, the machine knits each unit design row two, three or four times (as was specified for the multiplication factor) as the carriage 12 is moved back and forth across the bed 10, and the display is caused to show whether a row is being knit for the first, second, third or fourth time with a corresponding number of rectangles. The number of the particular design row being knit at any time is also in evidence on the display.

An operator can, by placing the design inversion switch 60 in the inverting position, reverse the design configuration and background of a unit design being knitted on the machine. He can, for example, change from knitting a black duck on a white background to knitting a white duck on a black background.

With the motifing switch 53 in an off position the unit design is knitted all across the fabric as the carriage is moved on the bed of the machine. However the operator may at any time, by placing the switch in the M+ or M− position, cause the motifing instructions (if any) prescribed in the PROGRAM MODE to be executed as the carriage is moved to knit fabric. With switch 53 placed in the M+ position and switch 60 in its inverting position design inversion is effected during knitting only in wales of the unit design. Design inversion is effected in all wales of the fabric with switch 53 in the M− position and switch 60 in its inverting position.

If selvedge stitches were prescribed on the program card, the number of wales designated for selvedge with no pattern are formed in fabric being knitted. If no selvedge was specified on the card and the operator wishes selvedge he may provide for it with switch 62, or if he wishes to change the number of wales of selvedge previously specified he may do so with this switch. Depression of switch 62 causes the number of wales (0, 1, 2 or 3) of selvedge in effect to appear on the display along with the up and the down arrow, and continued depression of the switch causes the display to slowly cycle through all the possible number of wales of selvedge. The operator selects a desired number of wales merely by moving the switch down until that number appears and then reversing it.

Various indications which may be caused to appear on the display 66 have already been mentioned. In addition the display is capable of indicating to the operator the occurrence of certain errors. If the check digit switch 63 is depressed at any time after a program card has been read either while the machine is in the PROGRAM MODE or in the KNIT MODE the display will show only the last digit of the total number of marks within the rectangles and ellipses which were detected by the reader as the card passed through it. A discrepancy between the number of such marks detected and the number on the card suggests to the operator that the card was misread, that he should make any corrections required, as for example, by erasing smudges or darkening some of the marks, and once again (with the machine in the PROGRAM MODE) feed the card through the reader.

When the operator switches the machine from the PROGRAM MODE to the KNIT MODE the letter E for error appears on the display if the program card was read too fast or moved through the reader in a skewed fashion. If the operator failed to make a needle one selection in the PROGRAM MODE, 1 E appears on the display when the O.P.K. switch is moved to the K position. Assuming the card was read properly, the display is caused to show 2 E when the machine is switch to the KNIT MODE if during the PROGRAM MODE an excessive number of design options for horizontal multiplication, vertical multiplication or for selvedge were prescribed. The actuators 22 and 24 will not operate and the machine can not knit patterns while any one of the error indications E, 1 E, or 2E is in evidence on the display. Pattern knitting is possible only after the error is corrected by reprogramming.

While the machine is in the KNIT MODE the display is caused to flash if the power supply drops below a predetermined value somewhat greater than that required to operate the needle actuators 22 and 24 pursuant to programmed instructions. If the power drops further to a value no longer sufficient to operate the needle actuators the display shows a 0.

The operator may switch the machine from the KNIT MODE into the PROGRAM MODE at any time and prescribe some or all new instructions for the knitting of fabric. A new card may be fed into the reader, and/or one or more of the switches effective in the PROGRAM MODE may be operated to prescribe new instructions. Feeding a new card through the reader has the effect of prescribing anew all of the kinds of instructions which may be specified on a card. Instructions previously prescribed by the left — right reverse switch 62 or motifing switch 53 are not affected by the reading of a new card. However, if the operator desires he may use these switches as hereinbefore described to change such instructions. If a new card is fed through the reader or the operator changes the left — right multiplication instructions, left — right reverse instructions left — left— right mirror imaging instructions, the old needle one selection is voided and needle one must be reselected. To reselect the old needle one, the operator need only move the transverse center line of the carriage across that needle while in the PROGRAM MODE. To select a new needle 1 he must align the transverse center line of the carriage with the needle to be selected and momentarily depress the needle one switch 52.

A simplified system block diagram of the electrical control portion of the subject knitting machine is shown in FIG. 11 wherein the carriage 12, described hereinabove in conjunction with FIG. 3 is shown in block diagram form. The programmed minicomputer 26, which is described hereinbelow in detail, interacts with the carriage 12 by means of an input-output box 34 (hereinafter referred to as the I/O box 34), bus 506, bus 508, bus 510, bus 512 and bus 514.

Signals generated at the carriage 12, such as by manipulation of the various switches, operation of the card reader 30 and/or by movement of the carriage 12 as described supra, are applied to the programmed minicomputer 26 by way of the bus 506, I/O box 34 and bus 508. As is described hereinbelow in detail, one or more of these signals may be modified within the I/O box 34 before being applied to the programmed computer 26. Not all inputs to the minicomputer 26 originate on the carriage. For example, an oscillator (not shown) located within the I/O box 34 provides a real time clock signal for the computer 26 on the bus 510 as will be apparent to those skilled in the art. However, the oscillator can just as well be located in the carriage 12. The signals generated by the computer 26 for controlling the subject knitting machine are applied to the various components of the carriage 12, such as the display 66, card reader 30, actuators 22 and 24 and the like, by way of the bus 512, I/O box 34 and bus 514. As is described hereinbelow in detail, various ones of these signals are acted upon or modified within the I/O box 34.

Before considering the programmed computer 26 in more detail, it will be beneficial to consider the various signals supplied to and provided by the computer 26.

Figure 9:
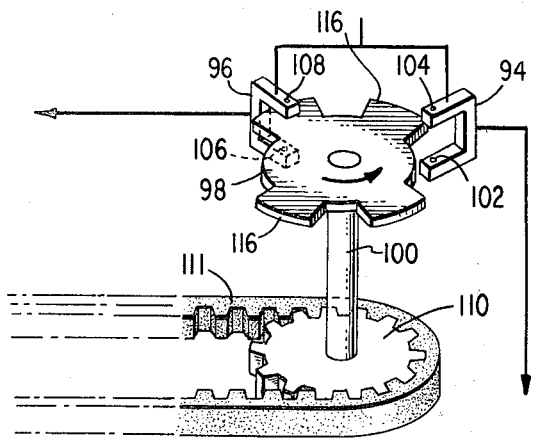
FIG. 9 is a schematic view in perspective of the pulse generator of the machine.
Figure 10:
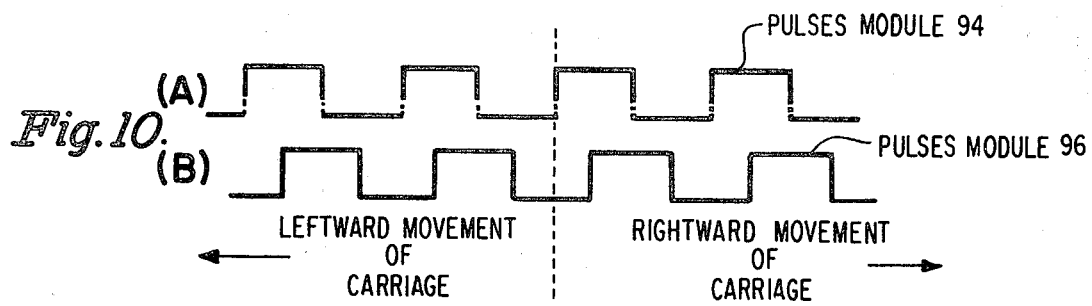
FIG. 10 (A and B) are diagrams showing the signal outputs of components of the pulse generator.

As described supra in conjunction with FIGS. 9 and 10 photo-interrupter modules 94 and 96 provide two carriage position indicating signals in quadrature. Hereinafter the signal provided by module 94 will be referred to as PIP A and the signal provided by module 96 will be referred to as PIP B. As discussed above, these signals go through a complete cycle as the carriage 12 traverse each needle position 20. The programmed computer 26 in conjunction with circuits in the I/O box 34 utilizes these PIPer signals A and B to monitor the carriage 12 position on the needle bed 10 and to time the firing of the actuators 22 and 24 (FIG.

2). For example, as the carriage 12 is moved from left to right PIP A will go low while PIP B is high (FIG. 10). The programmed computer 26 senses these conditions to increment an up down counter or register (not shown) located therein to keep track of the carriage 12 location on the needle bed 10. Conversely, when the carriage is moved from right to left PIP A will go high while PIP B is high as shown by a perusal of FIG. 10. The programmed computer 26 will sense these conditions to decrement the counter or register (not shown) within the computer 26. When the subject knitting apparatus is first turned on, the computer 26 will assign the number zero to the then current carriage position and then increment or decrement this count as the carriage is moved to the right or left to keep track of the location of the carriage 12 on the needle bed 10 at all times. Incrementing or decrementing, i.e., updating of the carriage 12 position counter (not shown) within the computer 26 takes place when PIP A undergoes a transition and PIP B is low. Once the carriage 12 position counter (not shown) has been updated, the programmed computer 26 will determine if an actuator 22 or 24 is to be fired when the carriage 12 is in the current position on the needle bed 10. An actuator 22 or 24 is fired only when PIP B is high and PIP A undergoes a transition from high to low or low to high. To insure proper operation when patterning data is entered and when needle one is designated, it is necessary to adjust the position of the photo-interrupter modules 94 and 96 so that the carriage position counter (not shown) updates occur when the carriage 12 center is over a sinker; i.e., when the carriage 12 center is halfway between needle positions.

As described above, knitting design information is entered into the computer 26 by means of the card reader 30. As described above in conjunction with FIG. 3 strobe channels A and B are located at opposite sides of the program card 28. For purposes of clarity, those strobe channels are illustrated in FIG. 12D as being adjacent a single information row on the program card 28 in order to show their phase relationship and their location with respect to the various columns of information on the program card 28. As shown in FIG. 12D the strobe channels A and B comprise alternating black and white (card background) portions with the first black segment in strobe channel A being of extended length. Like the PIPer signals A and B discussed above, the strobe channels A and B are in quadrature; i.e., 90° out of phase. Additionally, one complete strobe cycle is associated with each of the columns on the program card 28.

When moving from right to left as seen in FIG. 12D, strobe A will go from black to white while strobe B is black. Conversely, when moving from left to right, strobe A will go from white to black while strobe B is black. The programmed computer 26 can sense these changes to determine whether the program card 28 is passing through the card reader 30 or being withdrawn therefrom. In accordance with the present invention, as strobe A goes from black to white while strobe B is black the program card 28 information in the associated information column is read and a column count register (not shown) or a column up-down counter (not shown) within the computer 26 is incremented. Conversely, when strobe A goes from white to black while strobe B is black, the column count is decremented and no column information is read. The program card 28 information read time occurs during the white portion of strobe A. As illustrated in FIG. 12D, strobe A goes white over the far right hand portion of column one and extends well over the left portion of column two. Because the strobe A and B sensing devices are located to the right of the card information sensing devices, as is described below in conjunction with FIG. 12A, the information sensing devices will be located in the left portion of column one when strobe A first goes from black to white and will be located in the right portion of column one when strobe A subsequently goes from white to black. The same is true of the remaining columns of the program card.

Figure 12A:
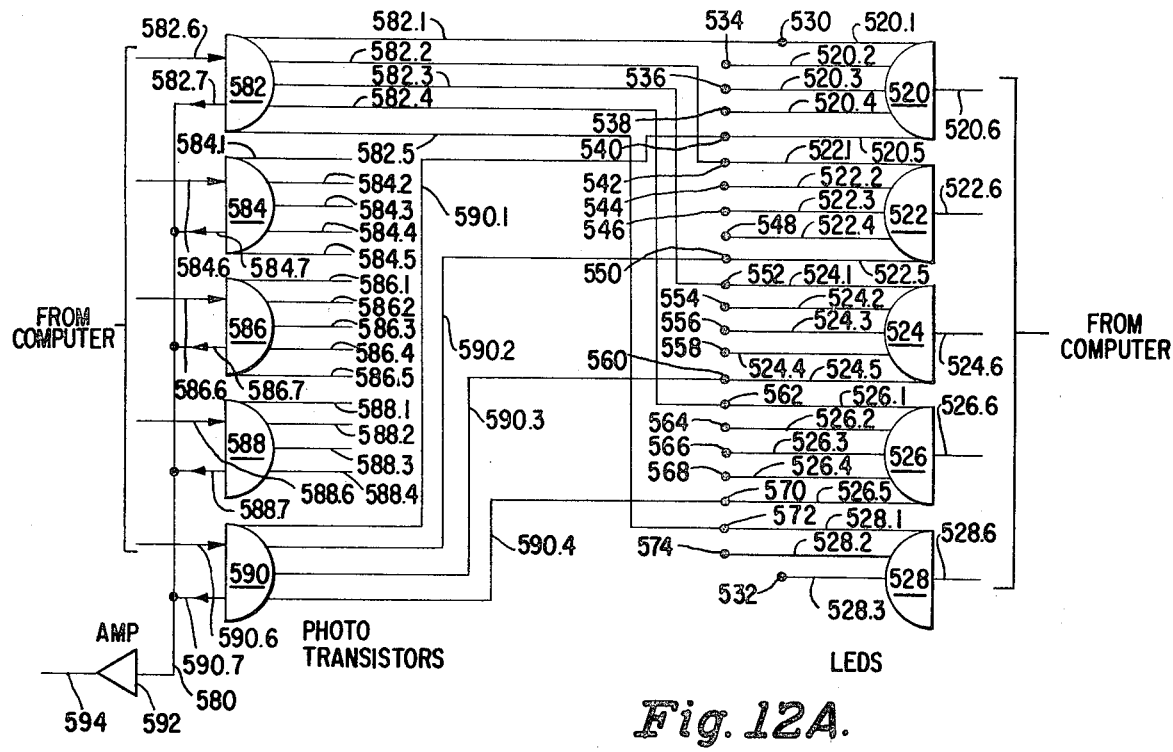
FIG. 12 (A, B and C) are circuit diagrams showing electronic components of the card reader of the machine.
FIG. 12D is a schematic representation indicating the location on the program card of strobe signals with respect to ruled columns in the design area of the card.
Figure 12B:
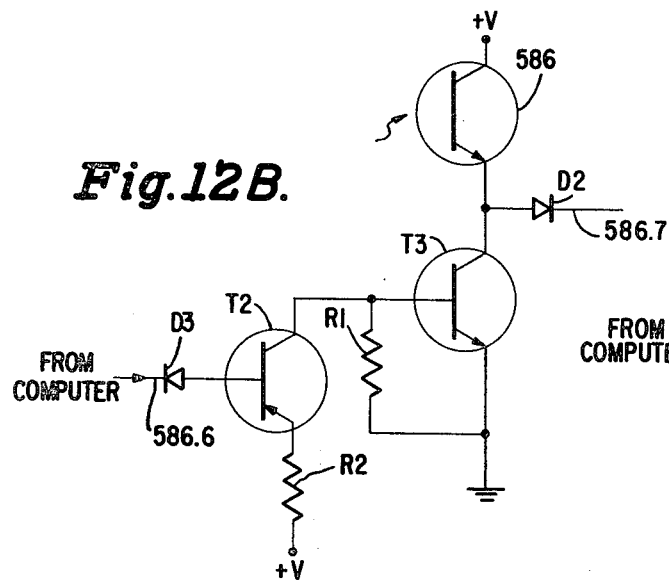

The electrical portion of the card reader 30 is illustrated in FIG. 12A as including twenty-one design information reading stations 534 – 574 corresponding to the 21 rows on the program card 28. As will be apparent, more or less than the 21 design information reading stations 534 – 574 can be utilized depending upon the layout of the program card 28. Located above the offset to the right of the design information reading stations 534 – 574 is a strobe B reading station 530, while located below the information reading stations and offset to the right is a strobe A reading station 532. The 23 illustrated reading stations 530 – 574 are activated by means of five light emitting diodes 520, 522, 524, 526 and 528 and five phototransistors 582, 584, 586, 588 and 590 which are interconnected by means of a plurality of light pipes to form a matrix.

Any one of the light emitting diodes (LED's) 520, 522, 524, 526 and 528 can be enabled by means of a signal supplied by the computer 26 appearing on leads 520.6, 522.6, 524.6, 526.6 or 528.6, respectively. each of the first four of the light emitting diodes 520, 522, 524 and 527 are coupled to five consecutive reading stations by means of light pipes. For example, light emitting diode 520 is coupled to the first five reading stations 530 (strobe B), 534, 536, 538 and 540 by means of the light pipes 520.1, 520.2, 520.3, 520.4 and 520.5. The next light emitting diode 522 is coupled to the next five reading stations 542, 544 546, 548 and 550 by means of the light pipes 522.1, 522.2, 522.3, 522.4 and 522.5, respectively. The next two light emitting diodes 524 and 526 are connected to five consecutive reading stations in a like manner. Since a total of 23 reading stations are utilized, only three reading stations 572, 574 and 532 (strobe A) are associated with the fifth light emitting diode 528.

Any one of the phototransistors 582, 584, 586, 588 and 590 can be enabled by means of a signal supplied by the computer 26 appearing on leads 582.6, 584.6, 586.6, 588.6, or 590.6, respectively. The output signal from each phototransistor 582, 584, 586, 588 and 590 appearing on leads 582.7, 584.7, 586.7, 588.7, and 590.7 respectively, is connected to a common output lead 580, amplified by an amplifier 592 and applied to a comparator 596 (FIG. 13) by way of lead 594. Each of the phototransistors is coupled to a corresponding one of the five reading stations associated with each of the first four light emitting diodes 520, 522, 524 and 526 by means of a plurality of light pipes. For example, the first phototransistor 582 is coupled to the first reading station 530 (strobe B) associated with the light emitting diode 520, the first reading station 542 associated with the light emitting diode 522, the first reading station 522 associated with the light emitting diode 524, the first reading station 562 associated with the light emitting diode 526 and the first reading station 572 associated with the light emitting diode 528 by means of the light pipes 582.1, 582.2, 582,3, 582.4, and 582.5 respectively. In a like manner the second phototransistor 584 is coupled to the second reading station 534, 544, 554, 564, and 574 of each of the light emitting diodes 520, 522, 524, 526, and 528 respectively; with the third phototransistor 586 being coupled to the third reading station 536, 546, 556, 566 and 532 (strobe B) associated with each light emitting diode; the fourth phototransistor 588 being coupled to the fourth reading station 538, 548, 558 and 568 of the first four light emitting diodes and the fifth phototransistor 590 being coupled to the fifth reading station 540, 550, 560, 570 associated with the first four light emitting diodes. Since light emitting diode 528 has only three reading stations associated therewith, phototransistors 588 and 590 are not coupled thereto. For purposes of clarity in the drawing, the coupling of the light pipes to the appropriate reading stations for the second, third and fourth phototransistors 584, 586 and 588 is not illustrated.

As will be apparent, enabling one of the phototransistors 582, 584, 586, 588 or 590 and enabling one of the light emitting diodes 520, 522, 524, 526 and 528 will result in only one of the reading stations 530 – 574 being read out. For example, enabling phototransistor 590 and light emitting diode 522 will cause a read out from reading station 550 while enabling phototransistor 590 and light emitting diode 526 will cause a read out from reading station 570. In accordance with the present invention, the strobe channels B and A on the program card will be sequentially sampled under control of the computer 26 by sequentially enabling phototransistor 582 — light emitting diode 520 and phototransistor 586 — light emitting diode 528. When design information is read out, the information reading stations 534 – 574 will be enabled in sequence under control of the computer 26 during the time that strobe A is white. As will now be apparent, operation of the reader causes a serial data train to appear on the output lead 594.

Before describing the computer 26 controlled card reader 30 in more detail, the digital adapter shown in FIG. 13 will be considered. The adapter includes a comparator 596 the output of which is coupled to the computer 26 by way of a lead 612. One input to the comparator 596 appears on the lead 598 as the output of a non-linear digital to analog conversion unit 600. The other input to the comparator 596 is the serial output from the phototransistors 582, 584, 586, 588 and 590 of FIG. 12A appearing on lead 594. The input to the digital to analog conversion unit 600 is a five bit binary number supplied by the computer 26 on leads 602, 604, 606, 608 and 610. In one embodiment of the present invention the digital to analog conversion unit 600 used a first digital to analog converter 603, the output of which was fed to the multiplying or scaling input 609 of a second analog converter 605 to produce a quadratic output input dependence. Furthermore, the original linear output of the first converter 603, the quadratic output of the second converter 605, and a constant voltage 611 were then summed in a suitable device 607 to give a parabolic approximation to the desired exponential dependence of the analog output to the digital input. In accordance with one embodiment of the present invention which was constructed, the digital to analog converters 603 and 605 were Motorola MC 1408 digital to analog converters.

The operation of the comparator 596 is such that a voltage level on lead 594 which is greater than that appearing on lead 598 causes the output on lead 612 to be low. However, as the voltage level appearing on lead 598 increases, such as by increasing the value of the binary number applied to the digital to analog conversion unit 600, the output on output lead 612 will go high when the voltage level on the lead 598 exceeds that appearing on lead 594. When this occurs, the computer 26 will store the current binary number. Any potential level thereafter appearing on lead 594 can be compared to this digitized value by applying this stored binary number produced by the previous level to the digital to analog conversion unit 600 and monitoring the output level on lead 612 which will indicate whether the current voltage level on lead 594 is greater or less than the previous level. The function of the digital adapter shown in FIG. 13 will become apparent from the description of the program card reader hereinbelow.

As is known to those skilled in the art, the input-output function of a digital to analog converter is linear. In one embodiment of the present invention, as described above, the input-output function was caused to be parabolic as a simple approximation to a preferable exponential function.

Briefly described, the opposite strobe channels A and B of the program card 28 are utilized by the card reader 30, under control of the computer 26, to determine the position of the program card within the card reader. Initially, however, when the program card is first entered into the card reader 30, two of the information channel reading stations are used to detect the presence of the program card edge. Two spaced apart reading stations are utilized to insure that the program card is properly located within the card reader before the card is adapted. Once the card edge is sensed, the computer 26, by means of the digital adapter of FIG. 13, will measure and record the signal level at the strobe A reading station 532, which is over the white border of the program card due to the strobe A reading station 532 being located to the right of the information reading stations 534 – 574 (FIG. 12A), i.e., located closer to the card entry location of the card reader than the information reading stations. The program card is printed such that when the extended length black portion (FIG. 12D) of strobe channel A is detected, the information channel reading stations 534 – 574 and strobe channel B reading station 530 are located over the white border of the program card (FIG. 3). The computer 26 by means of the digital adapter of FIG. 13, will measure and record the signal level for each information channel 534 – 574 and strobe B at the white border of the program card. Before being stored, each digital value is appropriately decreased to prevent smudges and erasures from being read as black marks. As the program card advances into the card reader 30, the computer 26 keeps track of the number of columns on the program card passing the information reading stations 534 – 574. Each time strobe A changes from black to white (FIG. 12D) the column count is incremented by the computer 26 and the information in each information row is read out in sequence and applied to the digital adapter of FIG. 13. If the reading from an information channel is sufficiently lower than the border reading previously recorded, the reading is recorded within the computer 26 as black; if not, it is recorded as white. Light smudges are thus read as white. The program card 28 is considered to have been read without error if all columns of information are read and stored in the computer 26 before the program card 28 is withdrawn from the card reader.

More specifically, when the subject knitting apparatus is placed into the PROGRAM MODE, a computer 26 selected reading station 574 (FIG. 12A) corresponding to row zero on the program card is enabled to read the "black" platen of the card reader 30. The platen is fabricated with depressions and/or coated to minimize the signals produced. The computer 26 will vary the binary number applied to the digital to analog conversion unit 600 (FIG. 13) until the voltage level on lead 598 to the comparator 596 equals that appearing on lead 594 supplied by information reading station 574. To insure that false background noise does not provide an erroneous indication, this binary number is increased by two. For example, if a binary number of twenty is equivalent to the voltage level appearing on lead 594, the binary 20 is increased to binary 22 by the computer 26 to decrease the threshold sensitivity and binary 22 is stored within the computer 26. This process is repeated at information reading station 534 corresponding to row twenty on the program card 28. The computer 26 will then maintain reading station 574 enabled and the input to the digital to analog conversion unit 600 at the digitized value, i.e. a binary 22. Referring now to FIG. 12A, a program card 28 placed into the card reader will approach the reading stations 530–574 moving from right to left. When the edge of the card reaches the reading station 574 corresponding to information row zero on the program card, the voltage level appearing on lead 594 to the comparator will greatly increase, due to the white background of the program card 28, thereby changing the output level appearing on the lead 612 to the computer 26. This level change is recognized by the computer 26 as the program card 28 edge at the information reading station 574. The computer 26 then enables reading station 534 and applies its adapted digitized number to the digital to analog conversion unit 600. Detection of the edge of the program card 28 at reading station 534 is interpreted by the computer 26 as meaning that the program card 28 is properly located within the card reader 30 and the next step in reading of the program card can commence.

Since the strobe A and B reading stations 532 and 530, respectively, are offset to the right, as shown in FIG. 12A, they are now well over the white border portion of the program card. The computer 26 will now enable the strobe A reading station 532 by enabling light emitting diode 528 and phototransistor 586. The white background of the program card 28 adjacent to strobe A produces a corresponding voltage level on lead 594. The digital equivalent of this analog voltage level is determined as described above. The resulting digital number is decreased by two to make it slightly more difficult to see black; i.e., decreasing the threshold sensitivity of strobe channel A. The resulting binary number is stored in the computer 26. Strobe channel A has now been adapted. When monitoring strobe channel A, the stored binary number is recalled and applied to the comparator 596 lead 598 after conversion by the digital to analog conversion unit 600. A voltage level on lead 594 to the comparator 596 from strobe A reading station 532 produces a level output on lead 612 recognized by the computer 26 as "white" if the voltage level on lead 594 is greater than the level appearing on lead 598 and is recognized by the computer 26 as "black" if it is less due to the resulting different level output on lead 612 (FIG. 13). The Strobe A reading station 532 remains active under control of the computer 26 until strobe A becomes black and this is sensed as described above. This corresponds to the left portion of the extended length black portion of strobe A (FIG. 12D) appearing at the reading station 532. At this time the computer 26 will check reading station 574 corresponding to row zero of the program card. If the reading is black, the program card 28 has been pulled out of the card reader 30 and the whole process will begin again. However, if the reading is white, the card is moving into the card reader and all the remaining reading stations 532 – 574 are well over the white border portion of the program card. The computer 26 will now sequentially adapt each information row on the program card, and strobe channel B in a manner as described above. Once this has been completed, the computer 26 will have stored therein the threshold adjusted adapted binary numbers for each strobe and information channel on the program card 28 which were obtained as discussed above. As described, these stored numbers are recalled by the computer 26 and applied to the adapter apparatus shown in FIG. 13 to read a particular row information as black or white.

The computer 26 will now monitor strobe channels A and B by sequentially enabling strobe reading stations 532 and 530 and determining whether they are black or white. When strobe A goes white (see FIG. 12D) the computer 26 will check if strobe B is also white. If it is, the computer 502 will recognize that the program card 28 is being pulled out of the card reader 30. If strobe B is black, however, the program card 28 is continuing through the card reader 30 and the computer 26 will increment the column count therein by one and begin to read the rows of information contained in the first column. This is done by the computer sequentially enabling the information reading stations 534 – 574 by enabling the appropriate light emitting diodes 520 – 528 and phototransistors 582–590. The stored adapted binary number for each channel is sequentially recalled to the digital to analog conversion unit 600 and compared with the voltage level on lead 594 to determine whether the information is white or black. The data from each row in each column is stored in a memory (not shown) contained within the computer 26. The location of each row being read in the column is controlled by the computer 26 maintaining a row count therein.

After all the rows in the first column have been read and stored in the computer 26, the computer 26 will check strobe A; if it is white the column read is considered valid. If column A is black, however, the card 28 may have been traveling too fast through the card reader 30 (see FIG. 12D) and a flag is set by the computer 26 to abort the column read. This results in an error indication appearing on the display 66 at the conclusion of the card read operation as described above when appropriate switches are depressed. If the column read is successful, the computer 26 will continue to monitor strobe channels A and B. When strobe A goes white while strobe B is black, the column count will be incremented and the rows of information read and stored as described above. This process will continue until all of the columns of the program card 28 have been read. This will be recognized by the computer 26 by the column count therein being equal to the number of columns on the program card 28. During the reading of the last column on the program card 28, the computer 26 will check for any ambiguities that may be present in the design options selected. For example, only one of the horizontal magnification options can be selected at one time. Additionally, should an operator attempt to place the subject knitting apparatus into the knitting mode while a program card is being read, the computer 26 will recognize this error and cause an error indication to appear on the display 66 as well as turning off the left and right actuators 22 and 24.

Figure 12C:
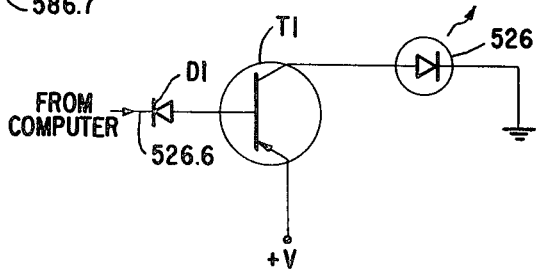
Figure 12D:
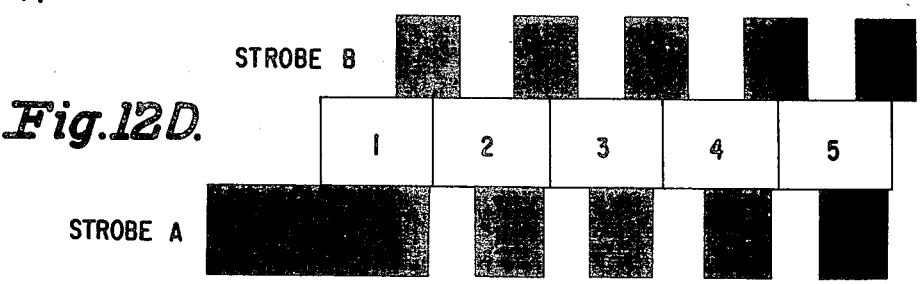

A typical circuit for the light emitting diodes 520, 522, 524, 526 and 528 of FIG. 12A is shown in FIG. 12C wherein light emitting diode 526 is illustrated as being coupled between ground potential and the collector of a PNP transistor T1. Transistor T1 has its emitter coupled to a positive source of potential and its base coupled to the computer 26 controlled input lead 526.6 by means of a diode D1. In the absence of a negative potential on lead 526.6 from the computer 26, transistor T1 is nonconducting and light emitting diode 526 is disabled. The presence of a negative potential on lead 526.6 from the computer 26, however, causes transistor T1 to conduct which in turn enables the light emitting diode 526.

A typical circuit for the photo transistors 582, 584, 586, 588 and 590 of FIG. 12A is shown in FIG. 12B wherein phototransistor 586 is illustrated as having its collector coupled to a source of positive potential and its emitter coupled to ground potential by way of the collector-emitter of NPN transistor T3. The output of phototransistor 586 is coupled to the output lead 586.7 by means of a diode D2. The base of transistor T3 is coupled to ground by means of a resistor R1 and to the collector of a PNP transistor T2 which has its emitter coupled to a source of positive potential by way of a resistor R2 and its base coupled to the computer 26 controlled input lead 586.6 by way of a diode D3. In the presence of a negative potential on lead 586.6 from the computer 26, transistor T2 is conducting, which causes transistor T3 to be conducting, thereby back biasing diode D2 and passing any output from phototransistor 586 to ground. Accordingly, no signal will appear on output lead 586.7. In the absence of a negative potential on input lead 586.6 from the computer 26, however, transistor T2 will not conduct thereby rendering transistor T3 nonconducting such that diode D2 is no longer back biased and any output from the phototransistor 586 now appears on output lead 586.7 by way of the diode D2.

As described hereinabove, the location of each edge of a garment in the subject knitting apparatus is detected by means of butt detectors 118 and 120 (FIGS. 2,5,6, and 7). Electric circuitry located in the I/O box 34 and associated with the butt detector 120 is illustrated in FIG. 14A as including a first flip-flop FF1 which is coupled to the butt switch contacts by means of a lead 624. The input of a second flip-flop FF2 is coupled to the output of the first flip-flop FF1 by way of a lead 662 and the output of the second flip-flop FF2 is coupled to the programmed computer 26 by way of a lead 626. A clock signal is applied to each of the flip-flops FF1 and FF2 by means of a lead 620. Each of the flip-flops FF1 and FF2 may be a well known D type flip-flop. The clock signal on lead 620 is illustrated in FIG. 14B as the waveshape 628 and is obtained by AND gating the PIP B signal and an inverted PIP A signal when going from left to right. The time occurrence of signals resulting from actuation of the butt switch 120 is illustrated in FIG. 14B by the vertical dashed lines 630. As shown the clock signal becomes high sometime after the butt switch 120 actuation position is passed and will become low before a needle 20 can again contact the butt switch 120 at the next position.

Referring now to FIGS. 14A and 14B and assuming that the carriage 12 is moving from left to right, prior to detecting the edge of a garment in the knitting apparatus no signals appear on lead 624 so that both flip-flops FF1 and FF2 are reset by the first positive occurring clock signal 628. The resulting low output on lead 626 from the second flip-flop FF2 is recognized by the computer 26 as indicating that the edge of the garment has not yet been reached. When the edge of the garment is reached, a needle 20 butt will actuate the butt switch 120 causing a signal to appear on lead 624 that sets flip-flop FF1. The next positive occcurring signal 628 will reset flip-flop FF1 which results in flip-flop FF2 being set thereby changing the output level on lead 626 from low to high. The computer 26 recognizes this level change as the edge of the garment being reached. A needle 20 in the next position will again cause the flip-flop FF1 to be set. The next positive clock signal 628 will again reset flip-flop FF1 and keep flip-flop FF2 set. The occurrence of a vacant needle position will result in flip-flop FF1 being reset when the next positive clock signal occurs which results in flip-flop FF2 being reset thereby changing the level on output lead 626 from high to low. The computer 26, however, will recognize the other edge of the garment as having been reached only upon three consecutive vacant needle positions being passed.

The circuitry for the other butt switch 118 for carriage travel from right to left is identical to that shown in FIGS. 14A and 14B with the exception that the reset signal is obtained by AND gating the PIP A and PIP B signals.

In order to give an indication to the computer 26 that electrical power is low or that electrical power is about to fail so that the computer 26 can take the necessary shut down steps or procedure, voltage level detecting circuits are located within the I/O box 34. One such circuit is illustrated in FIG. 18 as including a comparator 634 the output of which is coupled to the computer 26 by way of a lead 636. One input to the comparator on lead 642 is provided by a voltage reference 638, which may comprise a battery. The other input to the comparator 634 on lead 640 comprises an operating D.C. voltage the level of which is to be monitored by the comparator 634. As long as the potential on lead 640 is greater than the reference source 638, the potential on the output lead 636 is high which the computer 26 interprets as meaning that the operating potential on lead 640 is satisfactory. If the potential on lead 640 falls below that of the reference 638, output lead 636 goes low which is interpreted by the computer 26 as meaning that the monitored operating potential is unsatisfactory. For example, in one circuit the reference 638 magnitude is such that a lesser magnitude on lead 640 is interpreted by the computer 26 as meaning the monitored voltage level is low; in another circuit, however, the reference magnitude is even less such that a lesser magnitude on lead 640 is interpreted by the computer 26 as meaning that the monitored voltage source is about to fail. As will now be apparent, a separate comparator circuit is utilized for each operating voltage that is to be monitored, and the magnitude of the reference source 638 with respect to the desired magnitude of the monitored source is such as to indicate a low voltage condition or an impending power failure condition.

In accordance with one embodiment of the present invention which was constructed, the display 66 described hereinabove utilized liquid crystal elements. When a particular character or segment is to be displayed, the computer 26 will provide an enabling D.C. potential on an appropriate lead to the selected character or segment. As is apparent to those skilled in the art, a D.C. operating potential will ruin a liquid crystal display device in a relatively short time. In order to overcome this shortcoming, each liquid crystal display enabling signal provided by the computer 26 is converted into an AC signal. This is accomplished by the Exclusive OR circuit shown in FIG. 15A. There is an equivalent Exclusive OR circuit for each segment or character of the display and the circuits are located in the I/O box 34. One input to the Exclusive OR gate 646 appearing on input lead 652 is the liquid crystal enabling signal supplied by the computer 26. This signal is shown in FIG. 15C by waveshape 654. The other input to the Exclusive OR gate 646 on lead 650 is the oscillator (not shown) signal supplied to the computer 26 as a real time clock. This signal is shown in FIG. 15C by waveshape 656 and is also supplied to one side of each liquid crystal character, or segment. This is shown in FIG. 15B wherein the oscillator signal 656 is applied to one side of a liquid crystal device 662 by way of lead 660. The output of the Exclusive OR gate 646 appears on lead 648 and is applied to the other side of the selected character or segment of the display 66 as shown in FIG. 15B. The output of the Exclusive OR gate 646 is shown as waveshape 658 in FIG. 15C. Referring now to FIGS. 15A, 15C and 15B, when the output 654 on lead 652 from the computer 26 is low, the oscillator signal 656 provides the only high input to the Exclusive OR gate 646. The output signal 658 on lead 648 for this condition is identical to the input signal 656 on lead 650 so that the signals on each input lead 660 and 648 to the liquid crystal device 662 are the same and the liquid crystal 662 is not turned on. When the computer 26 supplied signal 654 goes high, however, the Exclusive OR gate output 658 will go high only when the oscillator signal 656 is low. Accordingly, for this condition, the output signal 658 is one hundred and eighty degrees out of phase with the oscillator signal 656 such that an AC signal now appears across the liquid crystal device 662 for the duration of time that signal 654 is high thereby turning the liquid crystal device on for this time period.

Figure 16A:
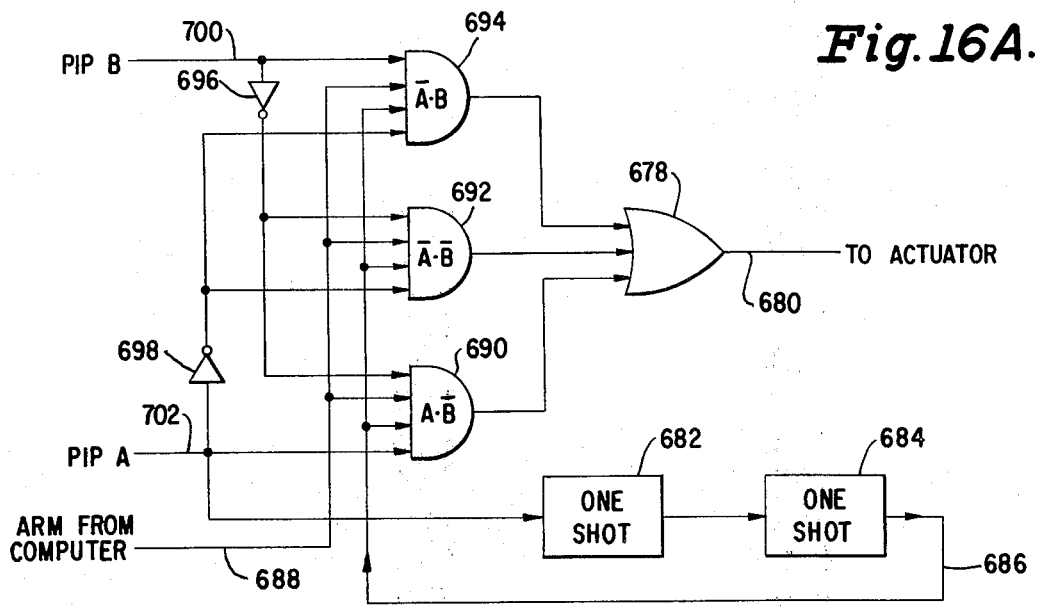
FIG. 16A is a diagram showing actuator duty cycle and time-out circuitry.
Figure 16B:
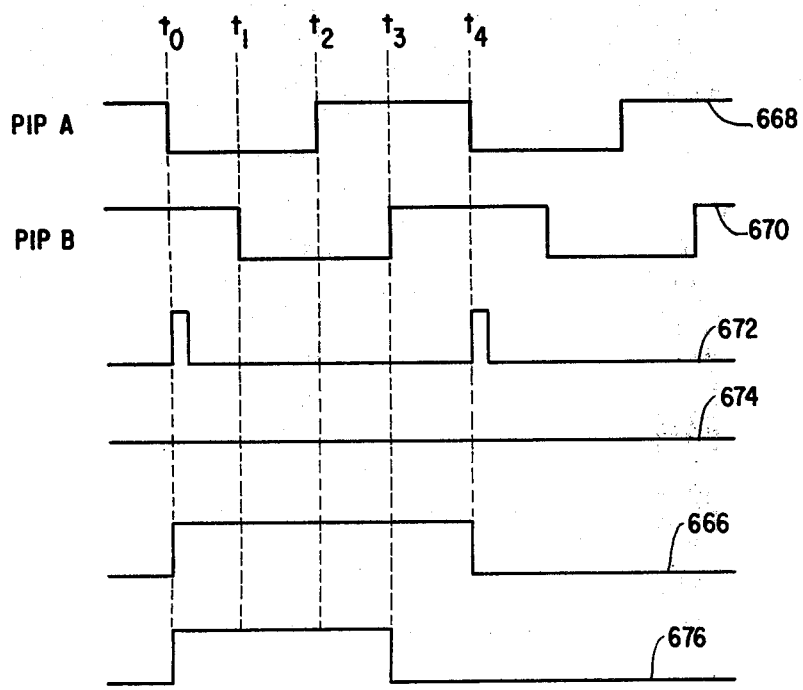
FIG. 16B is a wave shape diagram illustrating the operation of the circuitry of FIG. 16A.
Figure 21:
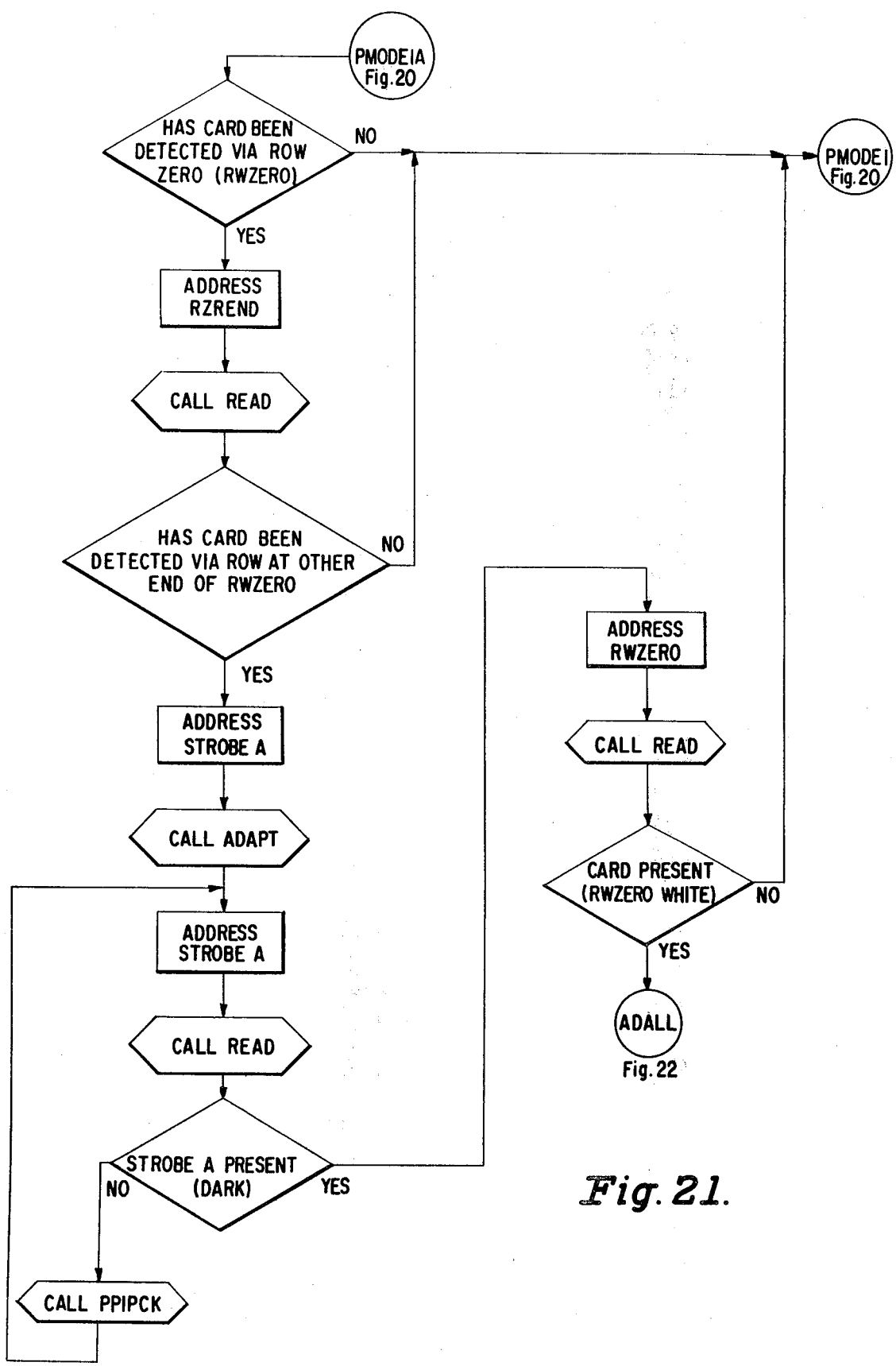
Figure 22:
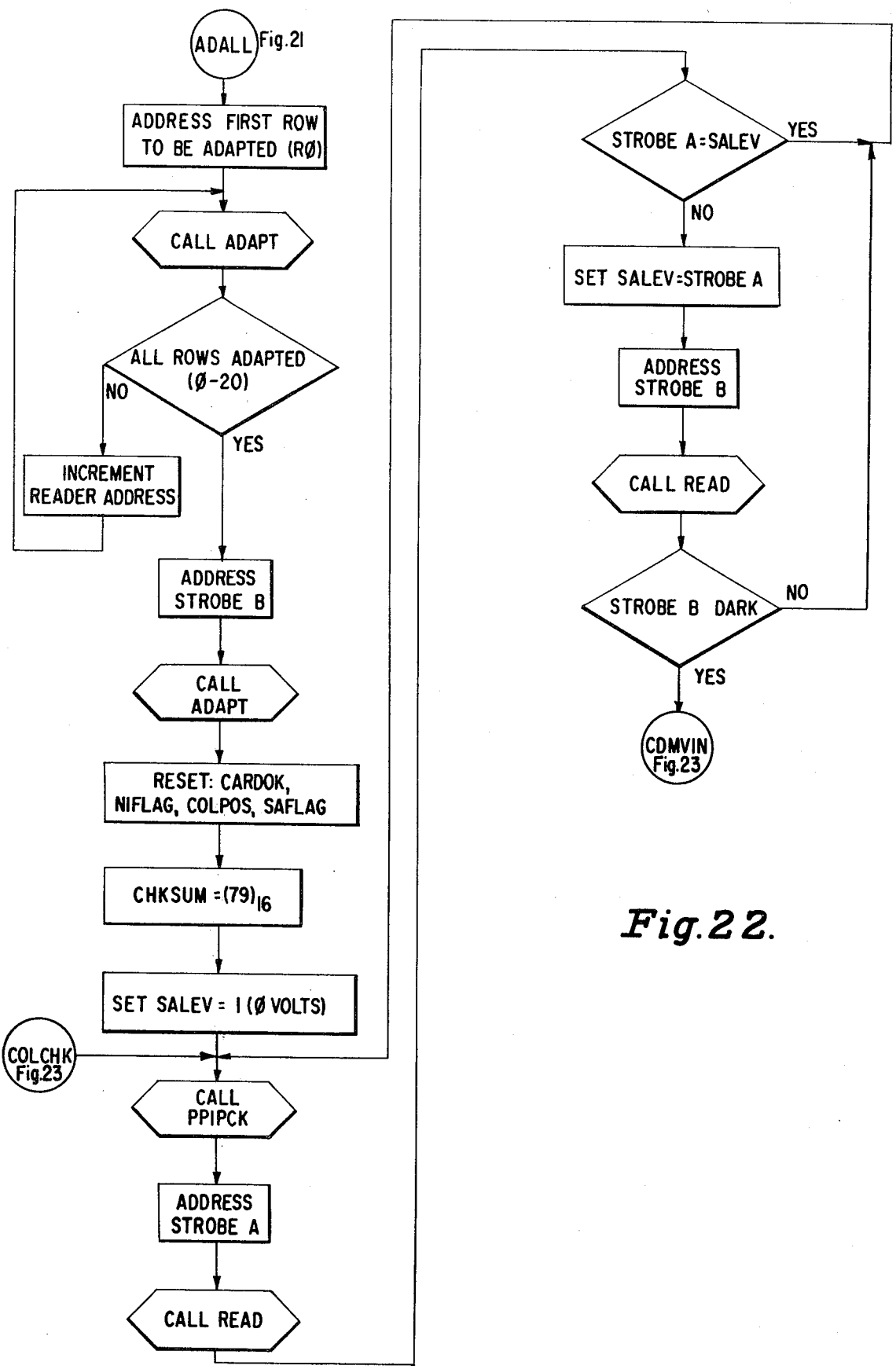
Figure 24:
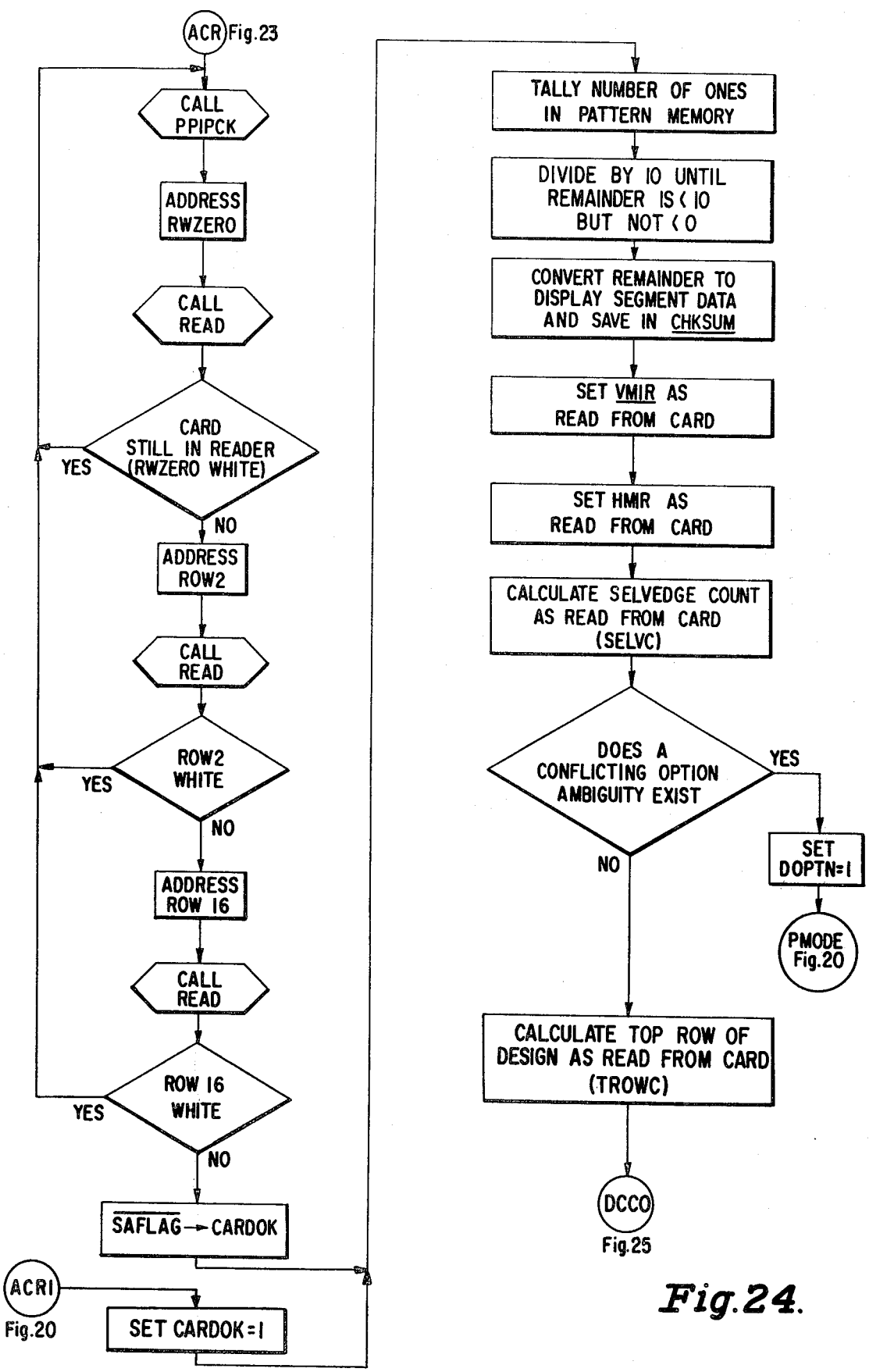
Figure 25:
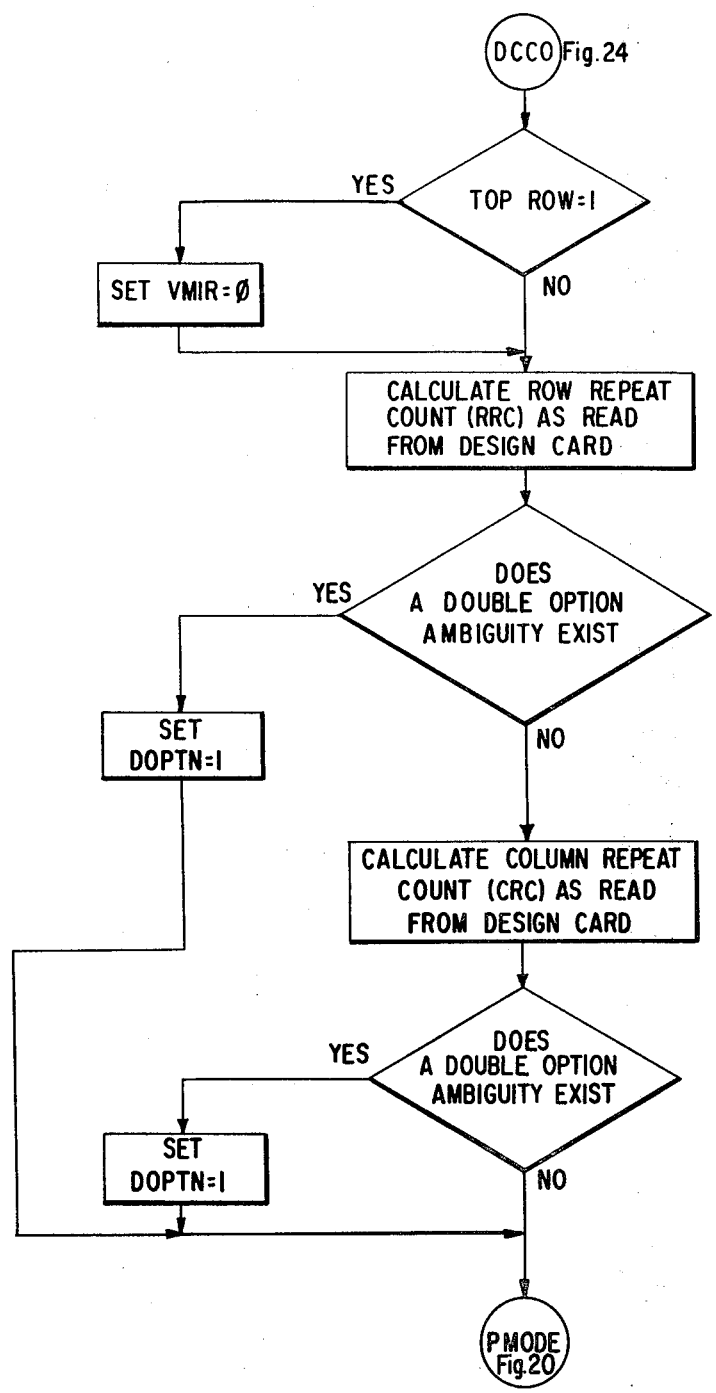
Figure 26:
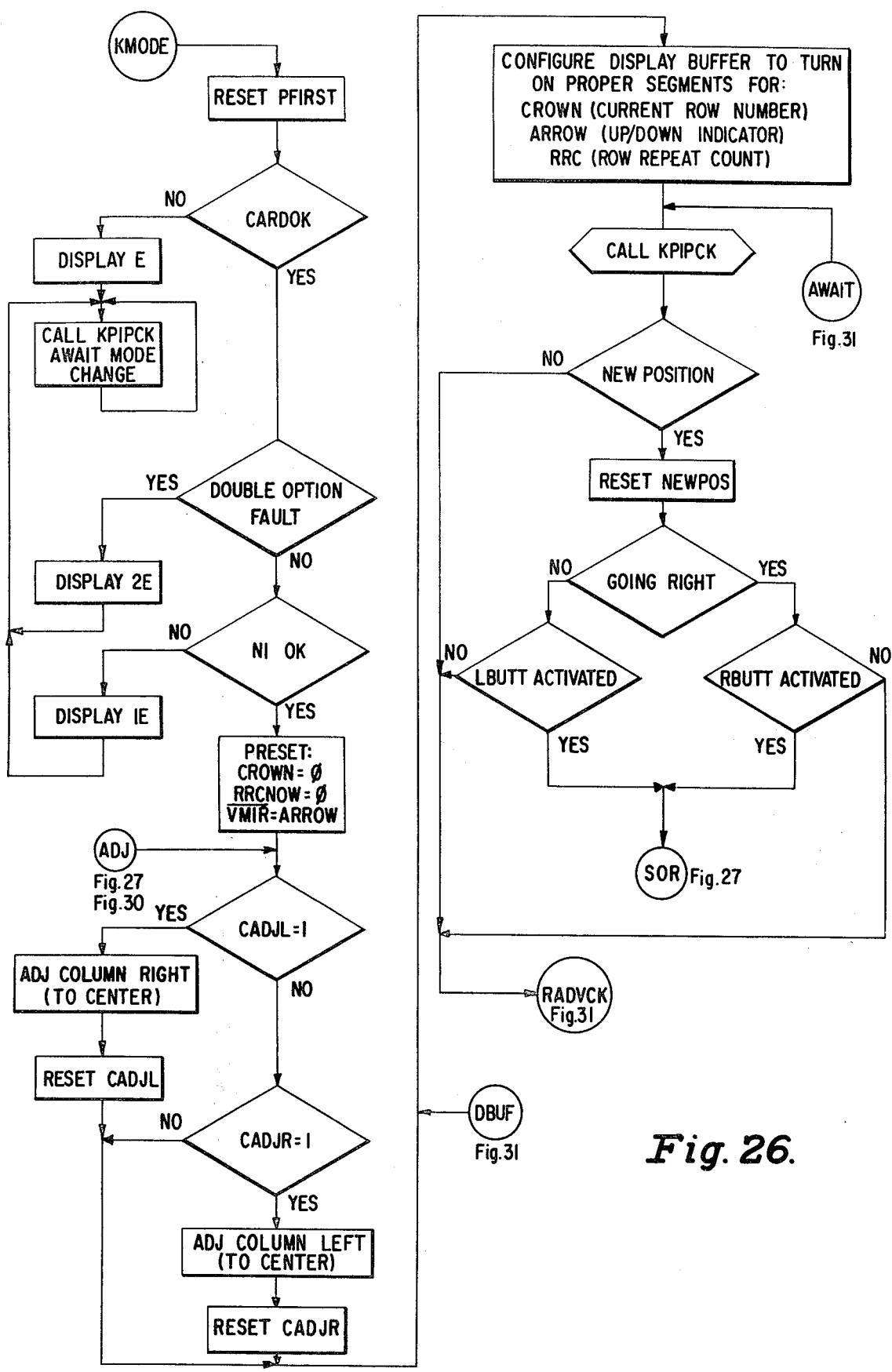
Figure 27:
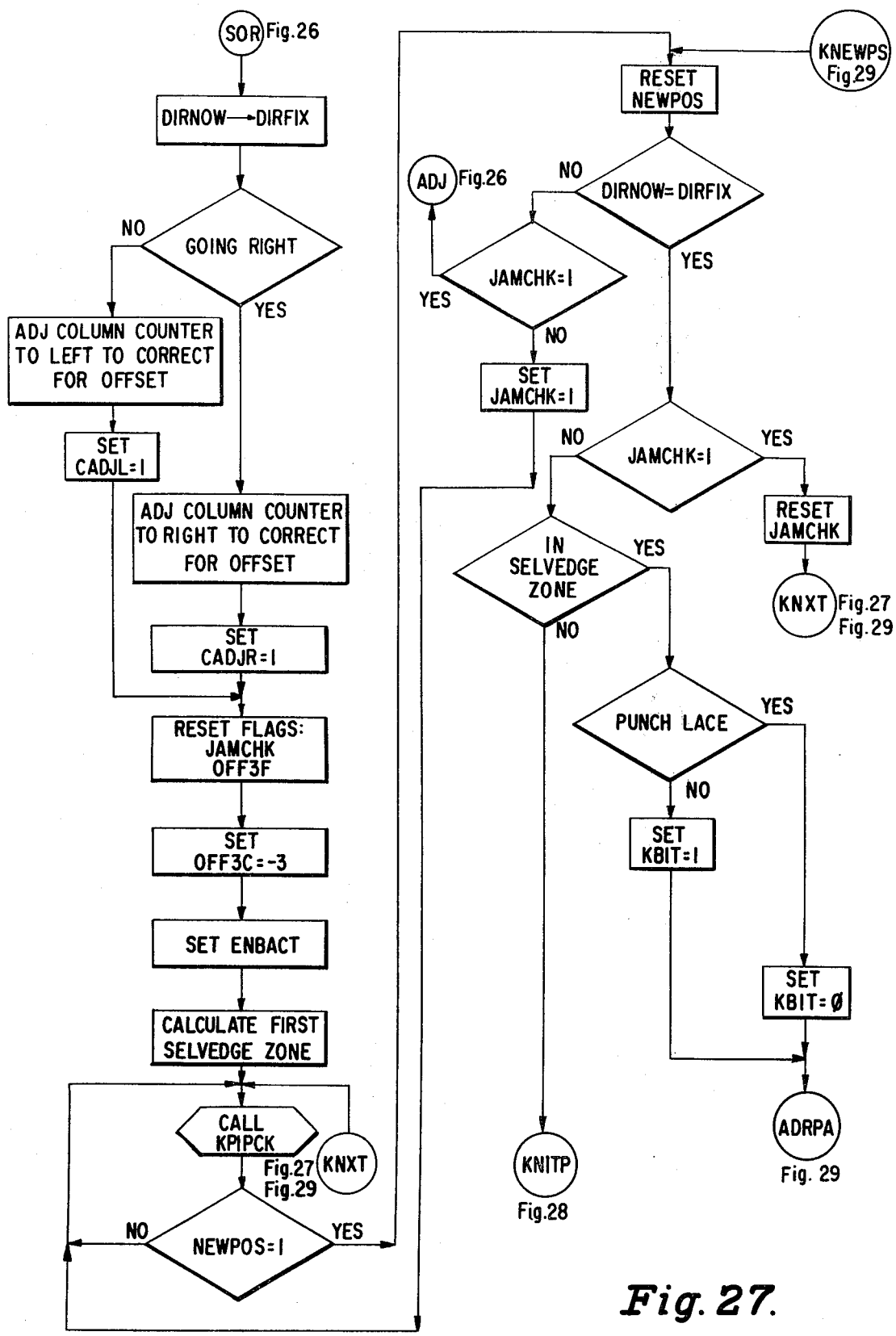
Figure 28:
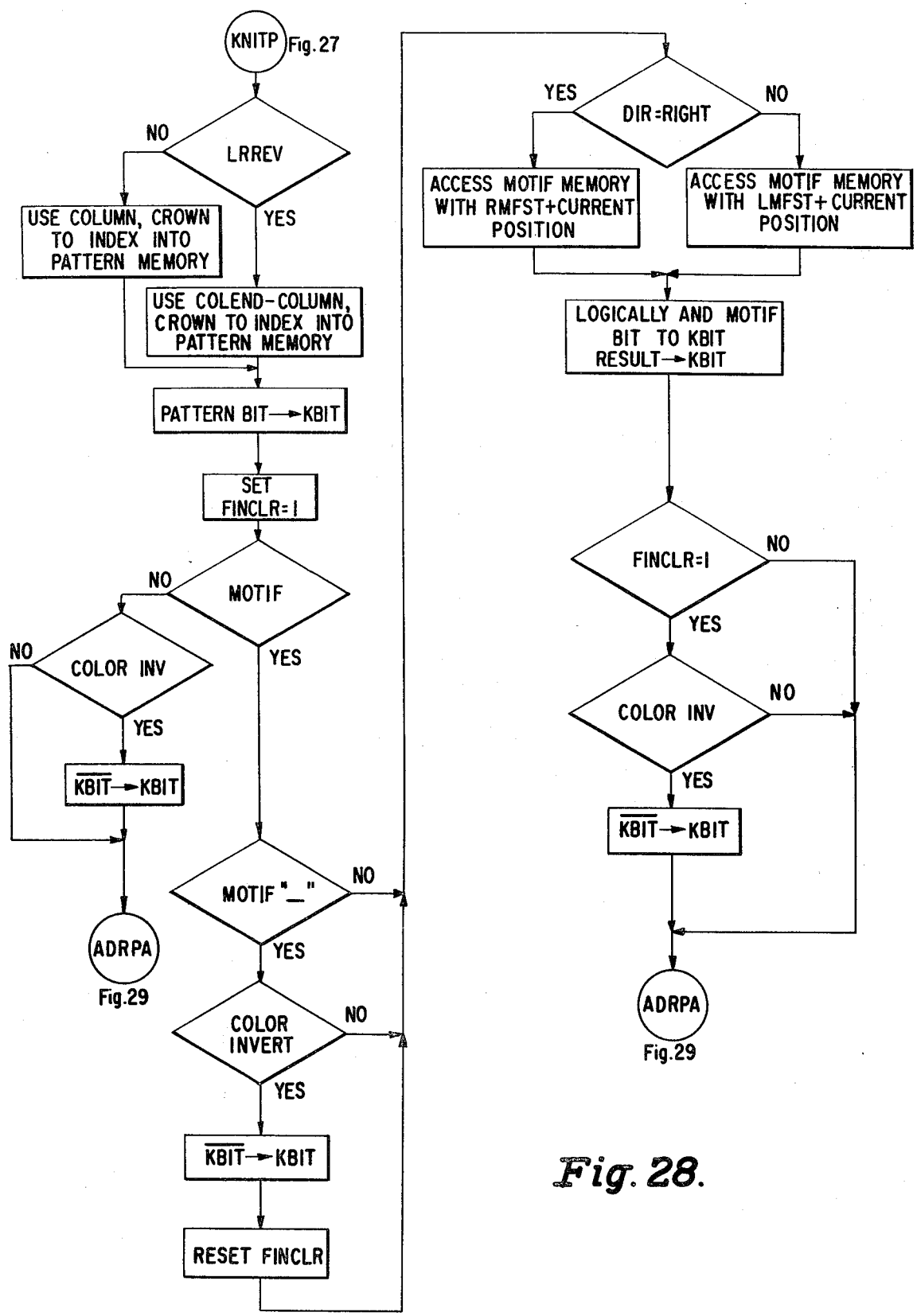
Figure 29:
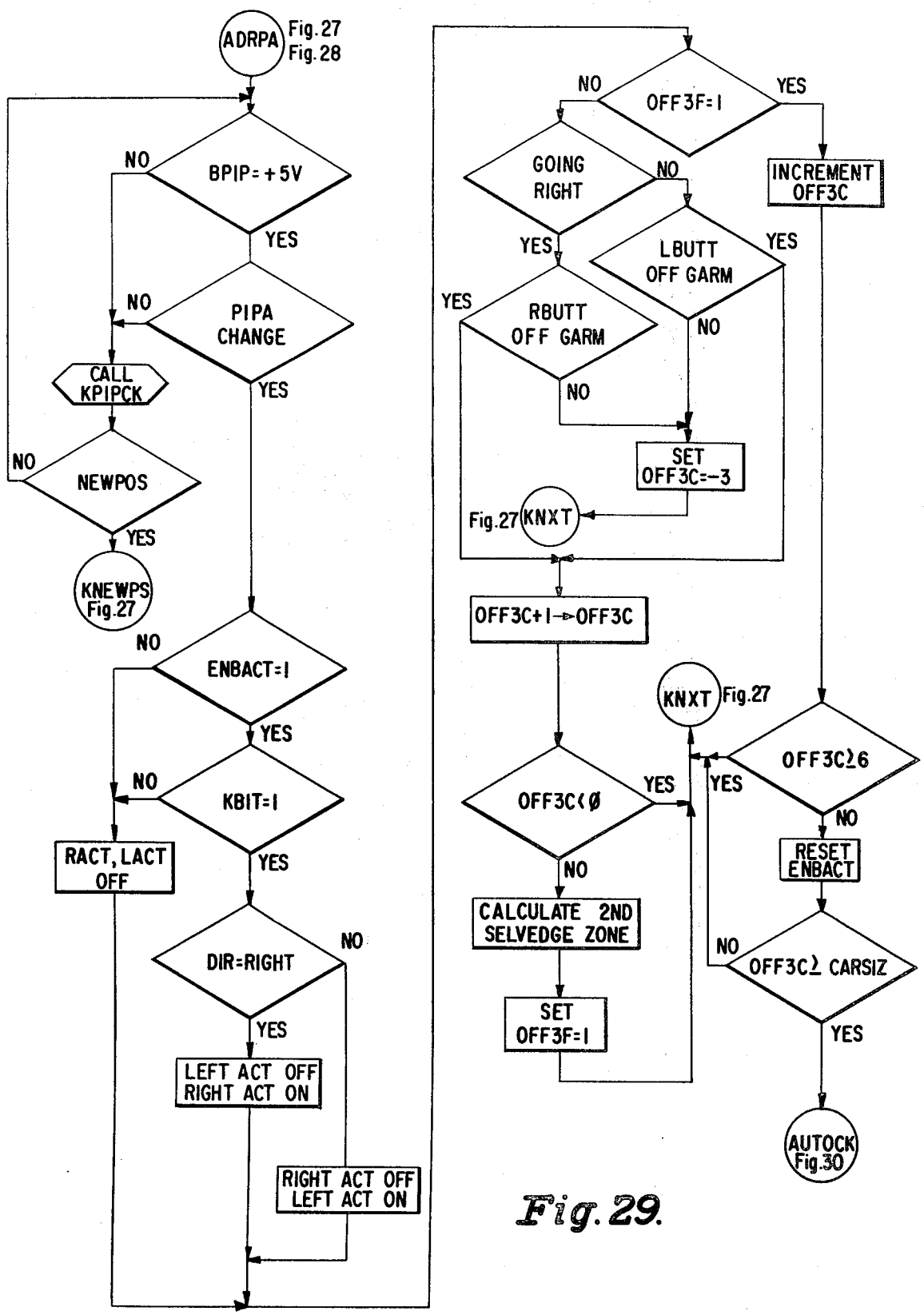
Figure 32:
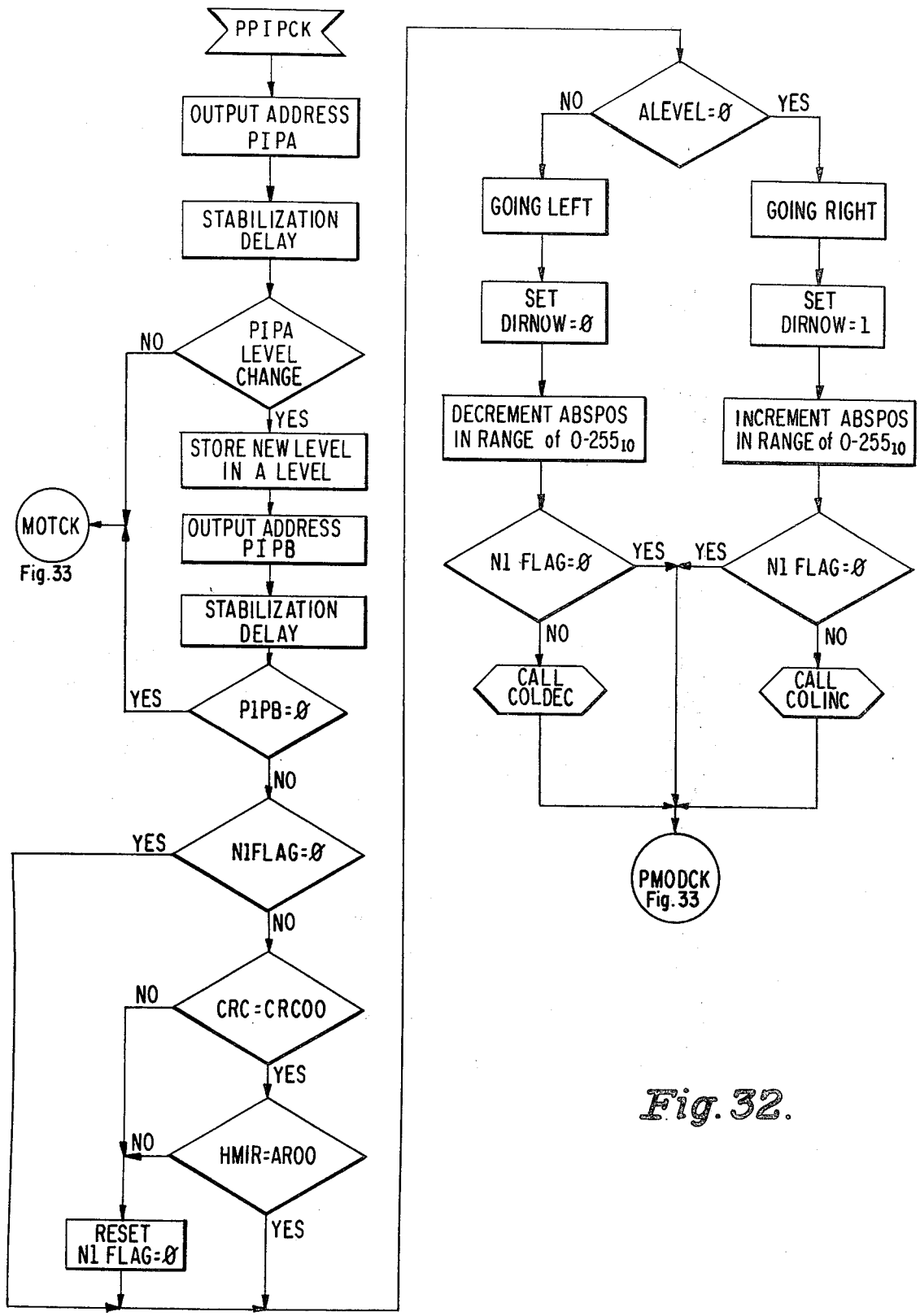
Figure 33:
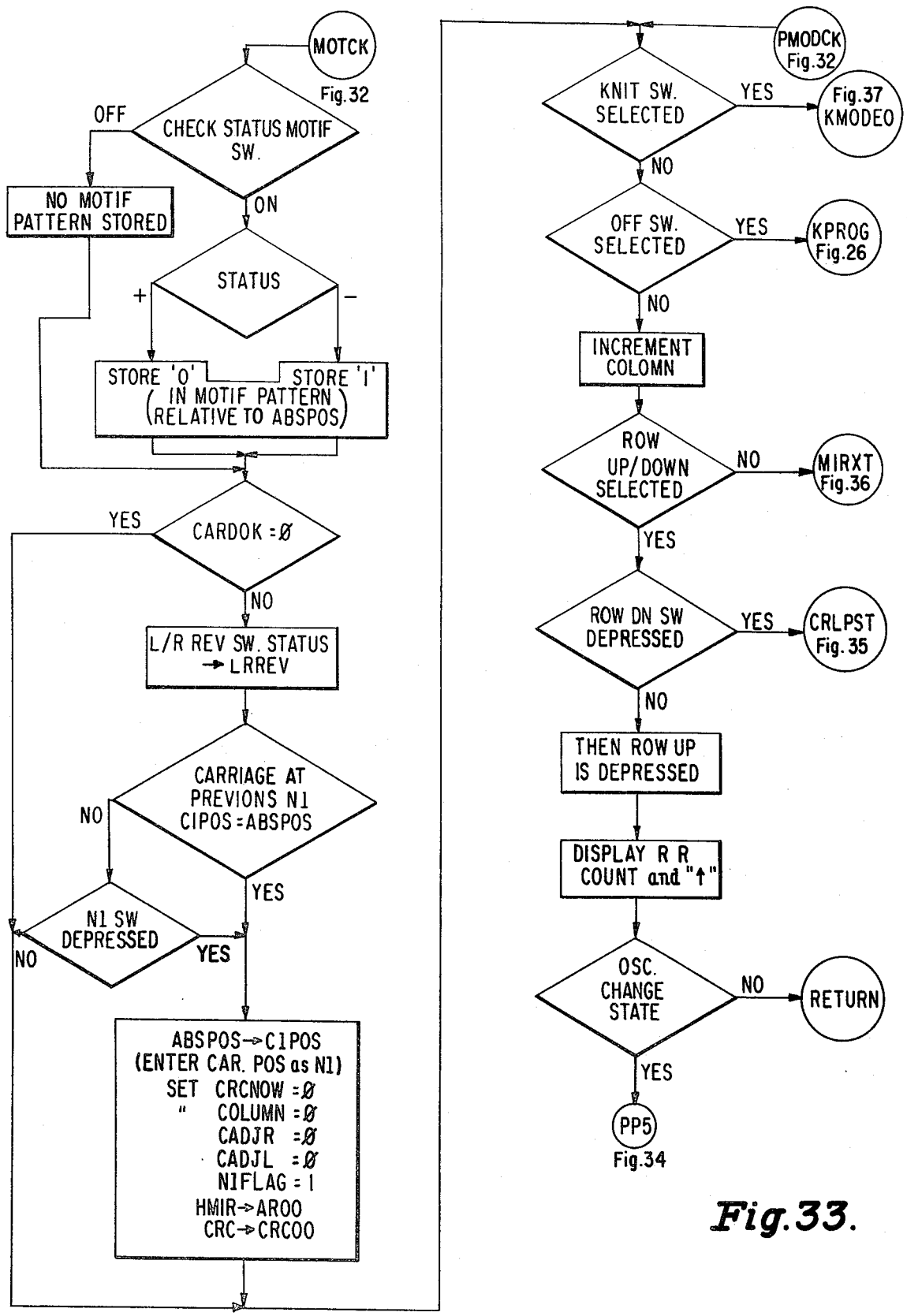
Figure 36:
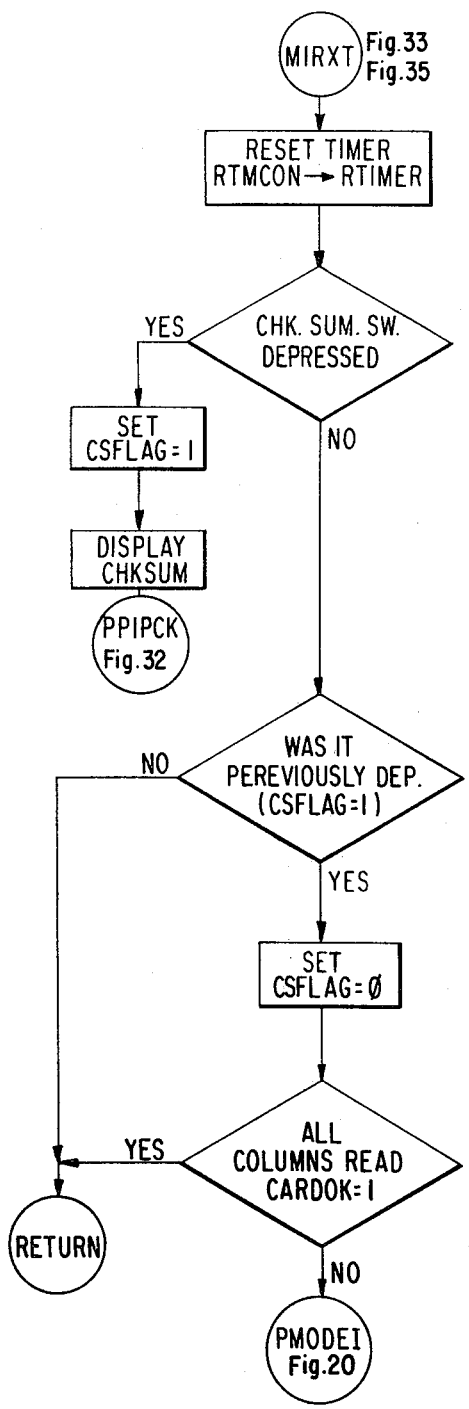
Figure 37:
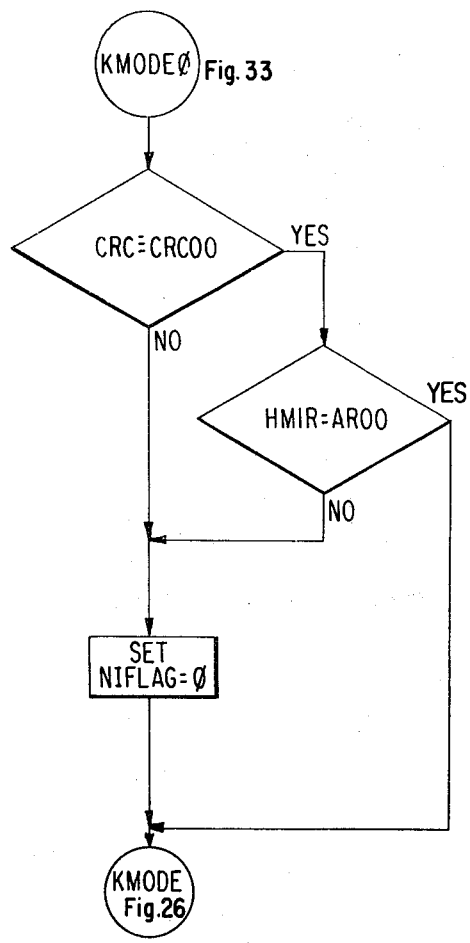
Figure 39:
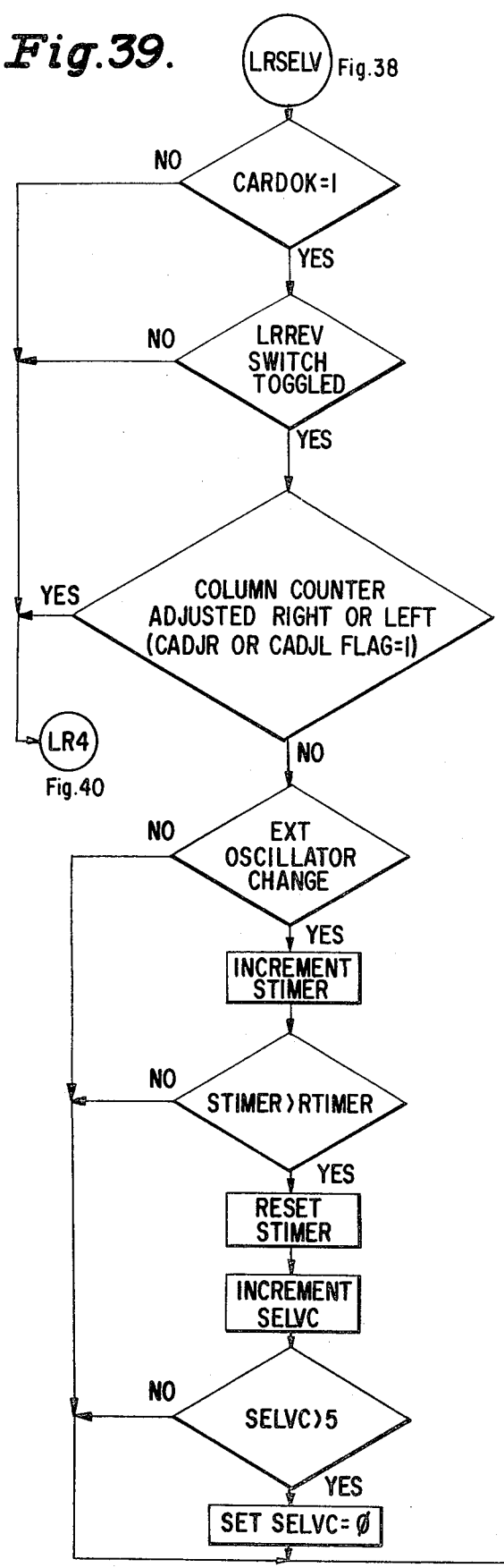
Figure 40:
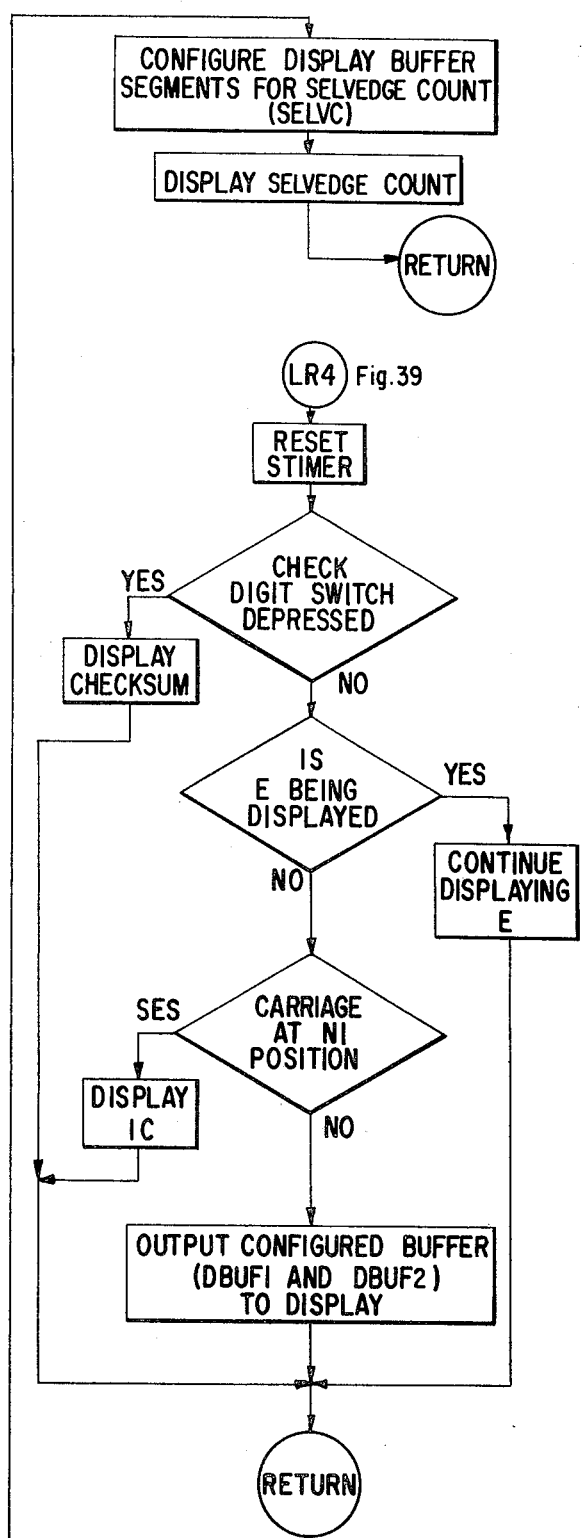
Figure 41:
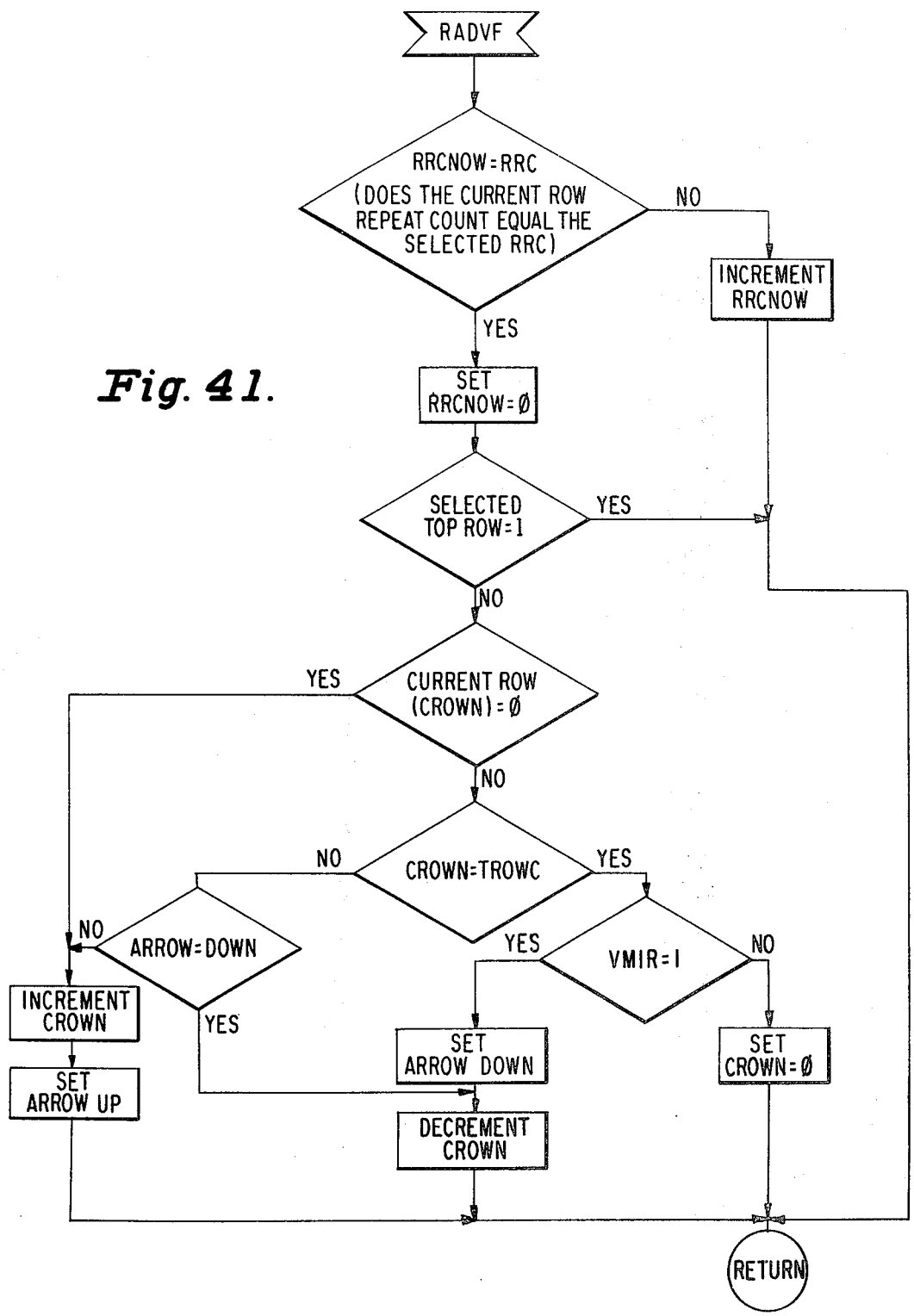
Figure 42:
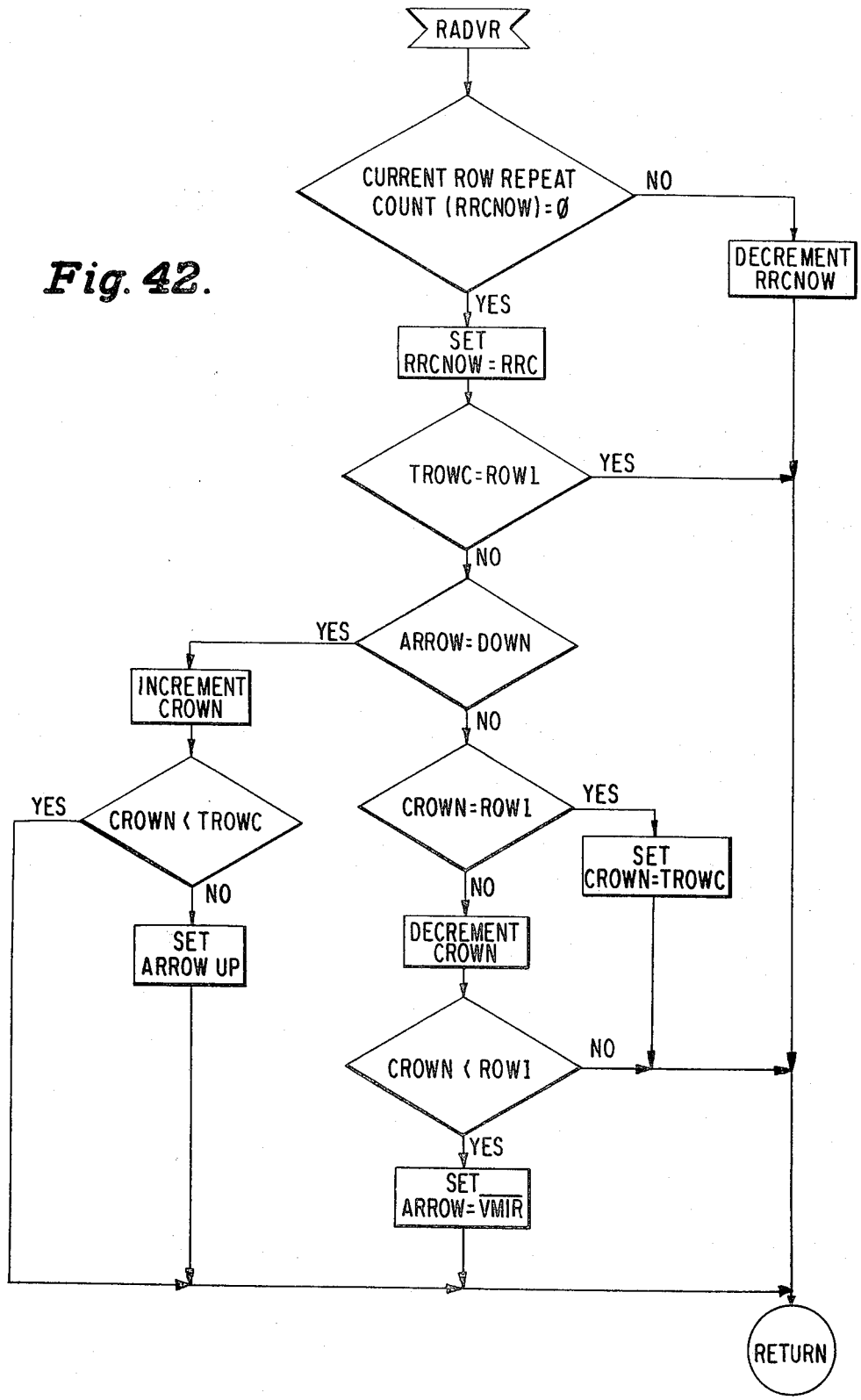
Figure 43:
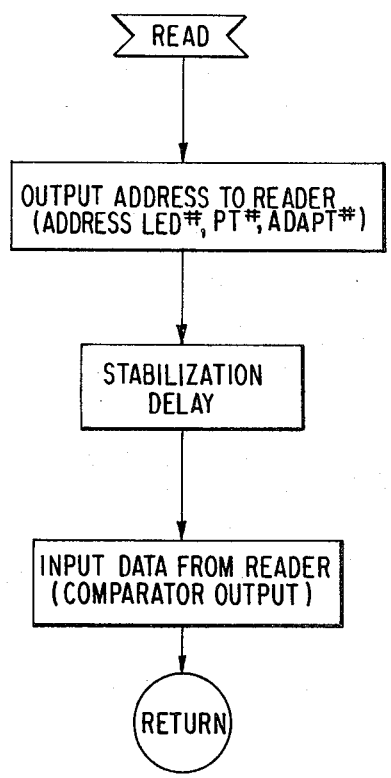
Figure 44:
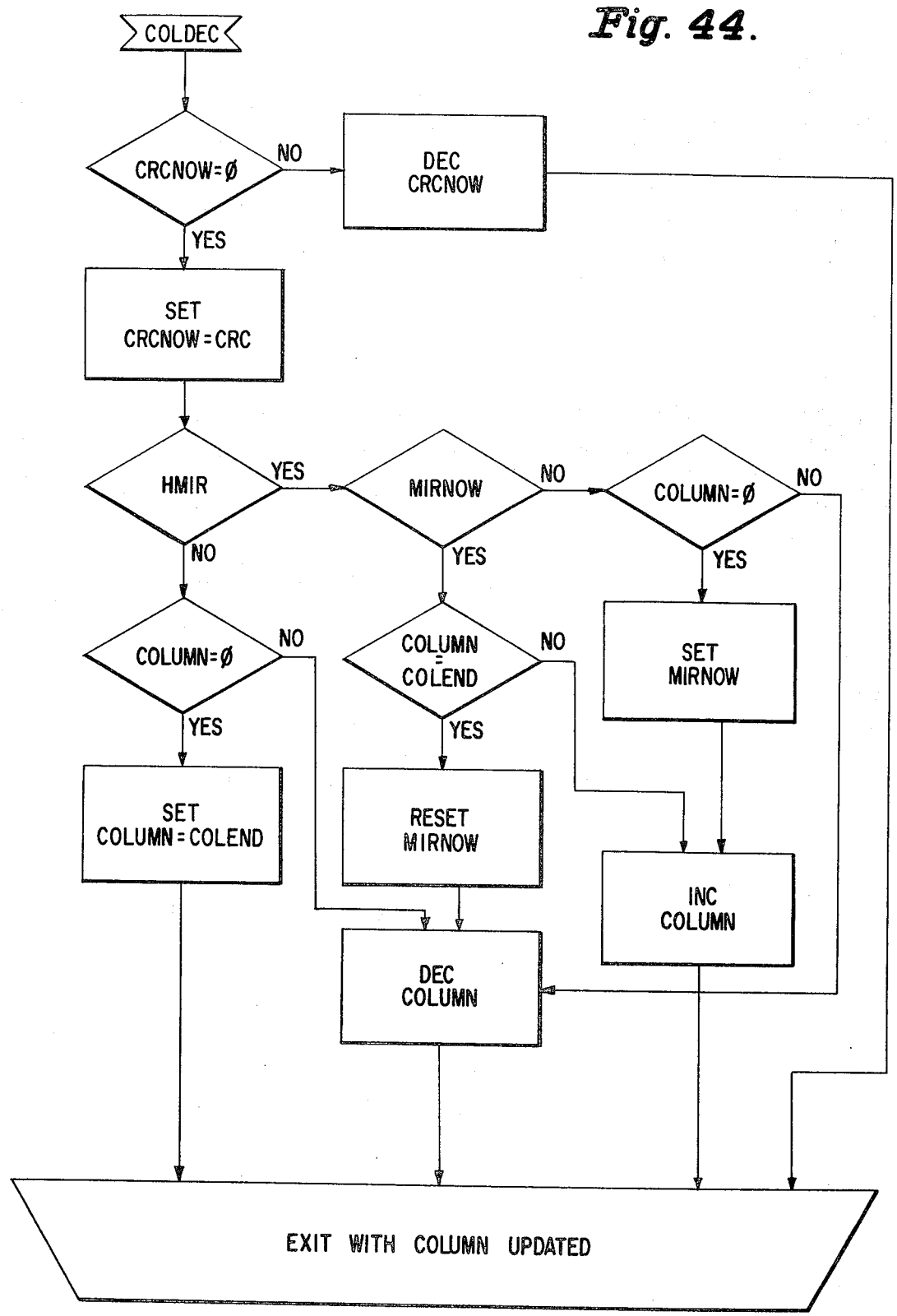
Figure 45:
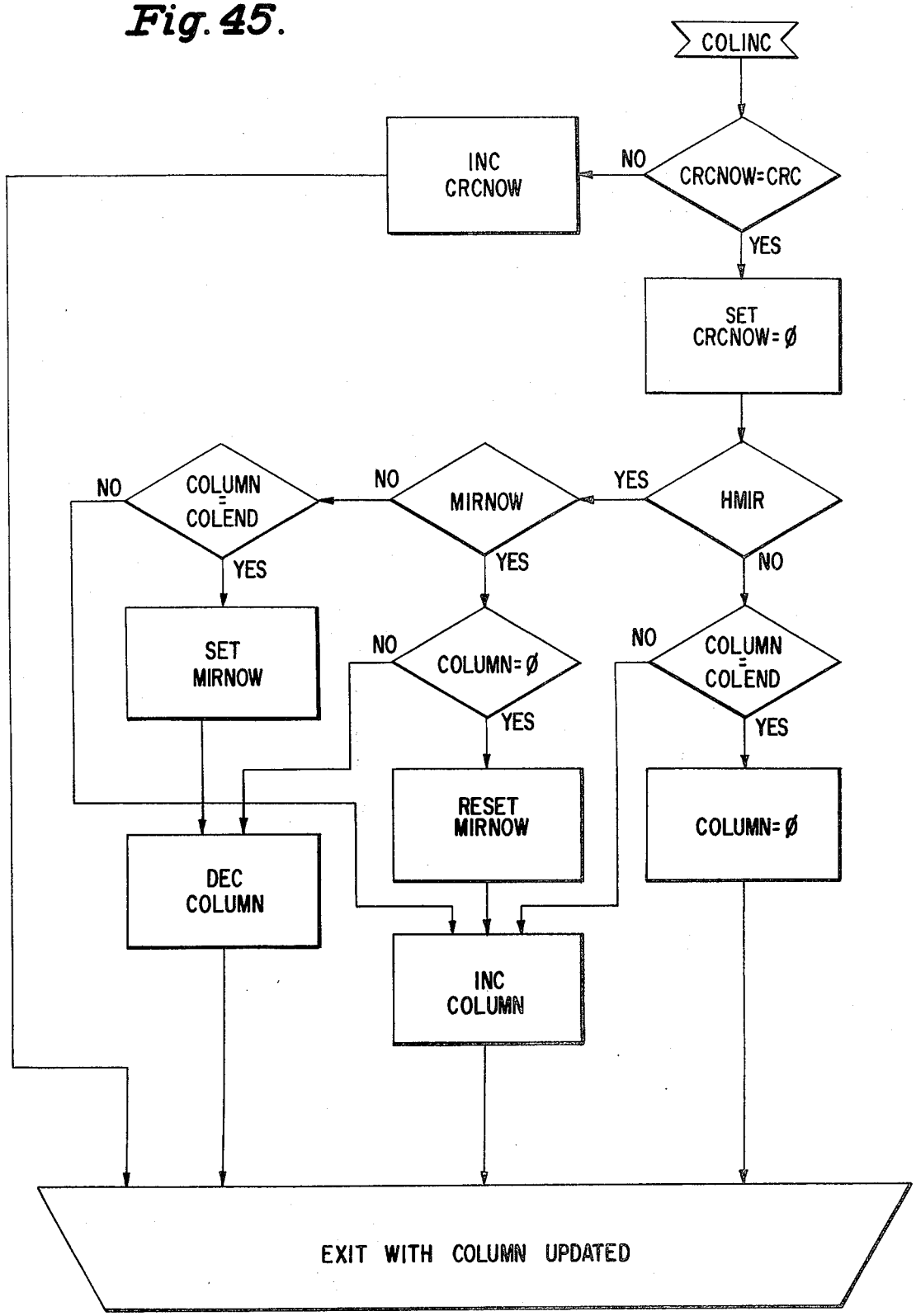
Figure 46:
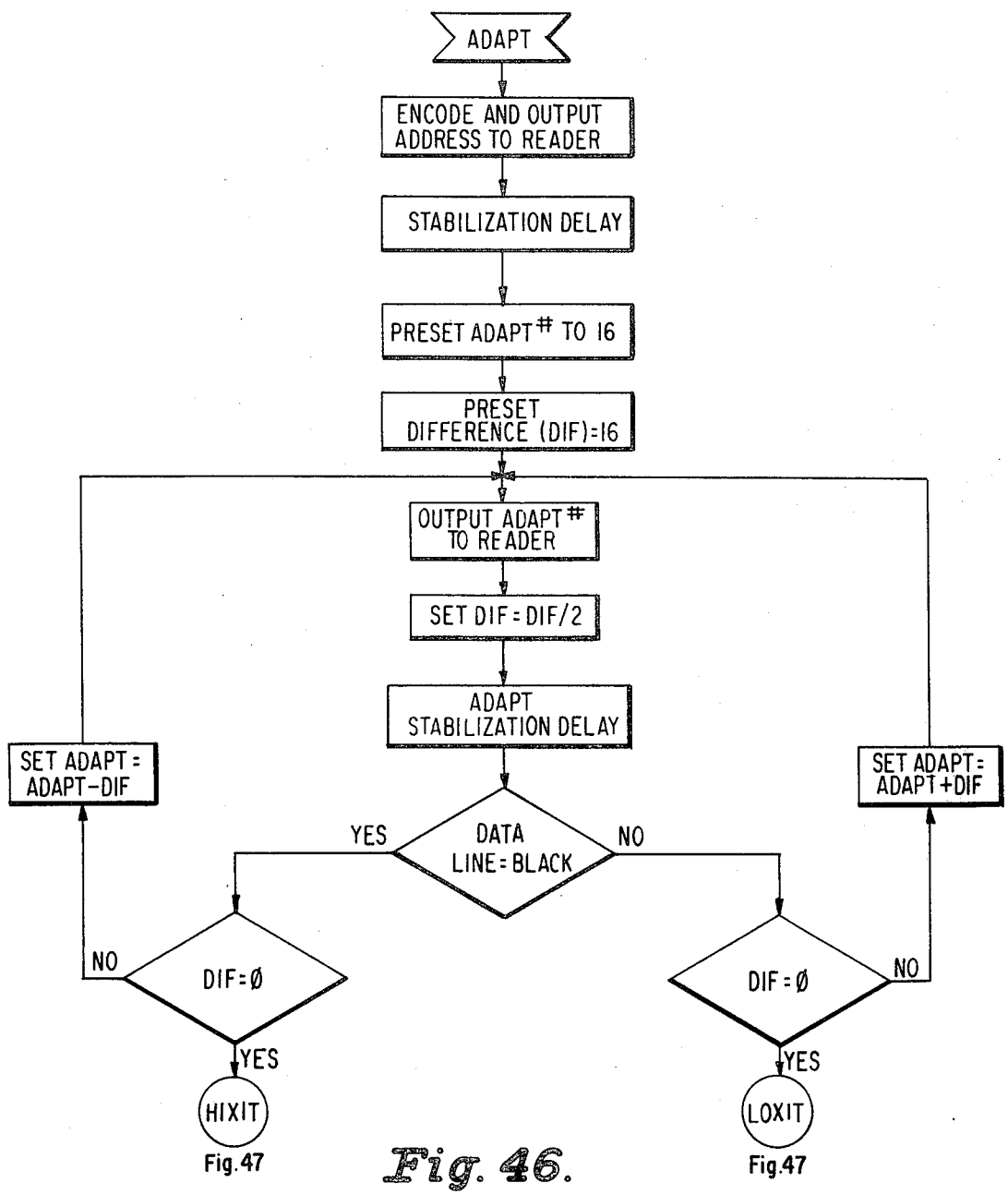
Figure 47:
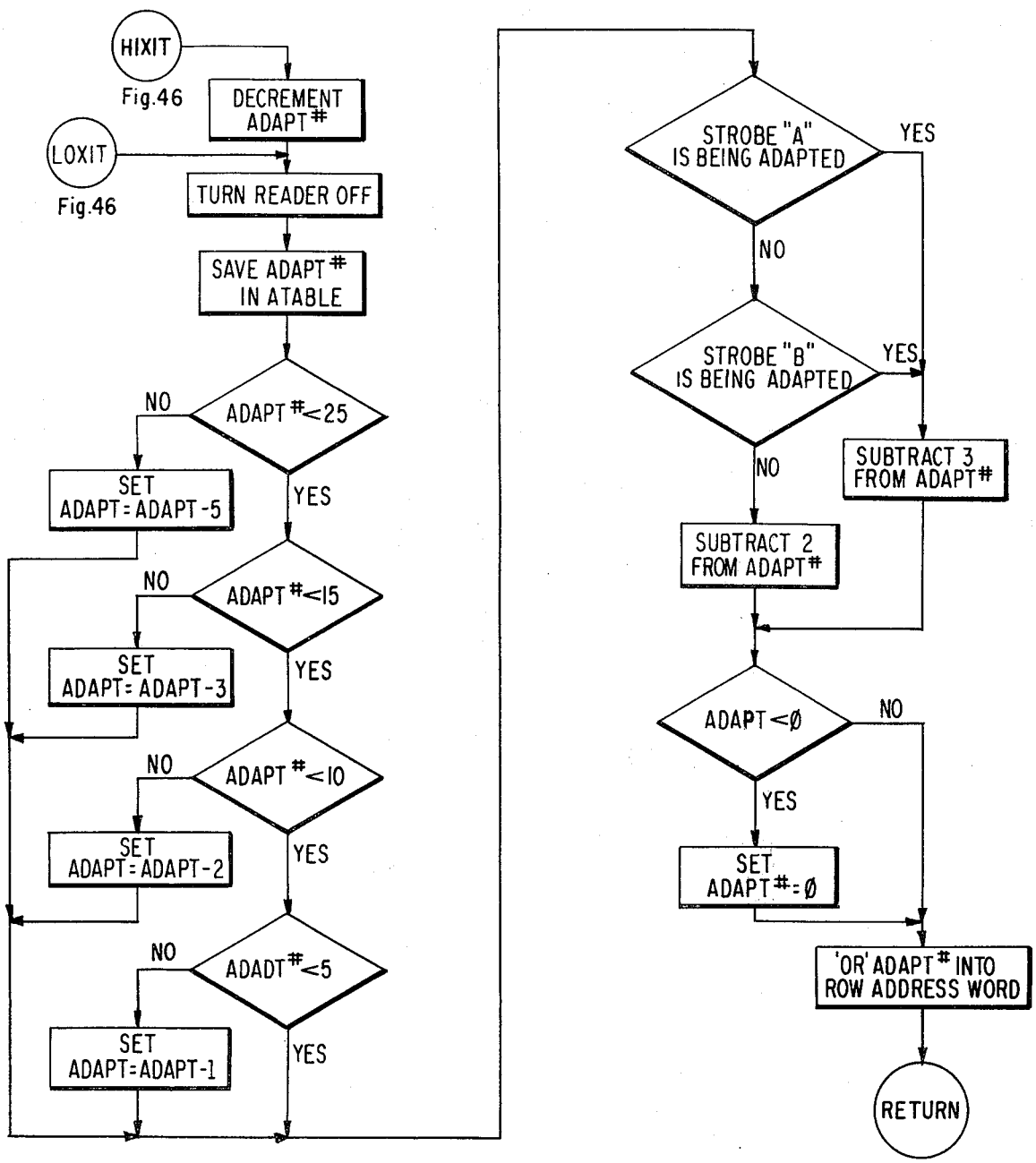

When appropriate, the computer 26 will supply an arm signal for the actuator 22 or 24. Such an arm signal is illustrated as waveshape 666 in FIG. 16B. This signal 666 normally has a time duration equal to the time the carriage takes to traverse a needle position shown as time *t*0 through *t*4 FIG. 16B. In accordance with the present invention, however, the signal applied to the actuator 22 or 24 has a duty cycle of about 75% andn will turn off if the carriage 12 is left in the same needle position greater than a predetermined time, such as 10 seconds, to prevent damage to the actuators. The circuit for accomplishing this for the right actuator 24 is shown in FIG. 16A as including an OR gate 678, three AND gates 690, 692 and 694 and two retrigerable one shot multivibrators 682 and 684 and is located in the I/O box 34. The output from the OR gate 678 is applied to the right actuator 24 by way of lead 680 and is illustrated in FIG. 16B as waveshape 676. The inputs to the OR gate 678 comprise the outputs of the three AND gates 690, 692 and 694. Each of the AND gates has four inputs. One input applied to each AND gate 690, 692 and 694 is the arm signal 666 supplied by the computer 26. Another input applied to each of the AND gates is the output of the second one shot 684 which is illustrated in FIG. 16B as waveshape 674. The input to the second one shot 684 is the output form the first one shot 682 which is illustrated in FIG. 16B as waveshape 672. PIP A signal, shown in FIG. 16B as waveshape 668, is applied to the input of the first one shot 682 and to the AND gate 690. The PIP A signal after being inverted by the inverter 698 is applied to AND gates 692 and 694. The PIP B signal, shown in FIG. 16B as waveshape 670, is applied to AND gate 694 and after inversion by the inverter 696 to AND gates 692 and 690.

Referring now to FIGS. 16A and 16B, the operation of the circuit of FIG. 16A is such that at time *t*0, the arm signal 666 occurs as PIP A 668 goes low, causing the output 672 of the first one shot 682 to go high for a short period of time. This in turn causes the output 674 of the second one shot 684 to go high. Since the second one shot 684 has a time out period of about 10 seconds, the output 674 of the second one shot 684 remains high. During the time period *t*0 to *t*1, PIP A 668 is low and PIP B 670 is high which results in only AND gate 694 being enabled for this time period and producing an input to the OR gate 678. During the time period *t*1 to *t*2, PIP A 668 remains low and PIP B 670 is also low, which results in only AND gate 692 being enabled for this time period and producing an input to the OR gate 678. During the time period *t*2 to *t*3, PIP A 668 is high and PIP B 670 is low, which results in only AND gate 690 being enabled for this time period and producing an input to the OR gate 678. During time period *t*3 to *t*4 both PIP A 668 and PIP B 670 are high. However, this will not enable any of the AND gates 690, 692 or 694. Accordingly, there is no input to the OR gate during this time period. As will now be apparent, the signal to the right actuator 24 will be present on lead 680 from the OR gate 678 only during the time period *t*0 through *t*3 or for three fourths of a needle position. The analysis set forth above assumes that the carriage 12 did not remain in the needle position for more than ten seconds. If this were the case, the second one shot 684 would have timed out causing its output 674 on lead 686 to become low, thereby disabling each of the AND gates 690, 692 and 694 which in turn would prevent any output 676 from the OR gate 678 to the right actuator 24.

A circuit virtually identical to that shown in FIG. 16A is provided for the left actuator 22 and is also located within the I/O box 34. The left actuator circuit, however, replaces AND gate 694 which is enabled by PIP A 668 being low and PIP B 670 being high by an AND gate (not shown) which is enabled by PIP A being high and PIP B being high corresponding to time period *t*3 to *t*4. A person skilled in the art can readily arrange such a circuit in view of the description of the right actuator circuit described above.

The programmed computer 26 and the signal connections thereto are clearly illustrated in FIG. 17A. In accordance with the present invention, the computer 26 utilized was Texas Instruments Inc. Model 960A (Part No. 226881-2) modified by having the following Texas Instruments Inc. printed circuit boards added thereto: Internal CRU Expander (Texas Instruments Inc. part No. 226722-1), Data Input Module (Texas Instruments Inc. part No. 217382-1) and Data Output Module (Texas Instruments Inc, part No. 217380-1). The inputs to the computer 26 are shown on the left side of FIG. 17A while the outputs from the computer 26 are shown on the right side. The input and output pin numbers of the computer 26 are shown on the outside of the rectangle which represents the computer 26 while the communications registers which these pin numbers address are shown within the rectangle and adjacent their corresponding pin numbers. For example, input pin number nineteen is coupled to communications register E10 while output pin number nineteen is coupled to communications register E20.

As shown in FIG. 17A, the output of the eighty Hertz clock oscillator (not shown) within the I/O box 34 is applied to input pin eighteen. The circuit, such as that described in conjunction with FIG. 18, that will provide an indication that a monitored voltage level is low is coupled to input pin 17 while a similar circuit that provides an indication that a monitored voltage source is about to fail is coupled to input pin sixteen. The output from the card reader 30 appearing on the output lead 612 of the comparator 596 (FIG. 13) is coupled to input lead fifteen. The various operating switches associated with the knitting apparatus are coupled to input leads three through fourteen, 19 and 23 as shown. With the exception of the left 22 and right 24 butt switches, these operating switches are directly coupled to the input pins by way of the I/O box 34. The output from the butt switches 118 and 120 as described above, however, are applied to a butt detection circuit, such as that shown in FIGS. 14A and 14B, with the output from such a circuit for each butt switch 113 and 120 being coupled to input pins fourteen and thirteen. Although the OPK switch 50 described above has three positions, it comprises only two switch contacts 706 and 708 which are coupled to input pins three and nineteen respectively. A truth table shown in FIG. 17B shows that when both switches 706 and 708 are closed, the knitting apparatus is off. When switch 706 is closed and switch 708 is open, the knitting apparatus is in the PROGRAM MODE and when both switches 706 and 708 are open the knitting apparatus is in the KNIT MODE. When closed, the switches 706 and 708 will provide ground potential on their input pins three and nineteen, respectively; while when open a 5 volt positive potential will appear on their associated input pins. This potential is generated by a "pull up" circuit (not shown) associated with each pin and located within the computer 26. The PIP A signal is coupled to input pin 20 and the PIP B signal is coupled to the input pin twenty one. Naturally, the computer 26 is also coupled to system ground through pins C-Z.

Referring now to the output signals of the computer 26, the left and right actuator arm signals are provided on output pins 24 and 23, respectively. As discussed above, these signals are not applied directly to left and right actuators 22 and 24, respectively, but are first coupled to a circuit, such as that shown in FIGS. 16A and 16B. Output pin numbers nine through twenty two provide the various output signals needed to drive the display 66. The signals for actuating the four rectangles on the display appear on output pins 20, 21 and 22. The signal for actuating the up arrow on the display 66 appears on output pin nineteen while the signal for actuating the down arrow appears on output pin 18. The number "two" on the display 66 is actuated by a signal on output pin 17 while the number "one" on the display 66 is actuated by a signal on the output pin 16. The various segments of the seven segment portion of the display 66 are actuated by signals appearing on output pins 9, 10, 11, 12, 13, 14 and 15, respectively. As discussed above, these signals are not directly coupled to the display devices. Rather, each signal output is coupled to a circuit such as that shown in FIGS. 15A, 15C and 15B to convert the DC signal from the computer 26 into an AC signal. The 5 bit binary number supplied to the digital to analog converter 600 of FIG. 13 from the computer 26 appears on output pins thirteen, fourteen, fifteen, sixteeen and seventeen. The computer 26 supplies signals for enabling a selected one of the five light emitting diodes 520, 522, 524, 526 and 528 of the card reader 30 (FIG. 12A) appear on output pins 8, 9, 10, 11, and 12 while the computer 26 supplied signals for enabling a selected one of the five photo transistors 582, 584, 586, 588 and 590 appear on output pins three, four, five, six and seven. As will now be apparent, output pins 9 through 17 are time shared by the display 66 and the card reader.

As will now be apparent, the objects, features and advantages of the present invention are obtained by the combination of the mechanical knitting apparatus described, the programmed computer 26 and the electrical interface coupled between the protrammed computer 26 and the mechanical knitting apparatus. Attached hereto as an appendix is the detailed program listing used in the computer 26 to implement the present invention. As listed, the left most column shows program card numbers, the next column lists addresses located within the computer 26 followed in the next column by the contents of the addresses listed. Following columns list the operator neumonic followed by the operand neumonic. For a detailed explanation of the items of the program listing appended hereto, together with a system description of the internal organization of the computer 26, the programming system used, machine instructions and the like, reference is made to "Model 960 A Computer Programmer's Reference Manual" revised June 1, 1973, Manual No. 958360-9701 by Texas Instruments, Inc. the contents of which are incorporated herein by reference.

As an aid in understanding the appended program listing, FIGS. 19 through 49 relate to a detailed flow chart of the appended program listing. As shown by FIG. 19, the appended program listing includes three sub programs; i.e., Initialization, PROGRAM MODE and KNIT MODE; and at least eight sub-routines that are used in one or more of the three sub programs. The eight sub-routines include Program Pip Check, Knit Pip Check, Row Advance Forward, Row Advance Reverse, Read, Column Increment, Column Decrement and Adapt. As an aid in understanding and interpreting the various flow charts, FIGS. 48 and 49 contain a glossary of terms used in the flow charts.

It is to be well understood that the program flow charts shown in FIGS. 20 through 47, and much of the operational description contained hereinabove in conjunction with FIGS. 1 through 18, has been culled from the program as defined by the appended detailed program listing. Any deviation in the drawings or description contained herein from the system defined by the appended detailed program listing is inadvertent. Any such deviation or ambiguity is to be resolved by reference to the appended detailed program listing which is controlling as regards the operation of the knitting apparatus of this invention.

The Initialization sub program shown in the top left portion of FIG. 20 clears the various components of the system when the system is first turned on. For example, this sub program is used to initialize the computer 26 registers, reset the input-output lines, clear all flags, counters and the like.

As previously noted herein, in the Program Mode sub program (FIGS. 20 through 25), a program card 28 can be read, the needle one position selected, a motifing sequence entered by the motifing switch 53 and reversal of the design to be knitted from that shown on the program card. The first two operations are mandatory in that knitting will not occur unless they are accomplished, whereas the latter two operations are optional. Briefly described, the Program Mode subroutine begins by setting C1POS to two hundred to prevent a needle one position from being achieved by default after which the two channels (zero and twenty) of the card reader 30 used to detect the edge of the program card 28 are adapted to the black background of the card reader 30 platen as described above. If auto design is selected, a preprogrammed design is automatically transferred to the active design memory region of the computer 26 after which checksum is operated and the various design options are decoded and checks made for knit design ambiguities (FIG. 3). If auto design is not selected, various carriage switch positions interrogated to determine whether there have been any changes from their initial positions. The detecting of the program card 28 and reading in of the design information therefrom will then occur as described hereinabove.

An integral part of the Program Mode sub program is the Program Pip Check (FIGS. 32 through 37) subroutine. While in the Program Mode sub program all service requirements present are carried out. However, throughout the Program mode sub program, whenever conditions permit, a complete Program Pip Check sub routine will be carried out the general purpose of which is to monitor the various carriage 12 switch positions and the position of the carriage 12 on the needle bed 10, even while a program card is being read. The Program Pip Check sub routine will determine whether the carriage 12 position on the needle bed has changed, increase or decrease the absolute position count of the carriage 12 on the needle bed, check the current status of the motifing switches 53, the left-right reverse switch 62, the previous needle one position and whether a new needle one position is being selected. The current status of the OPK switch 50 and the row advance and row descent switches 56 and 58 are checked and the appropriate display enabled re design multiplication factor. The check digit switch 63 is monitored and the display 66 enabled, if necessary, and the status of the program card read in is checked.

Also an integral part of the Program Mode sub program is the Read sub routine (FIG. 43) wherein the data from each block of information on the program card is read and stored. Also an integral part of the Program Mode sub program is the Adapt sub routine (FIGS. 46 and 47) wherein the binary numbers are applied to the digital adapter of FIG. 13, to digitalize the voltage levels from the card reader 30 information now reading stations as described above. In the main PROGRAM MODE a number is added or subtracted from the digitized number to compensate for background noise and the like. The strobe channels A and B are similarly digitally adapted.

In the Knit Mode sub programs (FIGS. 26 through 31), the design is knitted by controlling the actuators 22 and 24, the display 66 is operated and the various switches on the knitting apparatus are checked. Briefly described, the Knit Mode sub program first checks for errors. For example, if the program card 28 has not been read properly, the E on the display 66 will be illuminated, if conflicting design options have been selected 2E will be illuminated and if needle one has not been selected 1E will be illuminated. If there are no errors the machine will prepare to knit by noting the carriage 12 position on the needle bed 10, configure the display 66 to show the present status and begin to look for the garment edge. The location of the actuators 22 and 24 with respect to the center of the carriage 12 is determined, selvage is calculated, checks are made for jams, the knit algorithums are computed and the actuator 22 or 24 fired, and the salvage zone is checked upon leaving the garment. After leaving the garment, the row advance 56 and row descent 58 switches are checked and the row display 66 is increased or decreased.

Where possible throughout the Knit Mode sub program, a complete Knit Pip check sub routine (FIGS. 38 through 40) is carried out. Briefly described, this sub routine checks the present status of the OPK switch 50, the PIP A and PIP B signals to determine the location of the carriage 12 on the needle bed 10 and correspondingly increases or decreases the position count. The power low or power fail voltage indicating levels are checked and the display operated, if appropriate. The left right reverse switch 62 re selvedge is monitored and the selvedge count is displayed. The check digit is displayed if the check digit switch 63 is depressed and 1C on the display 66 is illuminated if the carriage is at the needle position.

Before beginning a new knitting sequence when the new needle position is located to the right or to the left of the old needle position, it must be determined which column of program card 28 information is to be used. Factors which influence the result include the various design options such as multiplication factor, mirroring, inverse and the like. The correct column is determined by the Column Increment, and Column Decrement sub routines shown in FIGS. 44 and 45.

In a like manner, which row of program card 28 information is to be used for the next knitting sequence must also be determined. This is accomplished by the Row Advance Forward sub routine (FIG. 41) when a course is completed and the carriage reverses or when row advance is manually selected and by Row Advance Reverse subroutine when row reverse is manually selected.

Although the invention has been described in its presently preferred form, it is to be understood that the present disclosure is by way of example only and that numerous changes in construction and in the combination and arrangement of parts may be resorted to without departing from the spirit and scope of the invention. In particular it should be noted that the Texas Instrument computer 26 shown and described herein is but one example of various general purpose computers that might be used for control purposes in the machine of the invention. It should also be noted that electronic control means in a form different from that of the computer 26 may be utilized to perform the control functions of the computer. If desired, one or more silicon chips adapted to perform all of the control functions of both the computer 26 and the I/O box 34 may be utilized in the machine.

Having thus set forth the nature of this invention, what is claimed herein is:

1. In a programmable knitting machine the combination comprising a needle bed supporting a plurality of needles in side by side relation, a carriage mounted on the bed for movement traversing the needles, a program card, a card reader for reading design defining instructions on the card, switch means, electronic control means responsive to the card reader and switch means for controlling the knitting of fabric on the machine, and a mode switch for placing the electronic control means in a program mode or a knit mode, the said switch means including one or more switches operable during at least one such mode for prescribing design instructions other than instructions prescribable on the card.

2. The combination of claim 1 wherein said switch means includes at least one switch operable during the knit mode of the electronic control means to prescribe one knitting instruction and operable during the program mode to prescribe a different instruction.

3. The combination of claim 1 wherein the switch means includes a needle one switch operable in the program mode to prescribe a needle in alignment with a defined location on the carriage as a needle to knit a particular wale of a prescribed unit design which is to be knit repetitively on the fabric.

4. The combination of claim 3 including a device which displays an error signal when the electronic control means is placed in the knit mode if no needle was specified to knit a particular wale while the electronic control means was in the program mode.

5. The combination of claim 3 wherein said needle can be prescribed at any time after knitting is begun by an operator disposing the mode switch in a position placing the electronic control means in the program mode.

6. The combination of claim 3 wherein a needle one selection is voided by passing a new card through the reader and the old needle one selection can be reestablished merely by moving the carriage so that the defined location on the carriage rests at or passes over the previously designated needle.

7. The combination of claim 1 wherein said switch means includes a left — right reverse switch operable to effect a reversal, during the knitting of fabric, of the left — right orientation of a prescribed pattern.

8. The combination of claim 1 wherein the said switch means includes a motifing switch having one position in which it is effective to prescribe for a plurality of needles while the electronic means is in the program mode, a width of fabric on which the background only of a design shall be knit, the width of fabric extending between the needle traversed by a location on the carriage during said movement.

9. The combination of claim 8 wherein the motifing switch has another position, and the result effected with the switch in said one position is cancelled during movement of the carriage with the switch in such other position while the electronic control means is in the program mode.

10. The combination of claim 9 wherein the motifing switch is effective both before and after the reading of a card.

11. The combination of claim 9 wherein motifing instructions prescribed with the motifing switch remain in effect after the reading of an arbitrarily large number of cards.

12. The combination of claim 9 wherein the motifing instructions are executable only after operation of the motifing switch while the electronic control means is in the knit mode.

13. The combination of claim 9 wherein the said swithc means includes a switch operable to effect an inversion of the background and foreground in fabric knitted on the machine of the design of a prescribed pattern.

14. The combination of claim 13 wherein inversion is possible in response to operation of the design inversion switch in widths of fabric prescribed for background only when the motifing switch has been moved to a predetermined one of the said positions while the electronic control means is in the knit mode and inversion is prevented in the widths of fabric prescribed for background only when the motifing switch has been moved to the other position with the electronic control means in the knit mode.

15. The combination of claim 1 wherein the switch means includes a design inversion switch to effect an inversion in fabric knitted on the machine of the design of a prescribed pattern.

16. The combination of claim 1 including display means operably connected to the electronic control means, the said one or more switches including a check digit switch, effective upon actuation after the reading of a program card to cause the display means to indicate the last digit of the total number of instructions detected by the reader.

17. The combination of claim 16 wherein the check digit switch is effective upon actuation in both the program and knit mode of the electronic control means to cause the display means after the reading of a program card to indicate the last digit of the total number of instructions detected by the reader.

18. In a programmable knitting machine, the combination comprising a needle bed supporting a plurality of needles in side by side relation, a carriage mounted on the bed for movement traversing the needles, means for designating a particular needle to knit a particular wale of a prescribed unit design which is to be knit repetitively on the machine, and a device operable to display a meaningful symbol whenever the position of the carriage is such that a defined location on the carriage is in alignment with the designated needle or another needle disposed to knit the same wale of the unit design.

* * * * *

UNITED STATES PATENT OFFICE
CERTIFICATE OF CORRECTION

Patent No. 3,991,592      Dated November 16, 1976

Inventor(s) William Kahan et al.      Page 1 of 8

It is certified that error appears in the above-identified patent and that said Letters Patent are hereby corrected as shown below:

Columns 29-42 as shown on the attached sheets should be added.

Signed and Sealed this

First Day of March 1977

[SEAL]

Attest:

RUTH C. MASON
Attesting Officer

C. MARSHALL DANN
Commissioner of Patents and Trademarks

```
  1   0400                         ABS     X'400'
  2   0400          KPROG          PSEG
  3   0400                         MODE
  4   0400          REG0           EQU     X'88'
  5   0400          REG1           EQU     X'89'
  6   0400          REG2           EQU     X'8A'
  7   0400          REG3           EQU     X'8B'
  8   0400          REG4           EQU     X'8C'
  9   0400          REG5           EQU     X'8D'
 10   0400          REG6           EQU     X'8E'
 11   0400          REG7           EQU     X'8F'
 12   0400 70810402                XWR     KSTART
 13   0402 44840400  KSTART        LA      4,0
 14   0404 44850400                LA      5,KPROG
 15   0406 44860000                LA      6,0
 16   0408 44870E00                LA      7,X'E00'
 17   040A 0820008C                LDCR    (X'20',0),REG4
 18   040C 34240800                SFTB    X'24',1
 19   040E 34250800                SFTB    X'25',1
 20   0410 0920008C                LDCR    (X'120',0),REG4
 21   0412 44800F00                LA      0,MOTIF
 22   0414 49840088                ST      4,*REG0
 23   0416 4CA00001                AA      0,+1
 24   0418 C0800136A                CRA    0,ATLAST
 25   041A E08C0414                BC      12,S-6
 26   041C 3010001C                BBNE    X'10',0,S
 27   041E 448000C8                LA      0,200
 28   0420 48801368                ST      0,C1POS
 29   0422 44800E00                LA      0,RWZERO
 30   0424 74830728                BL      3,ADAPT
 31   0426 44800E00                LA      0,RWZERO
 32   0428 74830434                BL      3,ADD2
 33   042A 44800E21                LA      0,RZREND
 34   042C 7483072A                BL      3,ADAPT
 35   042E 44800E21                LA      0,RZREND
 36   0430 74830434                BL      3,ADD2
 37   0432 70820444                B       ADESGO
 38   0434 4C830002  ADD2          AA      3,2
 39   0436 48830443                ST      3,ADDEX+1
 40   0438 45020088                L       2,*REG0
 41   043A 58A203FF                NA      2,X'3FF'
 42   043C 45010088                L       1,*REG0
 43   043E 5C01008A                OR      1,REG2
 44   0440 49810088                ST      1,*REG0
 45   0442 70820442  ADDEX         B       S
 46   0444 F4A00088  ADESGO        STPS    REG0
 47   0446 5A800001                NA      0,+1
 48   0448 F0B8044C                BC      11,PMODE
 49   044A 7082B8C2                B       AUTOD
 50   044C 0820408C  PMODE         LDCH    (X'20',4),REG4
 51   044E 34240800                SETH    X'24',1
 52   0450 34250800                SFTB    X'25',1
 53   0452 0920008C                LDCH    (X'120',0),REG4
 54   0454 44000E20                L       0,RTMCON
 55   0456 48801334                ST      0,RTIMER
 56   0458 4400135F                L       0,PFIRST
 57   045A F08A046C                BC      10,PMODE1
 58   045C 2D121088                STCR    (X'112',1),REG0
 59   045E 5A800001                NA      0,+1
 60   0460 48801360                ST      0,CI1
 61   0462 2D15108B                STCR    (X'115',1),REG0
 62   0464 5A800001                NA      0,+1
 63   0466 48801361                ST      0,AK1
 64   0468 44800001                LA      0,+1
 65   046A 4880135F                ST      0,PFIRST
 66   046C 74830616  PMODE1        BL      3,PPIPCK
 67   046E 2D121088                STCR    (X'112',1),REG0
 68   0470 5A800001                NA      0,+1
 69   0472 C0001360                CR      0,CI1
 70   0474 E0BA047A                BC      11,S+6
 71   0476 4880131E                ST      0,VMIR
 72   0478 48801360                ST      0,CI1
 73   047A 2D15108B                STCR    (X'115',1),REG0
 74   047C 5A800001                NA      0,+1
 75   047E C0001361                CR      0,AK1
 76   0480 E08B0486                BC      11,S+6
 77   0482 4880131F                ST      0,HMIR
 78   0484 48801361                ST      0,AK1
 79   0486 44800E00                LA      0,RWZERO
 80   0488 748307A8                BL      3,READ
 81   048A F08A046C                BC      10,PMODE1
 82   048C 44800E21                LA      0,RZREND
 83   048E 748307A8                BL      3,READ
 84   0490 E08A046C                BC      10,PMODE1
 85   0492 44800E16                LA      0,SA
 86   0494 74830728                BL      3,ADAPT
 87   0496 44800E16  SACHK         LA      0,SA
 88   0498 748307A8                BL      3,READ
 89   049A E08A04A0                BC      10,RWZCHK
 90   049C 74830616                BL      3,PPIPCK
 91   049E 70820496                B       SACHK
 92   04A0 44800E00  RWZCHK        LA      0,RWZERO
 93   04A2 748307AB                BL      3,READ
 94   04A4 F08A046C                BC      10,PMODE1
 95   04A6 44800E01                LA      0,R0
 96   04A8 7483072B                BL      3,ADAPT
 97   04AA C0800E15                CRA     0,R0+20
 98   04AC F0B804B2                BC      11,S+6
 99   04AE 4CA00001                AA      0,+1
100   04B0 70820448                B       S-A
101   04B2 44800E17                LA      0,SB
102   04B4 7483072B                BL      3,ADAPT
103   04B6 48841329  KUCARD        ST      4,CARDOK
104   04B8 4884132A                ST      4,N1FLAG
105   04BA 4884132B                ST      4,COLPOS
106   04BC 4884135C                ST      4,SAFLAG
107   04BE 44800079                LA      0,X'79'
108   04C0 4880135D                ST      0,CHKSUM
109   04C2 44800001                LA      0,+1
110   04C4 4880132C                ST      0,SALEV
111   04C6 74830616  COLCHK        BL      3,PPIPCK
112   04C8 44800E16                LA      0,SA
113   04CA 748307A8                BL      3,READ
114   04CC C001132C                CR      1,SALEV
115   04CE F0BB04C6                BC      11,COLCHK
116   04D0 4881132C                ST      1,SALEV
117   04D2 44800E17                LA      0,SB
118   04D4 748307A8                BL      3,READ
119   04D6 F0B804C6                BC      11,COLCHK
120   04D8 4400132C                L       0,SALEV
121   04DA E08804E4                BC      11,CARDIN
122   04DC 44001328                L       0,COLPOS
123   04DE 5A800001                SA      0,+1
124   04E0 4880132B                ST      0,COLPOS
125   04E2 7082D4C6                B       COLCHK
126   04E4 4402132B  CARDIN        L       2,COLPOS
127   04E6 E09C044C                BC      12,PMODE
128   04E8 44800E01                LA      0,R0
129   04EA 46220E41                L       2,COLADR,2
130   04EC 748307AB  RNXTRW        BL      3,READ
131   04EE 49810088                ST      1,*REG2
132   04F0 4CA00001                AA      0,+1
133   04F2 4CA20001                AA      2,+1
134   04F4 C0800E16                CRA     0,SA
135   04F6 E08B04FA                BC      11,S+4
136   04F8 70820AEC                B       RNXTRW
137   04FA 44800E22                LA      0,SAWHT
138   04FC 748307A8                BL      3,READ
139   04FE 44010E16                L       1,SA
140   0500 0920F089                LDCR    (X'120',15),REG1
141   0502 4481000D                LA      1,X'000D'
142   0504 0C1F0504                ARR     -1,S,1
143   0506 2D1C1089                STCR    (X'11C',1),REG1
144   0508 5A810001                NA      1,+1
145   050A F0AB0510                BC      11,WHOK
146   050C 44800001                LA      0,+1
147   050E 4880135C                ST      0,SAFLAG
148   0510 44001328  WHOK          L       0,COLPOS
149   0512 C0800025                CRA     0,37
150   0514 F0BB051C                BC      11,ACR
151   0516 4CA00001                AA      0,+1
152   0518 4880132B                ST      0,COLPOS
153   051A 7082D4C6                B       COLCHK
154   051C 74830616  ACR           BL      3,PPIPCK
155   051E 44800E00                LA      0,RWZERO
156   0520 748307A8                BL      3,READ
157   0522 E08B051C                BC      11,ACR
158   0524 44800E1E                LA      0,RWZER2
159   0526 748307AB                BL      3,READ
160   0528 E08B051C                BC      11,ACR
161   052A 44800E1F                LA      0,RWZER3
162   052C 748307AB                BL      3,READ
163   052E F08B051C                BC      11,ACR
164   0530 4400135C                L       0,SAFLAG
165   0532 40800001                XORA    0,+1
166   0534 48801329                ST      0,CARDOK
167   0536 7082053C                B       S+6
168   0538 44800001  ACR1          LA      0,+1
169   053A 48801329                ST      0,CARDOK
170   053C 48841309                ST      4,COL38
171   053E 4884130A                ST      4,COL38+1
172   0540 4884130B                ST      4,COL38+2
173   0542 44811000                LA      1,COL1
174   0544 44800000                LA      0,0
175   0546 45020089  CAGN          L       2,*REG1
176   0548 E08A054C                BC      11,S+4
177   054A 4CA00001                AA      0,+1
178   054C C081131D                CRA     1,COL38+20
179   054E F08B0554                BC      11,S+6
180   0550 4C810001                AA      1,+1
181   0552 70820546                B       CAGN
182   0554 4880135E                ST      0,REMNUM
183   0556 44810001                LA      1,+1
184   0558 44830000                LA      3,0
185   055A 5A800001                NA      0,+1
186   055C E0880560                BC      11,REMA
```

```
187  055E  4CA30001           AA    3,1
188  0560  60010089  REMA     MLA   1,REG1
189  0562  C0910000A          CRA   1,10
190  0564  E0AC056B           BC    12,S+4
191  0566  50A1000A           SA    1,10
192  0568  6401135E           MRA   1,REMNUM
193  056A  4400135E           L     0,REMNUM
194  056C  E0BB057C           BC    11,REMB
195  056E  5AA00001           NA    0,1
196  0570  F0B80560           BC    11,REMA
197  0572  4C030089           A     3,REG1
198  0574  C0A3000A           CRA   3,10
199  0576  F0BC0560           BC    12,REMA
200  0578  50A3000A           SA    3,10
201  057A  70A20560           B     REMA
202  057C  4883135E  REMB     ST    3,REMNUM
203  057E  F0A80586           BC    10,$+8
204  0580  4483003F           LA    3,X'3F'
205  0582  4883135D           ST    3,CHKSUM
206  0584  7A205BC            B     $+8
207  0586  50A30001           SA    3,1
208  0588  46330E23           L     3,LCCODE,3
209  058A  4883135D           ST    3,CHKSUM
210  058C  44001314           L     0,COL38+11
211  058E  4880131E           ST    0,VMIR
212  0590  44001312           L     0,COL38+9
213  0592  4880131F           ST    0,HMIR
214  0594  44830000           LA    3,0
215  0596  4883132A           ST    3,SELVC
216  0598  44800000           LA    0,0
217  059A  4CA00001  SCLOOP   AA    0,1
218  059C  4601130B           L     1,COL38+2,0
219  059E  F0B805A4           BC    11,$+6
220  05A0  4CA30001           AA    3,1
221  05A2  4883132A           ST    0,SELVC
222  05A4  C0900005           CRA   0,5
223  05A6  E0BC059A           BC    12,SCLOOP
224  05A8  C0A30002           CRA   3,2
225  05AA  E0BC05B2           BC    12,$+8
226  05AC  44830001           LA    3,1
227  05AE  4883135B           ST    3,DOPTN
228  05B0  70A2044C           B     PMODE
229  05B2  44800000           LA    0,0
230  05B4  460112F5           L     1,COL37+1,0
231  05B6  E0BA05C0           BC    10,$+10
232  05B8  C0900013           CRA   0,19
233  05BA  F0BB05C0           BC    11,$+6
234  05BC  4C800001           AA    0,1
235  05BE  70A205B4           B     $-10
236  05C0  48801322           ST    0,TRUWC
237  05C2  E0BA05C6           BC    10,$+4
238  05C4  4884131E           ST    4,VMIR
239  05C6  44800000           LA    0,0
240  05C8  4701OE41           L     1,*COLADR,0
241  05CA  E0BA05D4           BC    10,$+10
242  05CC  C0B00023           CRA   0,35
243  05CE  F0BB0504           BC    11,$+6
244  05D0  4C800001           AA    0,1
245  05D2  70A205CH           B     $-10
246  05D4  48801320           ST    0,CULEND
247  05D6  E0BA05DA           BC    10,$+4
248  05D8  4884131F           ST    4,HMIR
249  05DA  44830000           LA    3,0
250  05DC  48831323           ST    3,RRC
251  05DE  44800000           LA    0,0
252  05E0  4CA00001  RRLOOP   AA    0,1
253  05E2  46011319           L     1,COL38+16,0
254  05E4  F0B805EA           BC    11,$+6
255  05E6  4CA30001           AA    3,1
256  05E8  48801323           ST    0,RRC
257  05EA  C0A00003           CRA   0,3
258  05EC  E0AC05E0           BC    12,RRLOOP
259  05EE  C0A30002           CRA   3,2
260  05F0  E0AC05F8           BC    12,$+8
261  05F2  44830001           LA    3,1
262  05F4  4883135B           ST    3,DOPTN
263  05F6  70A2044C           B     PMODE
264  05F8  44830000           LA    3,0
265  05FA  48831321           ST    3,CRC
266  05FC  44800000           LA    0,0
267  05FE  4CA00001  CHLOOP   AA    0,1
268  0600  46011315           L     1,COL38+12,0
269  0602  E0BB060A           BC    11,$+6
270  0604  4CA30001           AA    3,1
271  0606  48801321           ST    0,CRC
272  0608  C0800003           CRA   0,3
273  060A  E0AC05FE           BC    12,CHLOOP
274  060C  C0930002           CRA   3,2
275  060E  F0AC044C           BC    12,PMODE
276  0610  44830001           LA    3,1
277  0612  4883135B           ST    3,DOPTN
278  0614  70A2044C           B     PMODE
279  0616  4CA30002  PPIPCK   AA    3,2

280  0618  48830727           ST    3,PPEXIT+1
281  061A  2C11108A           STCR  (X'11',1),REG0
282  061C  C000132F           CR    0,ALEVEL
283  061E  F0BB065A           BC    11,MOTCK
284  0620  4880132F           ST    0,ALEVEL
285  0622  3012085A           BRNE  X'12',1,MOTCK
286  0624  4400132A           L     0,N1FLAG
287  0626  E0BB063A           BC    11,CKALVL
288  0628  44001321           L     0,CRC
289  062A  C0001363           CR    0,CRC00
290  062C  F0B80630           BC    11,$+4
291  062E  70A20636           B     $+8
292  0630  4400131F           L     0,HMIR
293  0632  C0001362           CR    0,AR00
294  0634  F0B80638           BC    11,CKALVL
295  0636  48A4132A           ST    4,N1FLAG
296  0638  4400132F  CKALVL   L     0,ALEVEL
297  063A  F0AB064A           BC    11,PRIGHT
298  063C  48841325           ST    4,DIRNOW
299  063E  5AA60001           SA    6,1
300  0640  5AA600FF           NA    6,X'FF'
301  0642  4400132A           L     0,N1FLAG
302  0644  F0B80686           BC    11,PMODCK
303  0646  74A380C           BL    3,CULDEC
304  0648  70A20686           B     PMODCK
305  064A  44800001  PRIGHT   LA    0,1
306  064C  48841325           ST    0,DIRNOW
307  064E  4C860001           AA    6,1
308  0650  5AA600FF           NA    6,X'FF'
309  0652  4400132A           L     0,N1FLAG
310  0654  F0B80686           BC    11,PMODCK
311  0656  74A30ACA           BL    3,CULINC
312  0658  70A20686           B     PMODCK
313  065A  20182088  MOTCK    STCR  (X'118',2),REG0
314  065C  E0B80662           BC    11,CKN1
315  065E  5AA00001           NA    0,1
316  0660  4AE00F00           ST    0,MOTIF+6
317  0662  44001329           L     0,CARDOK
318  0664  E0B80686           BC    11,PMODCK
319  0666  2D111088           STCR  (X'111',1),REG0
320  0668  4880133H           ST    0,LRREV
321  066A  C0061366           CR    6,C1POS
322  066C  E0B80670           BC    11,$+4
323  066E  31140A86           BRNE  X'114',1,PMODCK
324  0670  4884132D           ST    4,CRCNOW
325  0672  4884132E           ST    4,COLUMN
326  0674  4884133F           ST    4,CADJR
327  0676  4884133H           ST    4,CADJL
328  0678  48861366           ST    6,C1POS
329  067A  44800001           LA    0,1
330  067C  4880132A           ST    0,N1FLAG
331  067E  4400131F           L     0,HMIR
332  0680  48801362           ST    0,AR00
333  0682  48801363           ST    0,CRC00
334  0684  48801363           ST    0,CRC00
335  0686  31100886  PMODCK   BRNE  X'110',1,KMODED
336  0688  30100000           BRNE  X'101',0,KPROG
337  068A  4400132E           L     0,COLUMN
338  068C  4CA00001           AA    0,1
339  068E  F4800089           STPS  REG1
340  0640  5AA10400           NA    1,X'0400'
341  0692  E0BB0696           BC    11,$+4
342  0694  440008E           L     0,REG6
343  0696  40B0FFFF           XORA  0,X'FFFF'
344  0698  082680A8           LDCR  (X'26',8),REG0
345  069A  2D162088           STCR  (X'116',2),REG0
346  069C  E0BH0700           BC    11,MIRXT
347  069E  5AA00001           NA    0,1
348  06A0  E0BA06D0           BC    10,CLRPST
349  06A2  44001323           L     0,RRC
350  06A4  46000E37           L     0,RRCODE,0
351  06A6  5CA00001           URA   0,1
352  06A8  082040A8           LDCR  (X'20',4),REG0
353  06AA  0926A06C           LDCR  (X'126',10),REG4
354  06AC  2D1F10A8           STCR  (X'11F',1),REG0
355  06AE  C0001365           CH    0,LAST82
356  06B0  E0B80726           BC    11,PPEXIT
357  06B2  48801365           ST    0,LAST82
358  06B4  44001334           L     0,RTIMER
359  06B6  50A00001           SA    0,1
360  06B8  48801334           ST    0,RTIMER
361  06BA  E0BA0726           BC    10,PPEXIT
362  06BC  44001323           L     0,RRC
363  06BE  C0A00003           CRA   0,3
364  06C0  E0AC06C6           BC    12,$+6
365  06C2  44800000           LA    0,0
366  06C4  70A206CH           B     $+4
367  06C6  4CA00001           AA    0,1
368  06C8  48801323           ST    0,RRC
369  06CA  44000E20           L     0,RTMCON
370  06CC  48801334           ST    0,RTIMER
371  06CF  70A20726           B     PPEXIT
372  06D0  44001321  CLRPST   L     0,CRC
```

| # | Addr | Code | Label | Op | Operand |
|---|---|---|---|---|---|
| 373 | 0602 | 46000E37 | | L | 0,RHCODE,0 |
| 374 | 0604 | 08204088 | | LDCR | (X'120',4),REG0 |
| 375 | 0606 | 44400131F | | L | 0,HMIR |
| 376 | 0608 | E08B06DE | | BC | 11,$+6 |
| 377 | 060A | 44800209 | | LA | 0,X'209' |
| 378 | 060C | 70A206E0 | | B | $+4 |
| 379 | 060E | 44400009 | | LA | 0,9 |
| 380 | 06E0 | 0926A088 | | LDCR | (X'126',10),REG0 |
| 381 | 06E2 | 201F10A8 | | STCR | (X'11F',1),REG0 |
| 382 | 06E4 | C0001365 | | CR | 0,LASTB2 |
| 383 | 06E6 | E08B0726 | | BC | 11,PPEXIT |
| 384 | 06E8 | 48801365 | | ST | 0,LASTB2 |
| 385 | 06EA | 44001334 | | L | 0,RTIMER |
| 386 | 06EC | 58A00001 | | SA | 0,1 |
| 387 | 06EE | 48801334 | | ST | 0,RTIMER |
| 388 | 06F0 | E08A0726 | | BC | 10,PPEXIT |
| 389 | 06F2 | 44001321 | | L | 0,CRC |
| 390 | 06F4 | C0400003 | | CRA | 0,3 |
| 391 | 06F6 | E08C06FC | | BC | 12,$+6 |
| 392 | 06F8 | 44800000 | | LA | 0,0 |
| 393 | 06FA | 70A206FE | | B | $+4 |
| 394 | 06FC | 4C800001 | | AA | 0,1 |
| 395 | 06FE | 48801321 | | ST | 0,CRC |
| 396 | 0700 | 44000E20 | MIRXT | L | 0,RTMCON |
| 397 | 0702 | 48801334 | | ST | 0,RTIMER |
| 398 | 0704 | 2C14108B | | STCR | (X'014',1),REG0 |
| 399 | 0706 | 58A00001 | | NA | 0,1 |
| 400 | 0708 | E08A071A | | BC | 10,CSOUT |
| 401 | 070A | 44001369 | | L | 0,CSFLAG |
| 402 | 070C | E08A0710 | | BC | 10,CKACK |
| 403 | 070E | 70A20726 | | B | PPEXIT |
| 404 | 0710 | 44800000 | CKACK | LA | 0,0 |
| 405 | 0712 | 48801369 | | ST | 0,CSFLAG |
| 406 | 0714 | 44001329 | | L | 0,CARDOK |
| 407 | 0716 | E08A0726 | | BC | 10,PPEXIT |
| 408 | 0718 | 70A2046C | | B | PMODE1 |
| 409 | 071A | 44800001 | CSOUT | LA | 0,1 |
| 410 | 071C | 48801369 | | ST | 0,CSFLAG |
| 411 | 071E | 4400135D | | L | 0,CHKSUM |
| 412 | 0720 | 0926A0A8 | | LDCR | (X'126',10),REG0 |
| 413 | 0722 | 0A20408C | | LDCR | (X'20',4),REG4 |
| 414 | 0724 | 70A2061A | | B | PPIPCK+4 |
| 415 | 0726 | 70A20726 | PPEXIT | B | $ |
| 416 | 0728 | 4C830002 | ADAPT | AA | 3,2 |
| 417 | 072A | 488307A7 | | ST | 3,ADXIT+1 |
| 418 | 072C | 45010088 | | L | 1,*REG0 |
| 419 | 072E | 0920A0A9 | | LDCR | (X'120',10),REG1 |
| 420 | 0730 | 44020E18 | | L | 2,SELDLY |
| 421 | 0732 | 50020E1D | | S | 2,ADPTIM |
| 422 | 0734 | E08C0738 | | BC | 12,$+4 |
| 423 | 0736 | 0C2F0738 | | ARR | -1,$,2 |
| 424 | 0738 | 4481000F | | LA | 1,X'000F' |
| 425 | 073A | 44820010 | | LA | 2,X'0010' |
| 426 | 073C | 09A25089 | ADLOOP | LDCR | (X'12A',5),REG1 |
| 427 | 073E | 6401008A | | MRA | 1,REG2 |
| 428 | 0740 | 44030E1C | | L | 3,ADPDLY |
| 429 | 0742 | 0C3F0742 | | ARR | -1,$,3 |
| 430 | 0744 | 311C034E | | BRNE | X'11C',0,VALHI |
| 431 | 0746 | C0820000 | | CRA | 2,0 |
| 432 | 0748 | E08B0758 | | BC | 11,LOXIT |
| 433 | 074A | 5001008A | | S | 1,REG2 |
| 434 | 074C | 70A2073C | | B | ADLOOP |
| 435 | 074E | C0A20000 | VALHI | CRA | 2,0 |
| 436 | 0750 | F08B0756 | | BC | 11,HIXIT |
| 437 | 0752 | 4C01008A | | A | 1,REG2 |
| 438 | 0754 | 70A2073C | | B | ADLOOP |
| 439 | 0756 | 4C810001 | HIXIT | AA | 1,1 |
| 440 | 0758 | 4081001F | LOXIT | XORA | 1,X'001F' |
| 441 | 075A | 4483001F | | LA | 3,X'001F' |
| 442 | 075C | 0920A0B8 | | LDCR | (X'120',10),REG3 |
| 443 | 075E | 44020088 | | L | 2,REG0 |
| 444 | 0760 | 50A20E01 | | SA | 2,K0 |
| 445 | 0762 | 44A11344 | | ST | 1,ATABLE+2 |
| 446 | 0764 | C0A10019 | | CRA | 1,25 |
| 447 | 0766 | E0AC076C | | BC | 12,$+6 |
| 448 | 0768 | 50810005 | | SA | 1,5 |
| 449 | 076A | 70A20782 | | B | SABCK |
| 450 | 076C | C0A1000F | | CRA | 1,15 |
| 451 | 076E | E0AC0774 | | BC | 12,$+6 |
| 452 | 0770 | 50A10003 | | SA | 1,3 |
| 453 | 0772 | 70A20742 | | B | SABCK |
| 454 | 0774 | C0A1000A | | CRA | 1,10 |
| 455 | 0776 | E0AC077C | | BC | 12,$+6 |
| 456 | 0778 | 50A10002 | | SA | 1,2 |
| 457 | 077A | 70A20742 | | B | SABCK |
| 458 | 077C | C0A10005 | | CRA | 1,5 |
| 459 | 077E | E0AC0782 | | BC | 12,$+4 |
| 460 | 0740 | 50A10001 | | SA | 1,1 |
| 461 | 0742 | C0A00E1A | SABCK | CRA | 0,SA |
| 462 | 0744 | E0AB078E | | BC | 11,$+10 |
| 463 | 0746 | C0A00E17 | | CRA | 0,SH |
| 464 | 0748 | E0A40792 | | BC | 11,$+10 |
| 465 | 074A | 50A10002 | | SA | 1,2 |
| 466 | 07AC | 70A20794 | | B | $+8 |
| 467 | 07AE | 50A10003 | | SA | 1,3 |
| 468 | 07B0 | 70A20794 | | B | $+4 |
| 469 | 07B2 | 50A10003 | | SA | 1,3 |
| 470 | 07B4 | E08C0798 | | BC | 12,$+4 |
| 471 | 07B6 | 70A2079A | | B | $+4 |
| 472 | 07B8 | 44810000 | | LA | 1,0 |
| 473 | 07BA | 4081001F | | XORA | 1,X'1F' |
| 474 | 07BC | 452008BB | | L | 2,*REG0 |
| 475 | 07BE | 5A8203FF | | NA | 2,X'3FF' |
| 476 | 07C0 | 680608B9 | | MRA | 6,REG1 |
| 477 | 07C2 | 5C0100B8 | | OR | 1,REG2 |
| 478 | 07C4 | 49A100B8 | | ST | 1,*REG0 |
| 479 | 07C6 | 70A207A6 | ADXIT | B | $ |
| 480 | 07A8 | 4501008B | HEAD | L | 1,*REG0 |
| 481 | 07AA | 0920F0B9 | | LDCR | (X'120',15),REG1 |
| 482 | 07AC | 44010E1B | | L | 1,SELDLY |
| 483 | 07AE | 0C1F07AE | | ARR | -1,$,1 |
| 484 | 07B0 | 201C10A9 | | STCR | (X'11C',1),REG1 |
| 485 | 07B2 | 58910001 | | NA | 1,1 |
| 486 | 07B4 | 7292000C | | B | +2,3 |
| 487 | 07B6 | 70070000 | KMODE0 | NOP | |
| 488 | 07B8 | 44001321 | CMPCRC | L | 0,CRC |
| 489 | 07BA | C0001363 | | CP | 0,CRC00 |
| 490 | 07BC | E08B07C2 | | BC | 11,CMPHMR |
| 491 | 07BE | 48841322 | | ST | 4,N1FLAG |
| 492 | 07C0 | 70A207CC | | B | KMODE |
| 493 | 07C2 | 4400131F | CMPHMR | L | 0,HMIR |
| 494 | 07C4 | C0001362 | | CR | 0,AR00 |
| 495 | 07C6 | E08B07CC | | BC | 11,KMODE |
| 496 | 07C8 | 4884132A | | ST | 4,N1FLAG |
| 497 | 07CA | 70A207CC | | B | KMODE |
| 498 | 07CC | 4884135F | KMODE | ST | 4,PFIRST |
| 499 | 07CE | 44001329 | | L | 0,CARDOK |
| 500 | 07D0 | F08A07D6 | | BC | 10,K2D |
| 501 | 07D2 | 44800079 | | LA | 0,X'79' |
| 502 | 07D4 | 70A207E4 | | B | STDHUF |
| 503 | 07D6 | 4400135B | K2D | L | 0,DOPTN |
| 504 | 07D8 | F08B07DE | | BC | 11,NIF |
| 505 | 07DA | 44800179 | | LA | 0,X'179' |
| 506 | 07DC | 70A207E4 | | B | STDHUF |
| 507 | 07DE | 4400132A | NIF | L | 0,N1FLAG |
| 508 | 07E0 | F08A07EC | | BC | 10,PRESET |
| 509 | 07E2 | 448000F9 | | LA | 0,X'F9' |
| 510 | 07E4 | 48841335 | STDHUF | ST | 0,DBUF1 |
| 511 | 07E6 | 48841336 | | ST | 4,DBUF2 |
| 512 | 07E8 | 748309EB | | BL | 3,KPIPCK |
| 513 | 07EA | 70A207EA | | B | $-2 |
| 514 | 07EC | 48841332 | PRESET | ST | 4,CROWN |
| 515 | 07EE | 48841331 | | ST | 4,RHCNOW |
| 516 | 07F0 | 4400131E | | L | 0,VMIR |
| 517 | 07F2 | 58800001 | | NA | 0,1 |
| 518 | 07F4 | 44200010 | | XORA | 0,1 |
| 519 | 07F6 | 48801330 | | ST | 0,ARROW |
| 520 | 07F8 | 44001338 | ADJ | L | 0,CADJL |
| 521 | 07FA | F08B0804 | | BC | 11,$+10 |
| 522 | 07FC | 44020E67 | | L | 2,ROFFST |
| 523 | 07FE | 7483DACA | | BL | 3,COLINC |
| 524 | 0800 | 0C2107FE | | ARR | +1,$-2,2 |
| 525 | 0802 | 48841338 | | ST | 4,CADJL |
| 526 | 0804 | 44001337 | | L | 0,CADJR |
| 527 | 0806 | F08B0810 | | BC | 11,DBUF12 |
| 528 | 0808 | 44020E6B | | L | 2,LOFFST |
| 529 | 080A | 7483080C | | BL | 3,COLDEC |
| 530 | 080C | 0C21080A | | ARR | +1,$-2,2 |
| 531 | 080E | 48841337 | | ST | 4,CADJR |
| 532 | 0810 | 44001332 | DBUF12 | L | 0,CROWN |
| 533 | 0812 | 46000E23 | | L | 0,LCCODE,0 |
| 534 | 0814 | 48841335 | | ST | 4,DBUF1 |
| 535 | 0816 | 44001330 | | L | 0,ARROW |
| 536 | 0818 | 48801336 | | ST | 0,DBUF2 |
| 537 | 081A | F08B0B82 | | BC | 11,SETDWN |
| 538 | 081C | 44001323 | SETRRC | L | 0,RRC |
| 539 | 081E | F08B0832 | | BC | 11,AWAIT |
| 540 | 0820 | 44001331 | | L | 0,RHCNOW |
| 541 | 0822 | 46000E37 | | L | 0,RHCODE,0 |
| 542 | 0824 | 5C001336 | | OR | 0,DBUF2 |
| 543 | 0826 | 48801336 | | ST | 0,DBUF2 |
| 544 | 0828 | 70A20832 | | B | AWAIT |
| 545 | 082A | 44001335 | SETDWN | L | 0,DBUF1 |
| 546 | 082C | 5C800200 | | ORA | 0,X'200' |
| 547 | 082E | 48801335 | | ST | 0,DBUF1 |
| 548 | 0830 | 70A201C | | B | SETRRC |
| 549 | 0832 | 748309EB | AWAIT | BL | 3,KPIPCK |
| 550 | 0834 | 44001340 | | L | 0,NEWPOS |
| 551 | 0836 | F08A0848 | | BC | 11,RADVCK |
| 552 | 0838 | 48841340 | | ST | 4,NEWPOS |
| 553 | 083A | 44001325 | | L | 0,DIRNOW |
| 554 | 083C | E08A0844 | | BC | 11,LFBUT |
| 555 | 083E | 201A10BB | | STCR | (X'11A',1),REG0 |
| 556 | 0840 | F08C0892 | | BC | 12,SUR |
| 557 | 0842 | 70A2084B | | B | RADVCK |
| 558 | 0844 | 201B10BB | LFBUT | STCR | (X'11B',1),REG0 |

```
559  0846 E08C0892           BC    12,SOR              652  0900 48801342           ST    0,KBIT
560  084A 20162088 KADVCK    STCR  (X'116',2),REG0     653  0902 70820954           B     ADRPA
561  084A F04H088E            BC   11,RA50             654  0904 44001338 KNITP     L     0,LRREV
562  094C 44001368            L    0,UDBUSY            655  0906 F08H090E           BC    11,KNITP1
563  084F F0890880            BC   11,RA40          5  656  090H 44001320           L     0,COLEND
564  0850 201F1088            STCR (X'11F',1),REG0     657  090A 5000132E           S     0,COLUMN
565  0852 C000133A            CR   0,LAST81            658  090C 70820910           B     KNITP2
566  0854 F08H0832            BC   11,AWAIT            659  090E 44001322 KNITP1    L     0,COLUMN
567  0856 48801334            ST   0,LAST81            660  0910 46000E41 KNITP2    L     0,COLADR,0
568  0858 44001339            L    0,MTIMER            661  0912 4C001332           A     0,CROWN
569  085A 50800001            SA   0,+1                662  0914 4C800001           AA    0,+1
570  085C 48801339            ST   0,MTIMER        10  663  0916 458000MH           L     0,+REG0
571  085E F0840832            BC   10,AWAIT            664  0918 48801342           ST    0,KBIT
572  0860 44001367            L    0,SLOWC             665  091A 44800001           LA    0,1
573  0862 F08H047C            BC   11,RA30             666  091C 48000968           ST    0,FINCLR
574  0864 50800001            SA   0,+1                667  091E 20182088           STCR  (X'118',2),REG0
575  0866 48801367            ST   0,SLOWC             668  0920 F0880094A           BC    11,CLIN
576  0868 44000E6C            L    0,SLOWN             669  0922 F08A0930           BC    10,MTFCK
577  086A 48801339 RA10       ST   0,MTIMER        15  670  0924 20121089           STCR  (X'112',1),REG1
578  086C 20171088            STCR (X'117',1),REG0     671  0926 E08H0930           BC    11,MTFCK
579  086E F08H0A74            BC   11,RA20             672  0928 44001342           L     0,KBIT
580  0870 74830888            BL   3,RAOVF             673  092A 40800001           XORA  0,1
581  0872 70820A10            B    DBUF12              674  092C 48801342           ST    0,KBIT
582  0874 20161088 RA20       STCR (X'116',1),REG0     675  092E 48840968           ST    4,FINCLR
583  0876 E0880832            BC   11,AWAIT            676  0930 44001326 MTFCK     L     0,DIRFIX
584  0878 74830888            BL   3,RAOVF         20  677  0932 F08A0938           BC    11,$+6
585  087A 70820A10            B    DBUF12              678  0934 44000E69           L     0,RMFST
586  087C 44000E6D RA30       L    0,FASTN             679  0936 70820934           B     $+4
587  087E 70820A6A            B    RA10                680  093A 44000E6A           L     0,LMFST
588  0880 44800001 RA40       LA   0,1                 681  093A 4C0000AE           A     0,REG6
589  0882 48801368            ST   0,UDBUSY            682  093C 58800FF           NA    0,X'FF'
590  0884 44800002            LA   0,2                 683  093E 46000F00           L     0,MOTIF,0
591  0886 48801339            ST   0,MTIMER        25  684  0940 40800001           XORA  0,1
592  0888 44800003            LA   0,3                 685  0942 58001342           N     0,KBIT
593  088A 48801367            ST   0,SLOWC             686  0944 48801342           ST    0,KBIT
594  088C 70820832            B    AWAIT               687  0946 44001968           L     1,FINCLR
595  088E 48841368 RA50       ST   4,UDBUSY            688  0948 F08A0954           BC    11,ADRPA
596  0890 70820832            B    AWAIT               689  094A 20121089 CLIN      STCR  (X'112',1),REG1
597  0892 44001325 SOR        L    0,DIRNOW         30 690  094C E08A0954           BC    11,$+8
598  0894 48801326            ST   0,DIRFIX            691  094E 44001342           L     0,KBIT
599  0896 F08H08A4            BC   11,$+14             692  0950 40800001           XORA  0,1
600  0898 44020167            L    2,RUFFST            693  0952 48801342           ST    0,KBIT
601  089A 74830ACA            BL   3,CULINC            694  0954 2C1210H8 ADRPA     STCR  (X'121',1),REG0
602  089C 0C2104A            ARR   +1,$-2,2            695  0956 F08H0960           BC    11,ACKF
603  089E 44800001            LA   0,1                 696  0958 74830E8 BLOW       BL    3,KPIPCK
604  08A0 48801337            ST   0,CADJR          35 697  095A 44001340           L     0,NEWPOS
605  08A2 70820AAE            B    $+12                698  095C E08A0954           BC    11,ADRPA
606  08A4 44020E68            L    2,LOFFST            699  095E 70820802           B     KNEWPS
607  08A6 74830A0C            BL   3,COLDEC            700  0960 2C111088 ACKF      STCR  (X'11',1),REG0
608  08A8 0C2108A6            ARR   +1,$-2,2           701  0962 58800000           NA    0,1
609  08AA 44800001            LA   0,1                 702  0964 C0001326           CR    0,DIRFIX
610  08AC 48801338            ST   0,CADJL             703  0966 F08H096A           BC    11,$+4
611  08AE 48841330            ST   4,JAMCHK        40  704  0968 70820958           B     BLOW
612  08B0 4884133F            ST   4,OFF3F             705  096A 4400133E           L     0,ENBACT
613  08B2 4480FFF0            LA   0,-3                706  096C E0880982           BC    11,ACOFF
614  08B4 4880133C            ST   0,OFF3C             707  096E 44001342           L     0,KBIT
615  08B6 44800001            LA   0,1                 708  0970 E0880982           BC    11,ACOFF
616  08B8 4880133E            ST   0,ENBACT            709  0972 44001326           L     0,DIRFIX
617  08BA 44001324            L    0,SELVC             710  0974 E08B097C           BC    11,FIRLFT
618  08BC 44810000            LA   1,0             45  711  0976 34250800           SFTB  X'25',1
619  08BE C0900000            CRA  0,0                 712  0978 34240000           SFTB  X'24',0
620  08C0 E08A08CA            BC   11,$+10             713  097A 70820986           B     OFF3CK
621  08C2 60010089            MLA  1,REG1              714  097C 34240H00 FIRLFT    SFTB  X'24',1
622  08C4 5C810020            ORA  1,X'0020'           715  097E 34250000           SFTB  X'25',0
623  08C6 50800001            SA   0,+1                716  0980 70820986           B     OFF3CK
624  08C8 70820H8E            B    $-10                717  0982 34240H00 ACOFF     SFTB  X'24',1
625  08CA 48811341            ST   1,SELVZ         50  718  0984 34250800           SFTB  X'25',1
626  08CC 74830H9E8 KNXT      BL   3,KPIPCK            719  0986 4884133F OFF3CK    ST    0,OFF3F
627  08CE 44001340            L    0,NEWPOS            720  0988 E08H0982           BC    11,NOTOFF
628  08D0 E08A0BCC            BC   11,$-4              721  098A 4400133C           L     0,OFF3C
629  08D2 48841340 KNEWPS     ST   4,NEWPOS            722  098C 4C800001           AA    0,+1
630  08D4 44001325            L    0,DIRNOW            723  098E 4880133C           ST    0,OFF3C
631  08D6 C0001326            CR   0,DIRFIX            724  0990 C0800006           CRA   0,6
632  08D8 E0880BE6            BC   11,GOKNIT       55  725  0992 E0AC08CC           BC    12,KNXT
633  08DA 4400133D            L    0,JAMCHK            726  0994 4884133E           ST    4,ENBACT
634  08DC E0880BE0            BC   11,$+4              727  0996 C000E6H           CR    0,CARSIZ
635  08DE 70820FF8            B    ADJ                 728  0998 E0AC08CC           BC    12,KNXT
636  08E0 44800001            LA   0,1                 729  099A 74830E8 AUTOCK     BL    3,KPIPCK
637  08E2 4880133D            ST   0,JAMCHK            730  099C 44001325           L     0,DIRNOW
638  08E4 70820BCC            B    KNXT            60  731  099E C0001326           CR    0,DIRFIX
639  08E6 4400133D GOKNIT     L    0,JAMCHK            732  09A0 F0880AC           BC    11,INRASW
640  08E8 E0880EE            BC    11,$+6              733  09A2 20151088           STCR  (X'115',1),REG0
641  08EA 4884133D            ST   4,JAMCHK            734  09A4 F08H09AH           BC    11,$+4
642  08EC 70820BCC            B    KNXT                735  09A6 70820FB            B     ADJ
643  08EE 44001341            L    0,SELVZ             736  09A8 74830H48           BL    3,RAOVF
644  08F0 44011341            MRA  1,SELVZ             737  09AA 70820FB            B     ADJ
645  08F2 58800002            NA   0,2             65  738  09AC 20162088 INRASW    STCR  (X'116',2),REG0
646  08F4 E0880904            BC   11,KNITP            739  09AE F08H099A           BC    11,AUTOCK
647  08F6 20131089            STCR (X'113',1),REG1     740  09B0 70820FB            B     ADJ
648  08F8 E0880BFE            BC   11,$+6              741  09B2 44001326 NOTOFF    L     0,DIRFIX
649  08FA 48841342            ST   4,KBIT              742  09B4 E08H09HC           BC    11,$+H
650  08FC 70820954            B    ADRPA               743  09B6 201A10H8           STCR  (X'11A',1),REG0
651  08FE 44800001            LA   0,1                 744  09BH E08B09C6           BC    11,OFFONE
```

| # | Addr | Code | Label | Op | Operand |
|---|---|---|---|---|---|
| 745 | 09B A | 70A209C0 | | B | $+6 |
| 746 | 09BC | 2019108B | | STCR | (X'11B',1),REG0 |
| 747 | 09BE | E0A909E6 | | BC | 11,OFFONE |
| 748 | 09C0 | 44B0FFFD | | LA | 0,-3 |
| 749 | 09C2 | 4AB0133C | | ST | 0,OFF3C |
| 750 | 09C4 | 70A208CC | | B | KNXT |
| 751 | 09C6 | 4400133C | OFFONE | L | 0,OFF3C |
| 752 | 09C8 | 4C900001 | | AA | 0,+1 |
| 753 | 09CA | 4AB0133C | | ST | 0,OFF3C |
| 754 | 09CC | E0BC08CC | | BC | 12,KNXT |
| 755 | 09CE | 44001324 | | L | 0,SELVC |
| 756 | 09D0 | 44B10000 | | LA | 1,0 |
| 757 | 09D2 | C0B00000 | | CRA | 0,0 |
| 758 | 09D4 | E0AB090E | | BC | 11,$+10 |
| 759 | 09D6 | 64010089 | | MRA | 1,REG1 |
| 760 | 09D8 | 5C810004 | | ORA | 1,X'0004' |
| 761 | 09DA | 50B00001 | | SA | 0,+1 |
| 762 | 09DC | 70A209D2 | | B | $-10 |
| 763 | 09DE | 4AB11341 | | ST | 1,SELVZ |
| 764 | 09E0 | 44B00001 | | LA | 0,1 |
| 765 | 09E2 | 4AB0133F | | ST | 0,OFF3F |
| 766 | 09E4 | 70A208CC | | B | KNXT |
| 767 | 09E6 | | FINCLR | RFS | 2 |
| 768 | 09E8 | 4CB30002 | KPIPCK | AA | 3,+2 |
| 769 | 09EA | 4AB30A11 | | ST | 3,KPEXIT+1 |
| 770 | 09EC | 2010108B | | STCR | (X'110',1),REG0 |
| 771 | 09EE | E0AB09F2 | | BC | 11,KP10 |
| 772 | 09F0 | 70A2044C | | B | PMODE |
| 773 | 09F2 | 2C11108B | KP10 | STCR | (X'11',1),REG0 |
| 774 | 09F4 | C000132F | | CR | 0,ALEVEL |
| 775 | 09F6 | E0AB0A20 | | BC | 11,PWRCK |
| 776 | 09F8 | 4AB0132F | | ST | 0,ALEVEL |
| 777 | 09FA | 2C12108B | | STCR | (X'12',1),REG3 |
| 778 | 09FC | E0BA0A20 | | BC | 11,PWRCK |
| 779 | 09FE | 44001325 | | L | 0,ALEVEL |
| 780 | 0A00 | E0B0A12 | | BC | 11,KRIGHT |
| 781 | 0A02 | 4AB41325 | | ST | 4,DIRNOW |
| 782 | 0A04 | 34240800 | | SFTB | X'24',1 |
| 783 | 0A06 | 50B60001 | | SA | 6,1 |
| 784 | 0A08 | 58B600FF | | NA | 6,X'FF' |
| 785 | 0A0A | 74B30B0C | | BL | 3,CULDEC |
| 786 | 0A0C | 44B00001 | NEW | LA | 0,1 |
| 787 | 0A0E | 4AB01340 | | ST | 0,NEWPOS |
| 788 | 0A10 | 70A20A10 | KPEXIT | B | $ |
| 789 | 0A12 | 44B00001 | KRIGHT | LA | 0,1 |
| 790 | 0A14 | 4AB41325 | | ST | 0,DIRNOW |
| 791 | 0A16 | 34250B00 | | SETB | X'25',1 |
| 792 | 0A18 | 4CB60001 | | AA | 6,+1 |
| 793 | 0A1A | 58B600FF | | NA | 6,X'FF' |
| 794 | 0A1C | 74B30ACA | | BL | 3,COLINC |
| 795 | 0A1E | 70A20A0C | | B | NEW |
| 796 | 0A20 | 2D1E108B | PWRCK | STCR | (X'11E',1),REG3 |
| 797 | 0A22 | E0BA0A26 | | BC | 10,$+4 |
| 798 | 0A24 | 70A20A5E | | B | TURNON+4 |
| 799 | 0A26 | 2010108B | | STCR | (X'110',1),REG3 |
| 800 | 0A28 | E09A0A38 | | BC | 11,PWRLOW |
| 801 | 0A2A | 44B0003F | | LA | 0,X'3F' |
| 802 | 0A2C | 0926A088 | | LDCR | (X'126',10),REG0 |
| 803 | 0A2E | 44B00000 | | LA | 0,0 |
| 804 | 0A30 | 0B2040B8 | | LDCR | (X'20',4),REG0 |
| 805 | 0A32 | 2C10108B | | STCR | (X'10',1),REG3 |
| 806 | 0A34 | E08A0A32 | | BC | 11,$-2 |
| 807 | 0A36 | 70A20A00 | | B | KPROG |
| 808 | 0A38 | 2D1F108B | PWRLOW | STCR | (X'11F',1),REG0 |
| 809 | 0A3A | C0001328 | | CR | 0,LAST80 |
| 810 | 0A3C | E0BA0A10 | | BC | 11,KPEXIT |
| 811 | 0A3E | 4AB01328 | | ST | 0,LAST80 |
| 812 | 0A40 | 44001333 | | L | 0,FTIMER |
| 813 | 0A42 | 4CB00001 | | AA | 0,+1 |
| 814 | 0A44 | C0B00050 | | CRA | 0,X'50' |
| 815 | 0A46 | E0BA044C | | BC | 10,FLASH |
| 816 | 0A48 | 4AB01333 | | ST | 0,FTIMER |
| 817 | 0A4A | 70A20A10 | | B | KPEXIT |
| 818 | 0A4C | 4AB41333 | FLASH | ST | 4,FTIMER |
| 819 | 0A4E | 44001327 | | L | 0,DONFLG |
| 820 | 0A50 | E0BA0A5A | | BC | 11,TURNON |
| 821 | 0A52 | 4AB41327 | | ST | 4,DONFLG |
| 822 | 0A54 | 0B2040BC | | LDCR | (X'20',4),REG4 |
| 823 | 0A56 | 0926A08C | | LDCR | (X'126',10),REG4 |
| 824 | 0A58 | 70A20A10 | | B | KPEXIT |
| 825 | 0A5A | 44B00001 | TURNON | LA | 0,1 |
| 826 | 0A5C | 4AB01327 | | ST | 0,DONFLG |
| 827 | 0A5E | 44001329 | LKSELV | L | 0,CARDOK |
| 828 | 0A60 | E0BA0A9E | | BC | 11,LK4 |
| 829 | 0A62 | 2D1110BB | | STCR | (X'111',1),REG0 |
| 830 | 0A64 | C000133B | | CR | 0,LKREV |
| 831 | 0A66 | E0B40A9E | | BC | 11,LK4 |
| 832 | 0A68 | 44001337 | | L | 0,CADJR |
| 833 | 0A6A | 5C00133B | | UP | 0,CADJL |
| 834 | 0A6C | E0BA0A9E | | BC | 10,LK4 |
| 835 | 0A6E | 2D1F108B | | STCR | (X'11F',1),REG0 |
| 836 | 0A70 | C0001365 | | CR | 0,LAST82 |
| 837 | 0A72 | E0BA0A92 | | BC | 11,LK3 |
| 838 | 0A74 | 4AB01365 | | ST | 0,LAST82 |
| 839 | 0A76 | 44001364 | | L | 0,STIMER |
| 840 | 0A78 | 4CB00001 | | AA | 0,+1 |
| 841 | 0A7A | C0000E20 | | CR | 0,RTMCON |
| 842 | 0A7C | E0BA0AB2 | | BC | 10,LKH3 |
| 843 | 0A7E | 4AB01364 | | ST | 0,STIMER |
| 844 | 0A80 | 70A20A92 | | B | LK3 |
| 845 | 0A82 | 4AB41364 | LK1 | ST | 4,STIMER |
| 846 | 0A84 | 44001324 | | L | 0,SELVC |
| 847 | 0A86 | 4CB00001 | | AA | 0,+1 |
| 848 | 0A88 | C0B00006 | | CRA | 0,6 |
| 849 | 0A8A | E0BC0A90 | | BC | 12,LK2 |
| 850 | 0A8C | 4AB41324 | | ST | 0,SELVC |
| 851 | 0A8E | 70A20A92 | | B | LK3 |
| 852 | 0A90 | 4AB01324 | LK2 | ST | 0,SELVC |
| 853 | 0A92 | 44001324 | LK3 | L | 0,SELVC |
| 854 | 0A94 | 4A010E3B | | L | 1,SELBUF+0 |
| 855 | 0A96 | 0926A089 | | LDCR | (X'126',10),REG1 |
| 856 | 0A98 | 44B10001 | | LA | 1,+1 |
| 857 | 0A9A | 0B2040B9 | | LDCR | (X'20',4),REG1 |
| 858 | 0A9C | 70A20AC8 | | B | LEDCK |
| 859 | 0A9E | 4BB41364 | LK4 | ST | 4,STIMER |
| 860 | 0AA0 | 2C14108B | | STCR | (X'014',1),REG0 |
| 861 | 0AA2 | E0BA0AAC | | BC | 11,CHKE |
| 862 | 0AA4 | 4400135D | | L | 0,CHKSUM |
| 863 | 0AA6 | 0926A088 | | LDCR | (X'126',10),REG0 |
| 864 | 0AA8 | 0B20A08C | | LDCR | (X'20',4),REG4 |
| 865 | 0AAA | 70A20AC8 | | B | LEDCK |
| 866 | 0AAC | 44001335 | CHKE | L | 0,OBUF1 |
| 867 | 0AAE | C0B00079 | | CRA | 0,X'0079' |
| 868 | 0AB0 | E0BA0AC2 | | BC | 11,DSPBF1+2 |
| 869 | 0AB2 | C0061366 | | CR | 6,C1POS |
| 870 | 0AB4 | E0BA0AB8 | | BC | 11,$+4 |
| 871 | 0AB6 | 70A20AC0 | | B | DSPBF1 |
| 872 | 0AB8 | 44B000H9 | | LA | 0,X'0089' |
| 873 | 0ABA | 0926A088 | | LDCR | (X'126',10),REG0 |
| 874 | 0ABC | 0B20A08C | | LDCR | (X'20',4),REG4 |
| 875 | 0ABE | 70A20AC8 | | B | LEDCK |
| 876 | 0AC0 | 44001335 | DSPBF1 | L | 0,OBUF1 |
| 877 | 0AC2 | 0926A088 | | LDCR | (X'126',10),REG0 |
| 878 | 0AC4 | 44001336 | | L | 0,OBUF2 |
| 879 | 0AC6 | 0B20A08B | | LDCR | (X'20',4),REG0 |
| 880 | 0AC8 | 70A20A10 | LEDCK | B | KPEXIT |
| 881 | 0ACA | 4400132D | COLINC | L | 0,CHCNOW |
| 882 | 0ACC | C0001321 | | CR | 0,CHC |
| 883 | 0ACE | E0BA0AD6 | | BC | 11,$+8 |
| 884 | 0AD0 | 4CB00001 | | AA | 0,1 |
| 885 | 0AD2 | 4AB0132D | | ST | 0,CHCNOW |
| 886 | 0AD4 | 72A20002 | | B | +2,3 |
| 887 | 0AD6 | 4AB4132D | | ST | 4,CHCNOW |
| 888 | 0AD8 | 4400131F | | L | 0,HMIR |
| 889 | 0ADA | E0BA0B00 | | BC | 11,INC3 |
| 890 | 0ADC | 44001343 | | L | 0,MIRNOW |
| 891 | 0ADE | E0BA0AF0 | | BC | 11,INC1 |
| 892 | 0AE0 | 4400132E | | L | 0,COLUMN |
| 893 | 0AE2 | E0BA0AEB | | BC | 11,$+6 |
| 894 | 0AE4 | 50B00001 | | SA | 0,+1 |
| 895 | 0AE6 | 70A20AEC | | B | $+6 |
| 896 | 0AE8 | 4AB41343 | | ST | 4,MIRNOW |
| 897 | 0AEA | 4CB00001 | INC2 | AA | 0,+1 |
| 898 | 0AEC | 4AB0132E | | ST | 0,COLUMN |
| 899 | 0AEE | 72A20002 | | B | +2,3 |
| 900 | 0AF0 | 4400132E | INC1 | L | 0,COLUMN |
| 901 | 0AF2 | C000132D | | CR | 0,CULEND |
| 902 | 0AF4 | E0BA0AFB | | BC | 11,$+4 |
| 903 | 0AF6 | 70A20AEA | | B | INC2 |
| 904 | 0AF8 | 44B10001 | | LA | 1,1 |
| 905 | 0AFA | 4AB11343 | | ST | 1,MIRNOW |
| 906 | 0AFC | 50B00001 | | SA | 0,1 |
| 907 | 0AFE | 70A20AEC | | B | INC2+2 |
| 908 | 0B00 | 4400132E | INC3 | L | 0,COLUMN |
| 909 | 0B02 | C0001320 | | CR | 0,CULEND |
| 910 | 0B04 | E0BA0B08 | | BC | 11,$+4 |
| 911 | 0B06 | 70A20AEA | | B | INC2 |
| 912 | 0B08 | 4AB4132E | | ST | 4,COLUMN |
| 913 | 0B0A | 72A20002 | | B | +2,3 |
| 914 | 0B0C | 4400132D | COLDEC | L | 0,CHCNOW |
| 915 | 0B0E | E0BA0B16 | | BC | 11,$+8 |
| 916 | 0B10 | 50B00001 | | SA | 0,+1 |
| 917 | 0B12 | 4AB0132D | | ST | 0,CHCNOW |
| 918 | 0B14 | 72A20002 | | B | +2,3 |
| 919 | 0B16 | 44001321 | | L | 0,CHC |
| 920 | 0B18 | 4AB0132D | | ST | 0,CHCNOW |
| 921 | 0B1A | 4400131F | | L | 0,HMIR |
| 922 | 0B1C | E0BA0B40 | | BC | 11,DEC4 |
| 923 | 0B1E | 44001343 | | L | 0,MIRNOW |
| 924 | 0B20 | E0BA0B34 | | BC | 11,DEC2 |
| 925 | 0B22 | 4400132E | | L | 0,COLUMN |
| 926 | 0B24 | C0001320 | | CR | 0,CULEND |
| 927 | 0B26 | E0BA0B2E | | BC | 11,$+8 |
| 928 | 0B28 | 4CB00001 | | AA | 0,+1 |
| 929 | 0B2A | 4AB0132E | DEC1 | ST | 0,COLUMN |
| 930 | 0B2C | 72A20002 | | B | +2,3 |

```
931  0B2E 48941343           ST    4,MIRNOW
932  0B30 50800001  DEC3     SA    0,+1
933  0B32 70820B2A           B     DEC1
934  0B34 4400132E  DEC2     L     0,COLUMN
935  0B36 F0880B3A           BC    11,$+4
936  0B38 70820830           B     DEC3
937  0B3A 44810001           LA    1,1
938  0B3C 48B11343           ST    1,MIRNOW
939  0B3E 70820B28           B     DEC1-2
940  0B40 4400132E  DEC4     L     0,COLUMN
941  0B42 F0A00B30           BC    10,DEC3
942  0B44 44001320           L     0,COLEND
943  0B46 70820B2A           B     DEC1
944  0B48 44001331  RADVF    L     0,RRCNOW
945  0B4A C0001323           CR    0,RRC
946  0B4C F0880B54           BC    11,$+8
947  0B4E 4C800001           AA    0,+1
948  0B50 48801331           ST    0,RRCNOW
949  0B52 72820002           B     +2,3
950  0B54 48841331           ST    4,RRCNOW
951  0B56 44001322           L     0,THOWC
952  0B58 F2880002           BC    11,2,3
953  0B5A 44001332           L     0,CROWN
954  0B5C E0880866           BC    11,RADVF1
955  0B5E C0001322           CW    0,THOWC
956  0B60 E0880872           BC    11,RADVF2
957  0B62 44001330           L     0,ARROW
958  0B64 E0880878           BC    11,RADVF2+6
959  0B66 44001332  RADVF1   L     0,CROWN
960  0B68 4C800001           AA    0,+1
961  0B6A 48801332           ST    0,CROWN
962  0B6C 48800001           LA    0,+1
963  0B6E 48801330           ST    0,ARROW
964  0B70 72820002           B     +2,3
965  0B72 4400131E  RADVF2   L     0,VMIR
966  0B74 E0880B80           BC    11,RADVF3
967  0B76 48841330           ST    4,ARROW
968  0B78 44001332           L     0,CROWN
969  0B7A 50800001           SA    0,+1
970  0B7C 48801332           ST    0,CROWN
971  0B7E 72820002           B     +2,3
972  0B80 48841332  RADVF3   ST    4,CROWN
973  0B82 72820002           B     +2,3
974  0B84 44001331  RADVR    L     0,RRCNOW
975  0B86 F0880B8E           BC    11,$+6
976  0B88 50800001           SA    0,+1
977  0B8A 48801331           ST    0,RRCNOW
978  0B8C 72820002           B     +2,3
979  0B8E 44001323           L     0,RRC
980  0B90 48801331           ST    0,RRCNOW
981  0B92 44001322           L     0,THOWC
982  0B94 E2880002           BC    11,+2,3
983  0B96 44001330           L     0,ARROW
984  0B98 F0880BA2           BC    11,RADVR2
985  0B9A 44001332           L     0,CROWN
986  0B9C F0880BAC           BC    11,RADVR1
987  0B9E 50800001           SA    0,+1
988  0BA0 48801332           ST    0,CROWN
989  0BA2 F28A0002           BC    10,2,3
990  0BA4 4400131E           L     0,VMIR
991  0BA6 40800001           XORA  0,1
992  0BA8 48801330           ST    0,ARROW
993  0BAA 72820002           B     +2,3
994  0BAC 44001322  RADVR1   L     0,THOWC
995  0BAE 48801332           ST    0,CROWN
996  0BB0 72820002           B     +2,3
997  0BB2 44001332  RADVR2   L     0,CROWN
998  0BB4 4C800001           AA    0,+1
999  0BB6 48801332           ST    0,CROWN
1000 0BB8 C0001322           CP    0,THOWC
1001 0BBA E2BC0002           BC    12,+2,3
1002 0BBC 44800001           LA    0,+1
1003 0BBE 48801330           ST    0,ARROW
1004 0BC0 72820002           B     +2,3
1005 0BC2 44800BD2  AUTOD    LA    0,OBSTAD
1006 0BC4 44810001           LA    1,1
1007 0BC6 45020088           L     2,*REG0
1008 0BC8 4981008A           ST    1,*REG2
1009 0BCA C0B00C2C           CRA   0,OBENDA
1010 0BCC F0B0053B           BC    11,ACK1
1011 0BCE 4C800001           AA    0,+1
1012 0BD0 70820BC6           B     AUTOD+4
1013 0BD2 120F      OBSTAD   DATA  COL36
1014 0BD3 1005               DATA  X'1005'
1015 0BD4 1006               DATA  X'1006'
1016 0BD5 1007               DATA  X'1007'
1017 0BD6 1019               DATA  X'1019'
1018 0BD7 101A               DATA  X'101A'
1019 0BD8 101B               DATA  X'101B'
1020 0BD9 102C               DATA  X'102C'
1021 0BDA 102D               DATA  X'102D'
1022 0BDB 102E               DATA  X'102E'
1023 0BDC 102F               DATA  X'102F'
1024 0BDD 1040               DATA  X'1040'
1025 0BDE 1041               DATA  X'1041'
1026 0BDF 1042               DATA  X'1042'
1027 0BE0 1043               DATA  X'1043'
1028 0BE1 1044               DATA  X'1044'
1029 0BE2 1055               DATA  X'1055'
1030 0BE3 1056               DATA  X'1056'
1031 0BE4 1057               DATA  X'1057'
1032 0BE5 1058               DATA  X'1058'
1033 0BE6 1059               DATA  X'1059'
1034 0BE7 105A               DATA  X'105A'
1035 0BE8 106A               DATA  X'106A'
1036 0BE9 106B               DATA  X'106B'
1037 0BEA 106C               DATA  X'106C'
1038 0BEB 106D               DATA  X'106D'
1039 0BEC 106E               DATA  X'106E'
1040 0BED 106F               DATA  X'106F'
1041 0BEE 107F               DATA  X'107F'
1042 0BEF 1080               DATA  X'1080'
1043 0BF0 1081               DATA  X'1081'
1044 0BF1 1082               DATA  X'1082'
1045 0BF2 1083               DATA  X'1083'
1046 0BF3 1084               DATA  X'1084'
1047 0BF4 1094               DATA  X'1094'
1048 0BF5 1095               DATA  X'1095'
1049 0BF6 1096               DATA  X'1096'
1050 0BF7 1097               DATA  X'1097'
1051 0BF8 1098               DATA  X'1098'
1052 0BF9 10A9               DATA  X'10A9'
1053 0BFA 10AA               DATA  X'10AA'
1054 0BFB 10AB               DATA  X'10AB'
1055 0BFC 10AC               DATA  X'10AC'
1056 0BFD 10AD               DATA  X'10AD'
1057 0BFE 10BE               DATA  X'10BE'
1058 0BFF 10BF               DATA  X'10BF'
1059 0C00 10C0               DATA  X'10C0'
1060 0C01 10C1               DATA  X'10C1'
1061 0C02 10C2               DATA  X'10C2'
1062 0C03 10C2               DATA  X'10C2'
1063 0C04 10C3               DATA  X'10C3'
1064 0C05 10C4               DATA  X'10C4'
1065 0C06 10C5               DATA  X'10C5'
1066 0C07 10D3               DATA  X'10D3'
1067 0C08 10D4               DATA  X'10D4'
1068 0C09 10D5               DATA  X'10D5'
1069 0C0A 10D6               DATA  X'10D6'
1070 0C0B 10D7               DATA  X'10D7'
1071 0C0C 10D8               DATA  X'10D8'
1072 0C0D 10D9               DATA  X'10D9'
1073 0C0E 10DA               DATA  X'10DA'
1074 0C0F 10DB               DATA  X'10DB'
1075 0C10 10E8               DATA  X'10E8'
1076 0C11 10E9               DATA  X'10E9'
1077 0C12 10EA               DATA  X'10EA'
1078 0C13 10EB               DATA  X'10EB'
1079 0C14 10EC               DATA  X'10EC'
1080 0C15 10ED               DATA  X'10ED'
1081 0C16 10EE               DATA  X'10EE'
1082 0C17 10EF               DATA  X'10EF'
1083 0C18 10F0               DATA  X'10F0'
1084 0C19 10F1               DATA  X'10F1'
1085 0C1A 10FD               DATA  X'10FD'
1086 0C1B 10FE               DATA  X'10FE'
1087 0C1C 10FF               DATA  X'10FF'
1088 0C1D 1100               DATA  X'1100'
1089 0C1E 1101               DATA  X'1101'
1090 0C1F 1102               DATA  X'1102'
1091 0C20 1103               DATA  X'1103'
1092 0C21 1104               DATA  X'1104'
1093 0C22 1105               DATA  X'1105'
1094 0C23 1113               DATA  X'1113'
1095 0C24 1114               DATA  X'1114'
1096 0C25 1115               DATA  X'1115'
1097 0C26 1117               DATA  X'1117'
1098 0C27 1118               DATA  X'1118'
1099 0C28 1119               DATA  X'1119'
1100 0C29 1120               DATA  X'1120'
1101 0C2A 1142               DATA  X'1142'
1102 0C2B 1150               DATA  X'1150'
1103 0C2C 12FF      OBENDA   DATA  X'12FF'
1104 0C2D                    END
1105 0E00               ABS        X'E00'
1106 0E00      CON     DSEG
1107 0E00 5610  HWZERO  DATA  X'5610'
1108 0E01 021D  HU      DATA  X'021D'
1109 0E02 021B          DATA  X'021B'
1110 0E03 0217          DATA  X'0217'
1111 0E04 020F          DATA  X'020F'
1112 0E05 011E          DATA  X'011E'
1113 0E06 011D          DATA  X'011D'
1114 0E07 011B          DATA  X'011B'
1115 0E08 0117          DATA  X'0117'
1116 0E09 010F          DATA  X'010F'
1117 0E0A 009E          DATA  X'009E'
1118 0E0B 009D          DATA  X'009D'
1119 0E0C 009B          DATA  X'009B'
1120 0E0D 0097          DATA  X'0097'
1121 0E0E 008F          DATA  X'008F'
1122 0E0F 005E          DATA  X'005E'
```

| | | | | | | | | | |
|---|---|---|---|---|---|---|---|---|---|
|1123|0E10 005D| |DATA|X'005D'| |1219|0F00| |VAR DSEG|
|1124|0E11 005B| |DATA|X'005B'| |1220|0F00| |MOTIF RES 256|
|1125|0E12 0057| |DATA|X'0057'| |1221|1000| |COL1 RES 21|
|1126|0E13 004F| |DATA|X'004F'| |1222|1015| |COL2 RES 21|
|1127|0E14 003E| |DATA|X'003E'| |1223|102A| |COL3 RES 21|
|1128|0E15 003D| |DATA|X'003D'|5|1224|103F| |COL4 RES 21|
|1129|0E16 021E|SA|DATA|X'021E'| |1225|1054| |COL5 RES 21|
|1130|0E17 003B|SB|DATA|X'003B'| |1226|1069| |COL6 RES 21|
|1131|0E18 0037|PIPA|DATA|X'0037'| |1227|107E| |COL7 RES 21|
|1132|0E19 002F|PIPB|DATA|X'002F'| |1228|1093| |COL8 RES 21|
|1133|0E1A 0050|PIPDLY|DATA|X'0050'| |1229|10A8| |COL9 RES 21|
|1134|0E1B 0100|SELDLY|DATA|X'0100'| |1230|10BD| |COL10 RES 21|
|1135|0E1C 000B|ADPDLY|DATA|X'000B'|10|1231|10D2| |COL11 RES 21|
|1136|0E1D 0054|ADPTIM|DATA|X'0054'| |1232|10E7| |COL12 RES 21|
|1137|0E1E 5E17|MWZER2|DATA|X'5E17'| |1233|10FC| |COL13 RES 21|
|1138|0E1F 4C5B|MWZER3|DATA|X'4C5B'| |1234|1111| |COL14 RES 21|
|1139|0E20 0100|MTMCON|DATA|X'0100'| |1235|1126| |COL15 RES 21|
|1140|0E21 5430|MZREND|DATA|X'5430'| |1236|113B| |COL16 RES 21|
|1141|0E22 7E1E|SAWHT|DATA|X'7E1E'| |1237|1150| |COL17 RES 21|
|1142|0E23 0006|LCCODE|DATA|X'06'|15|1238|1165| |COL18 RES 21|
|1143|0E24 005B| |DATA|X'5B'| |1239|117A| |COL19 RES 21|
|1144|0E25 004F| |DATA|X'4F'| |1240|118F| |COL20 RES 21|
|1145|0E26 0066| |DATA|X'66'| |1241|11A4| |COL21 RES 21|
|1146|0E27 006D| |DATA|X'6D'| |1242|11B9| |COL22 RES 21|
|1147|0E28 0070| |DATA|X'7D'| |1243|11CE| |COL23 RES 21|
|1148|0E29 0027| |DATA|X'27'| |1244|11E3| |COL24 RES 21|
|1149|0E2A 007F| |DATA|X'7F'|20|1245|11F8| |COL25 RES 21|
|1150|0E2B 006F| |DATA|X'6F'| |1246|120D| |COL26 RES 21|
|1151|0E2C 00BF| |DATA|X'BF'| |1247|1222| |COL27 RES 21|
|1152|0E2D 0086| |DATA|X'86'| |1248|1237| |COL28 RES 21|
|1153|0E2E 00DB| |DATA|X'DB'| |1249|124C| |COL29 RES 21|
|1154|0E2F 00CF| |DATA|X'CF'| |1250|1261| |COL30 RES 21|
|1155|0E30 00E6| |DATA|X'E6'| |1251|1276| |COL31 RES 21|
|1156|0E31 00ED| |DATA|X'ED'|25|1252|128B| |COL32 RES 21|
|1157|0E32 00FD| |DATA|X'FD'| |1253|12A0| |COL33 RES 21|
|1158|0E33 00A7| |DATA|X'A7'| |1254|12B5| |COL34 RES 21|
|1159|0E34 00FF| |DATA|X'FF'| |1255|12CA| |COL35 RES 21|
|1160|0E35 00EF| |DATA|X'EF'| |1256|12DF| |COL36 RES 21|
|1161|0E36 013F| |DATA|X'13F'| |1257|12F4| |COL37 RES 21|
|1162|0E37 0002|KKCODE|DATA|2| |1258|1309| |COL38 RES 21|
|1163|0E38 0004| |DATA|4|30|1259|131E| |VMIP RES 1|
|1164|0E39 0006| |DATA|6| |1260|131F| |MMIP RES 1|
|1165|0E3A 000E| |DATA|X'E'| |1261|1320| |COLEND RES 1|
|1166|0E3B 023F|SELBUF|DATA|X'23F'| |1262|1321| |CKC RES 1|
|1167|0E3C 0206| |DATA|X'206'| |1263|1322| |TROWC RES 1|
|1168|0E3D 025B| |DATA|X'25B'| |1264|1323| |RKC RES 1|
|1169|0E3E 024F| |DATA|X'24F'|35|1265|1324| |SELVC RES 1|
|1170|0E3F 0266| |DATA|X'266'| |1266|1325| |DIRNOW RES 1|
|1171|0E40 0260| |DATA|X'260'| |1267|1326| |DIRFIX RES 1|
|1172|0E41 1000|COLADR|DATA|COL1| |1268|1327| |DONFLG RES 1|
|1173|0E42 1015| |DATA|COL2| |1269|1328| |LAST8O RES 1|
|1174|0E43 102A| |DATA|COL3| |1270|1329| |CARDOK RES 1|
|1175|0E44 103F| |DATA|COL4| |1271|132A| |N1FLAG RES 1|
|1176|0E45 1054| |DATA|COL5|40|1272|132B| |COLPOS RES 1|
|1177|0E46 1069| |DATA|COL6| |1273|132C| |SALEV RES 1|
|1178|0E47 107E| |DATA|COL7| |1274|132D| |CKCNOW RES 1|
|1179|0E48 1093| |DATA|COL8| |1275|132E| |COLUMN RES 1|
|1180|0E49 10A8| |DATA|COL9| |1276|132F| |ALFVEL RES 1|
|1181|0E4A 10BD| |DATA|COL10| |1277|1330| |ARROW RES 1|
|1182|0E4B 10D2| |DATA|COL11| |1278|1331| |HRCNOW RES 1|
|1183|0E4C 10E7| |DATA|COL12|45|1279|1332| |CROWN RES 1|
|1184|0E4D 10FC| |DATA|COL13| |1280|1333| |FTIMER RES 1|
|1185|0E4E 1111| |DATA|COL14| |1281|1334| |HTIMER RES 1|
|1186|0E4F 1126| |DATA|COL15| |1282|1335| |OBUF1 RES 1|
|1187|0E50 113B| |DATA|COL16| |1283|1336| |OBUF2 RES 1|
|1188|0E51 1150| |DATA|COL17| |1284|1337| |CADJH RES 1|
|1189|0E52 1165| |DATA|COL18| |1285|1338| |CADJL RES 1|
|1190|0E53 117A| |DATA|COL19|50|1286|1339| |MTIMER RES 1|
|1191|0E54 118F| |DATA|COL20| |1287|133A| |LAST61 RES 1|
|1192|0E55 11A4| |DATA|COL21| |1288|133B| |LRREV RES 1|
|1193|0E56 11B9| |DATA|COL22| |1289|133C| |OFF3C RES 1|
|1194|0E57 11CE| |DATA|COL23| |1290|133D| |JAMCHK RES 1|
|1195|0E58 11E3| |DATA|COL24| |1291|133E| |ENBACT RES 1|
|1196|0E59 11F8| |DATA|COL25| |1292|133F| |OFF3F RES 1|
|1197|0E5A 120D| |DATA|COL26|55|1293|1340| |NEWPOS RES 1|
|1198|0E5B 1222| |DATA|COL27| |1294|1341| |SELVZ RES 1|
|1199|0E5C 1237| |DATA|COL28| |1295|1342| |KBIT RES 1|
|1200|0E5D 124C| |DATA|COL29| |1296|1343| |MIRNOW RES 1|
|1201|0E5E 1261| |DATA|COL30| |1297|1344| |ATABLE RES 23|
|1202|0E5F 1276| |DATA|COL31| |1298|135B| |DOPTN RES 1|
|1203|0E60 128B| |DATA|COL32| |1299|135C| |SAFLAG RES 1|
|1204|0E61 12A0| |DATA|COL33|60|1300|135D| |CHKSUM RES 1|
|1205|0E62 12B5| |DATA|COL34| |1301|135E| |HEMNUM RES 1|
|1206|0E63 12CA| |DATA|COL35| |1302|135F| |PFIRST RES 1|
|1207|0E64 12DF| |DATA|COL36| |1303|1360| |CI1 RES 1|
|1208|0E65 12F4| |DATA|COL37| |1304|1361| |AR1 RES 1|
|1209|0E66 1309| |DATA|COL38| |1305|1362| |AROO RES 1|
|1210|0E67 FFE5|ROFFST|DATA|-27| |1306|1363| |CKCOO RES 1|
|1211|0E68 FFE5|LOFFST|DATA|-27|65|1307|1364| |STIMER RES 1|
|1212|0E69 001B|RMFST|DATA|+27| |1308|1365| |LASTH2 RES 1|
|1213|0E6A FFE5|LMFST|DATA|-27| |1309|1366| |C1POS RES 1|
|1214|0E6B 0042|CARSIZ|DATA|66| |1310|1367| |SLOWC RES 1|
|1215|0E6C 00C0|SLOWN|DATA|X'00C0'| |1311|1368| |UDBUSY RES 1|
|1216|0E6D 0050|FASTN|DATA|X'0050'| |1312|1369| |CSFLAG RES 1|
|1217|0E6E| |END| | |1313|136A| |ATLAST RES 1|
|1218|0F00| |ABS|X'F00'| |1314|136B| |END|